United States Patent
Nishiyama et al.

(10) Patent No.: US 6,801,293 B1
(45) Date of Patent: Oct. 5, 2004

(54) METHOD FOR MANUFACTURING AN IN-PLANE ELECTRIC FIELD MODE LIQUID CRYSTAL ELEMENT

(75) Inventors: Kazuhiro Nishiyama, Hirakata (JP); Junko Asayama, Suita (JP); Kazunori Komori, Sanda (JP); Yukio Tanaka, Kyoto (JP); Akio Takimoto, Neyagawa (JP); Kazuo Inoue, Hirakata (JP); Katsuhiko Kumagawa, Neyagawa (JP); Ichiro Sato, Kyotanabe (JP); Hirofumi Wakemoto, Ishikawa (JP); Noriyuki Kizu, Kanazawa (JP); Masanori Kimura, Daito (JP); Keisuke Tsuda, Ishikawa-gun (JP)

(73) Assignee: Matsushita Electric Industrial Co., Ltd. (JP)

( * ) Notice: Subject to any disclaimer, the term of this patent is extended or adjusted under 35 U.S.C. 154(b) by 51 days.

(21) Appl. No.: 10/089,888

(22) PCT Filed: Oct. 6, 2000

(86) PCT No.: PCT/JP00/07011

§ 371 (c)(1),
(2), (4) Date: Apr. 5, 2002

(87) PCT Pub. No.: WO01/25843

PCT Pub. Date: Apr. 12, 2001

(30) Foreign Application Priority Data

| Oct. 6, 1999 | (JP) | 11-285549 |
| Oct. 26, 1999 | (JP) | 11-303664 |
| Mar. 23, 2000 | (JP) | 2000-081206 |
| Apr. 17, 2000 | (JP) | 2000-114864 |
| Apr. 17, 2000 | (JP) | 2000-114871 |
| Jun. 19, 2000 | (JP) | 2000-182626 |
| Jun. 19, 2000 | (JP) | 2000-182628 |
| Jun. 19, 2000 | (JP) | 2000-182645 |

(51) Int. Cl.[7] ............... G02F 1/13; G02F 1/1343
(52) U.S. Cl. ........................ 349/187; 349/141
(58) Field of Search .................. 349/126, 141, 349/156, 187; 428/429

(56) References Cited

U.S. PATENT DOCUMENTS

| 5,598,285 A | * | 1/1997 | Kondo et al. ............ 349/39 |
| 5,625,474 A | * | 4/1997 | Aomori et al. ........... 349/79 |
| 5,796,458 A | * | 8/1998 | Koike et al. ........... 349/126 |
| 5,894,050 A | * | 4/1999 | Camps et al. .......... 428/429 |
| 6,154,264 A | | 11/2000 | Koide et al. ........... 349/113 |
| 6,266,121 B1 | * | 7/2001 | Shigeta et al. ......... 349/156 |

FOREIGN PATENT DOCUMENTS

| EP | 0 855 613 A2 | 7/1998 |
| JP | 59-226323 | 12/1984 |
| JP | 60-175033 | 9/1985 |
| JP | 63-121020 | 5/1988 |
| JP | 02-277022 | 11/1990 |
| JP | 04-319915 | 11/1992 |
| JP | 05-224211 | 9/1993 |
| JP | 05-265012 | 10/1993 |
| JP | 05-297383 | 11/1993 |
| JP | 05-307160 | 11/1993 |
| JP | 06-095133 | 4/1994 |

(List continued on next page.)

*Primary Examiner*—Robert H. Kim
*Assistant Examiner*—Jeanne Andrea Di Grazio
(74) *Attorney, Agent, or Firm*—Parkhurst & Wendel, L.L.P.

(57) ABSTRACT

The curing, by UV-light irradiation, of a sealing resin after injecting liquid crystal is made reliable.

The display characteristics and the like of an in-plane electric field mode liquid crystal element are improved.

To resolve these problems, the viscosity of the sealing resin is lowered, while bubbles mixed in the sealing resin are eliminated by ultrasonic waves, for example.

Also, a means for eliminating ions and charges in the liquid crystal layer is devised.

2 Claims, 83 Drawing Sheets

FOREIGN PATENT DOCUMENTS

| | | |
|---|---|---|
| JP | 06-222372 | 8/1994 |
| JP | 06-235923 | 8/1994 |
| JP | 07-084230 | 3/1995 |
| JP | 07-159786 | 6/1995 |
| JP | 07-199199 | 8/1995 |
| JP | 07-306415 | 11/1995 |
| JP | 08-094985 | 4/1996 |
| JP | 09-061833 | 3/1997 |
| JP | 09-101527 | 4/1997 |
| JP | 09-269504 | 10/1997 |
| JP | 10-003085 | 1/1998 |
| JP | 10-39297 | 2/1998 |
| JP | 10-170890 | 6/1998 |
| JP | 10-186386 | 7/1998 |
| JP | 10-186391 | 7/1998 |
| JP | 10-206867 | 8/1998 |
| JP | 10-319435 | 12/1998 |
| JP | 10-339883 | 12/1998 |
| JP | 11-002825 | 1/1999 |
| JP | 11-084336 | 3/1999 |
| JP | 11-119229 | 4/1999 |
| JP | 2000-036520 | 2/2000 |

* cited by examiner

Fig. 1
IPS
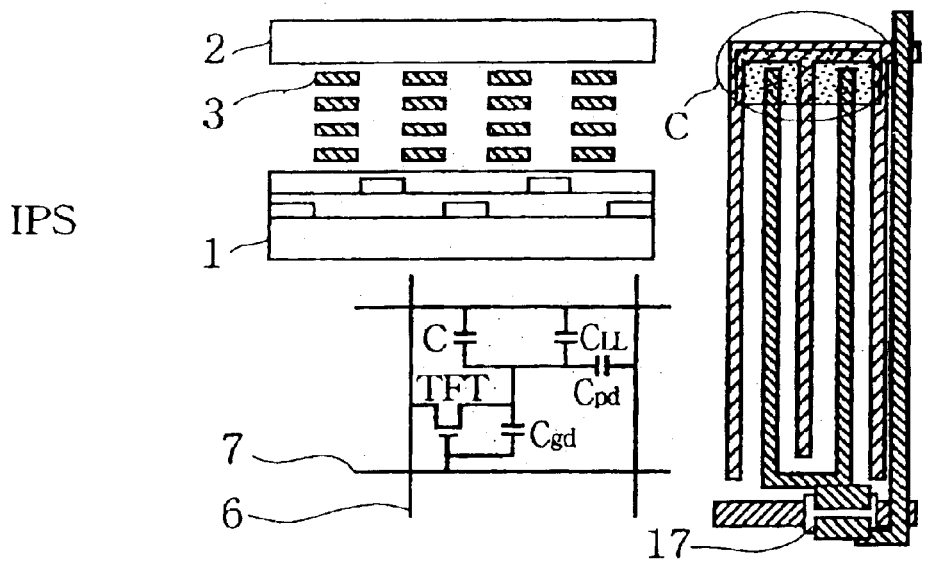
FFS
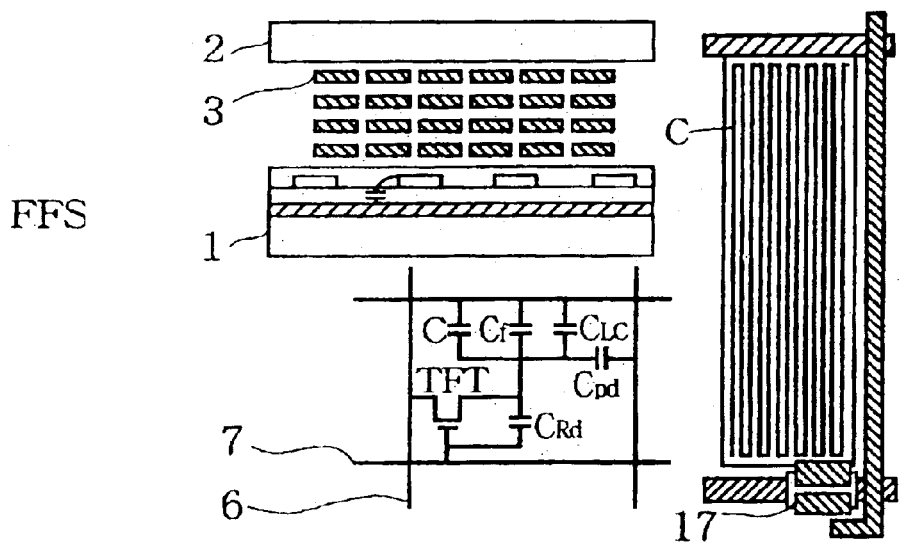
HS
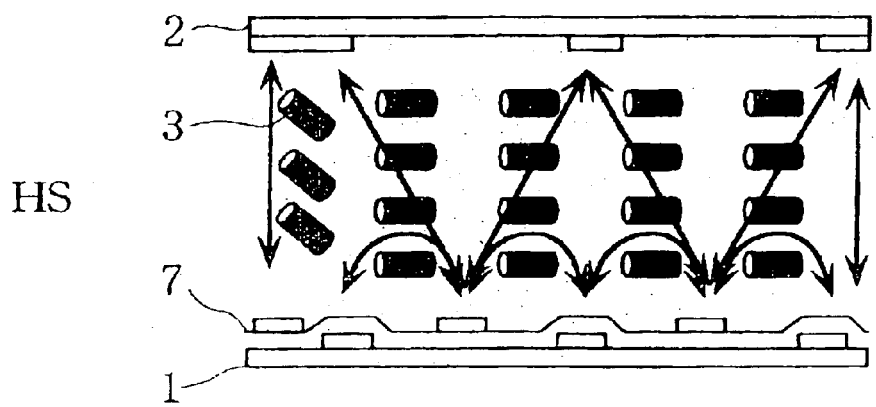

Fig. 3
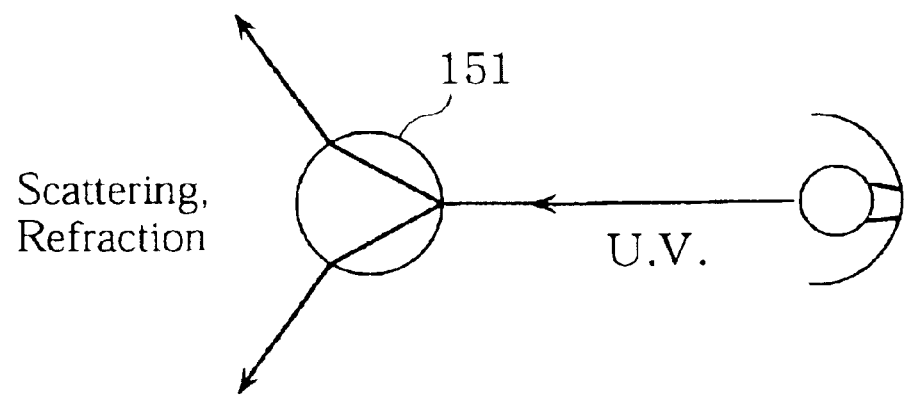
Scattering, Refraction
U.V.
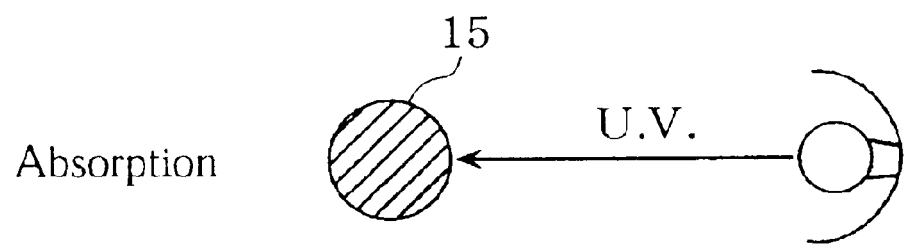
Absorption
U.V.

Fig. 19
(1)
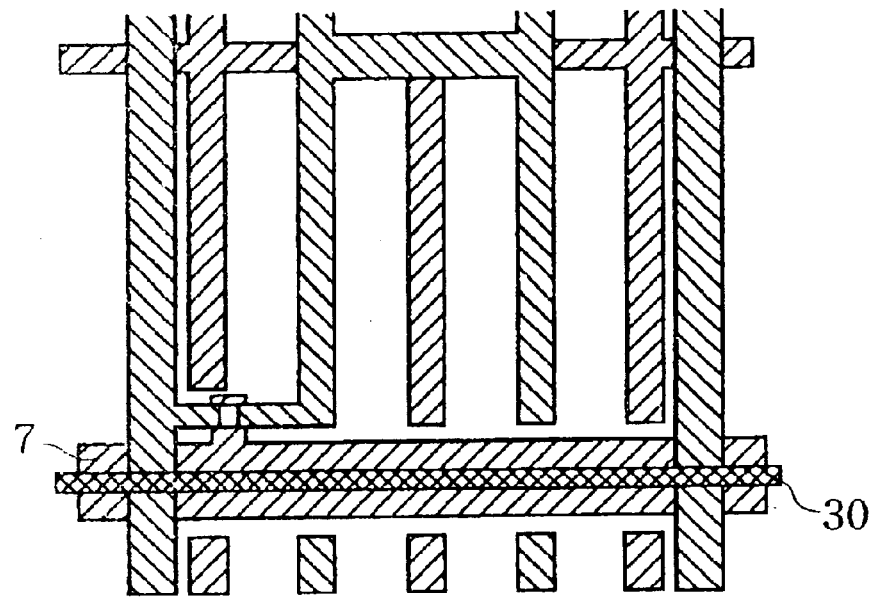
(2)
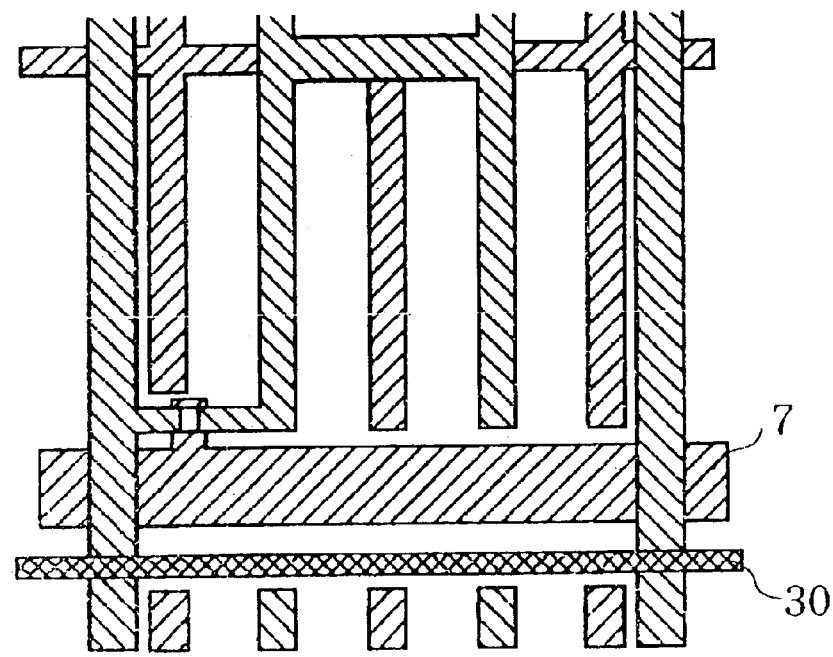

A-A Cross section

Fig. 22
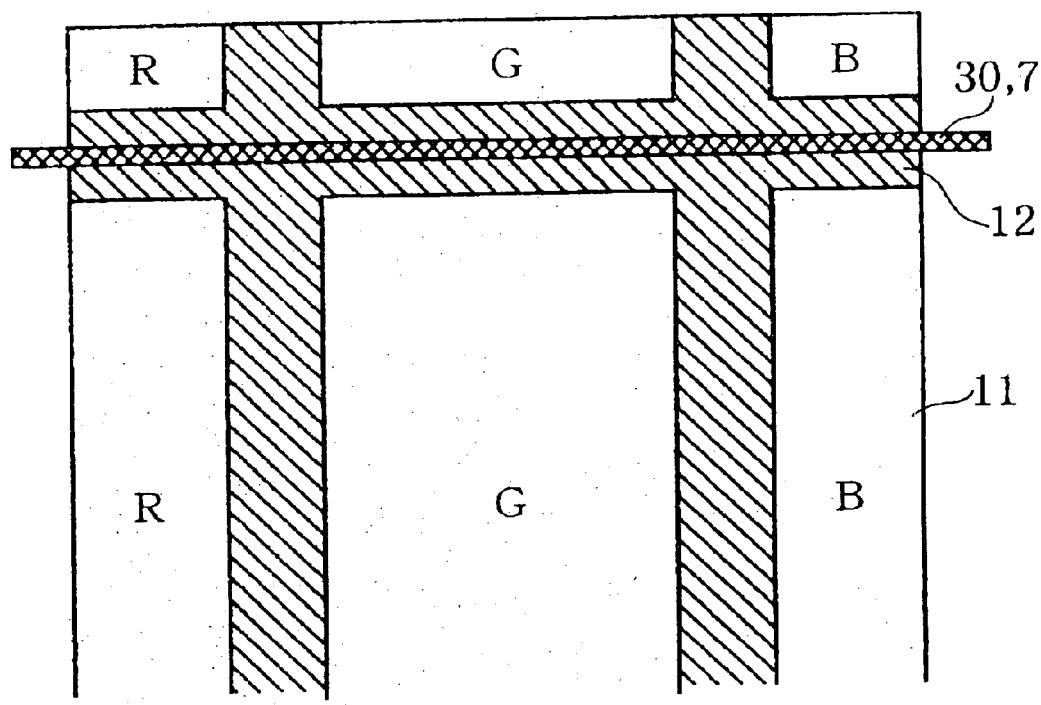
(1)
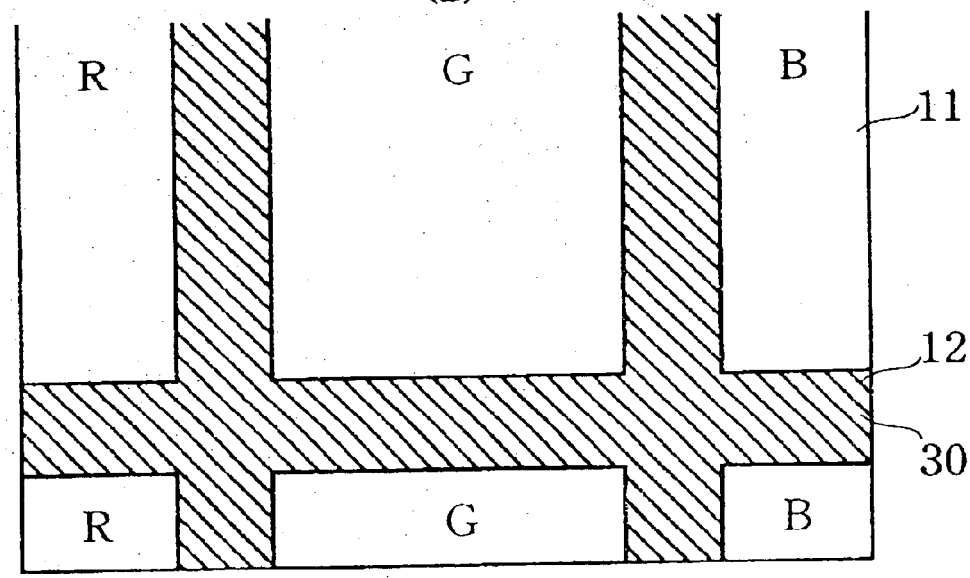
(2)

Fig. 27

| Schematic View | Embodiment (2-3-1) | Comparative Example 1 | Comparative Example 2 | Comparative Example 3 | Comparative Example 4 | Comparative Example 5 |
|---|---|---|---|---|---|---|
| 12, 10, 81, 8 | | | | | | |
| Size of Black Dot Nonuniformities | 0.1mm | 5.0mm | 5.0mm | 2.0mm | 2.0mm | 2.0mm |

Fig. 28
(1)
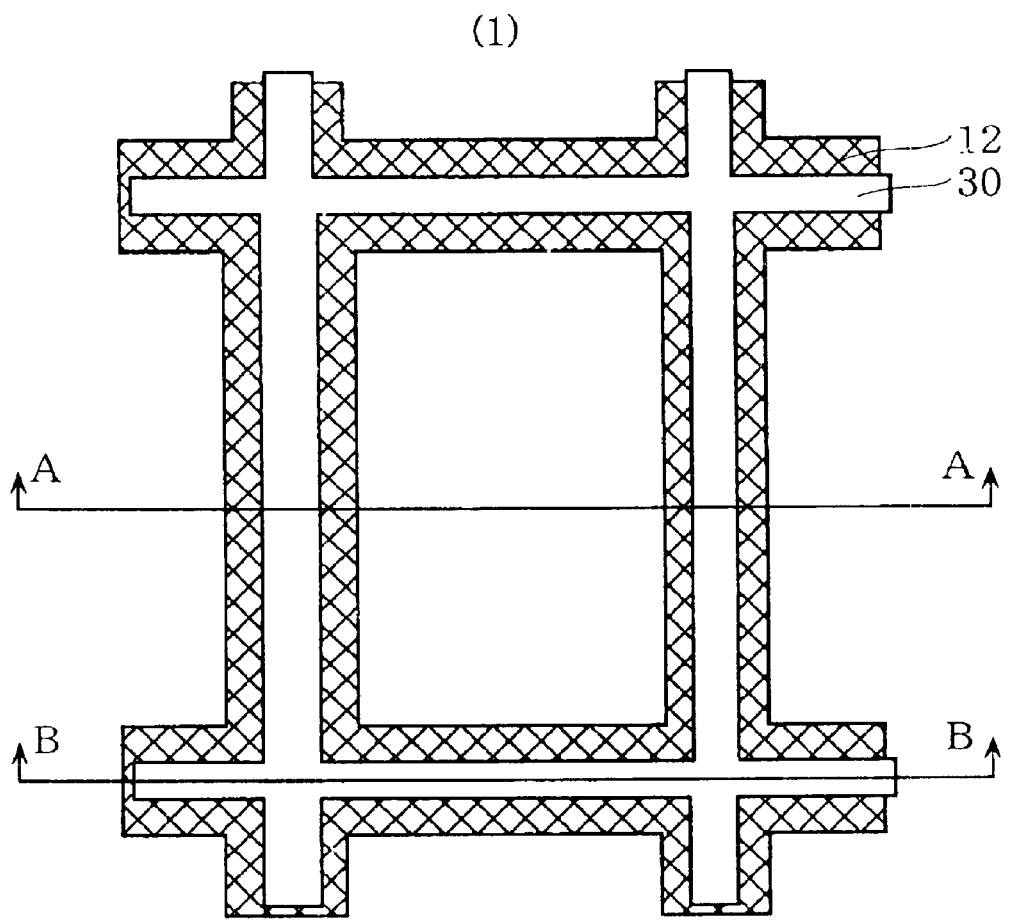
(2)
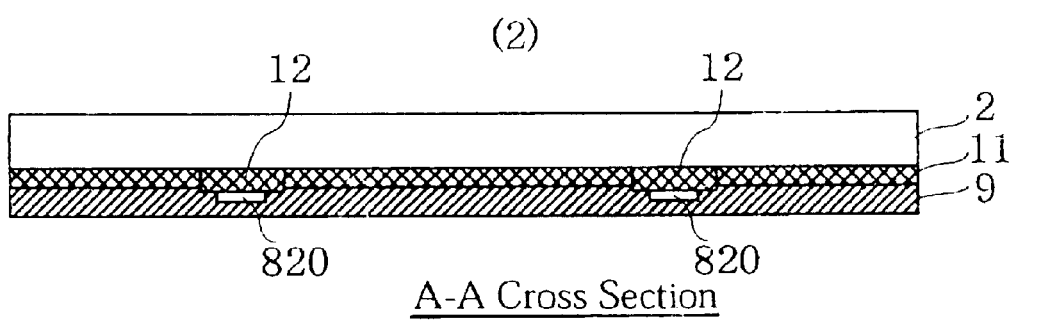
A-A Cross Section
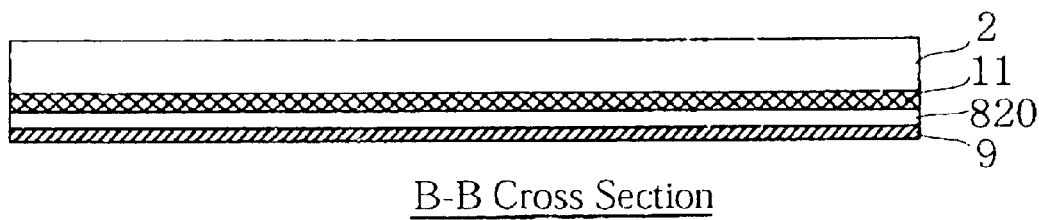
B-B Cross Section Fig. 29
(1)
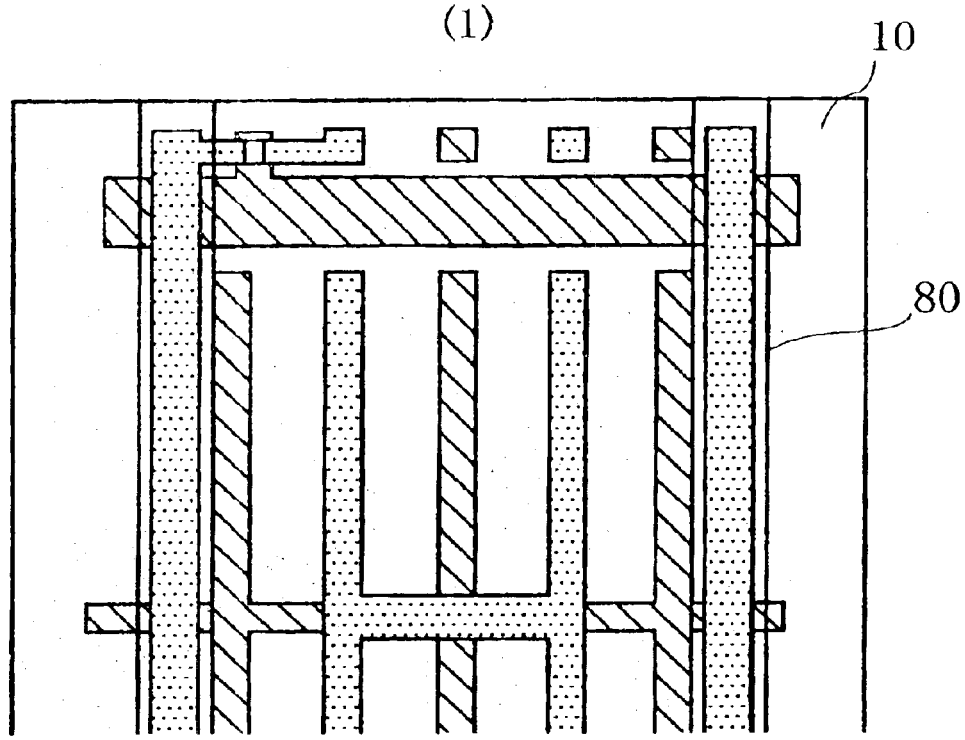
(2)
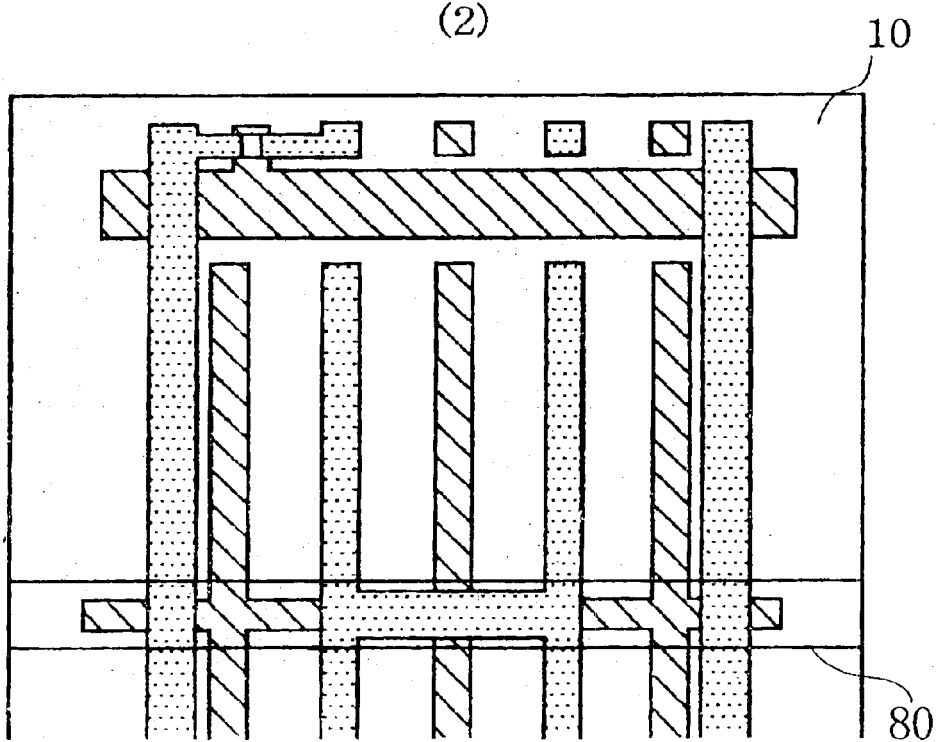

Fig. 30
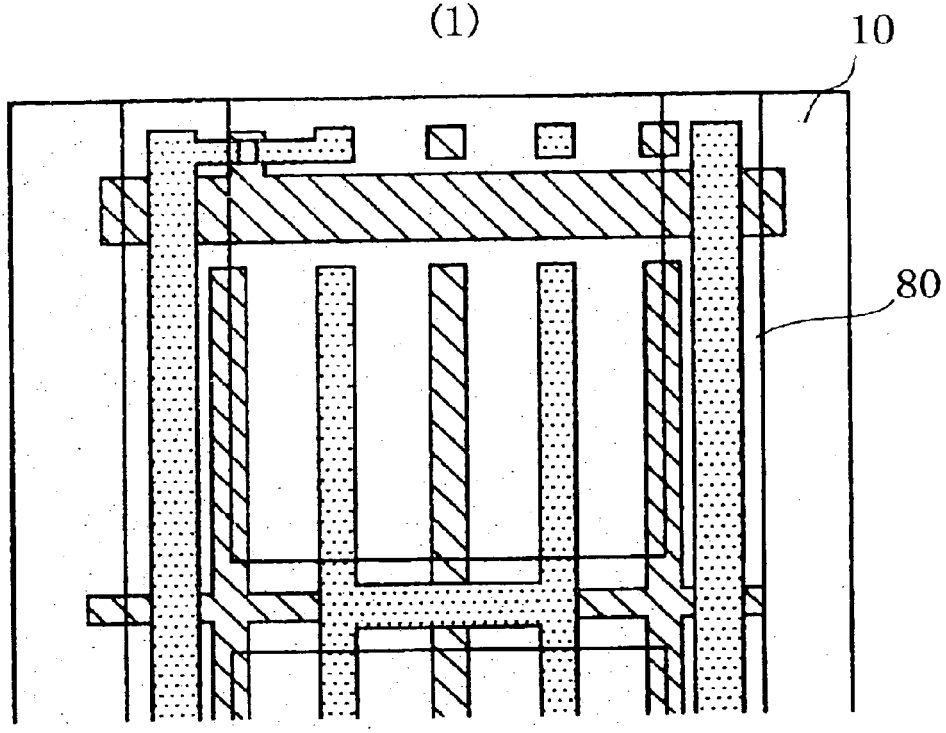
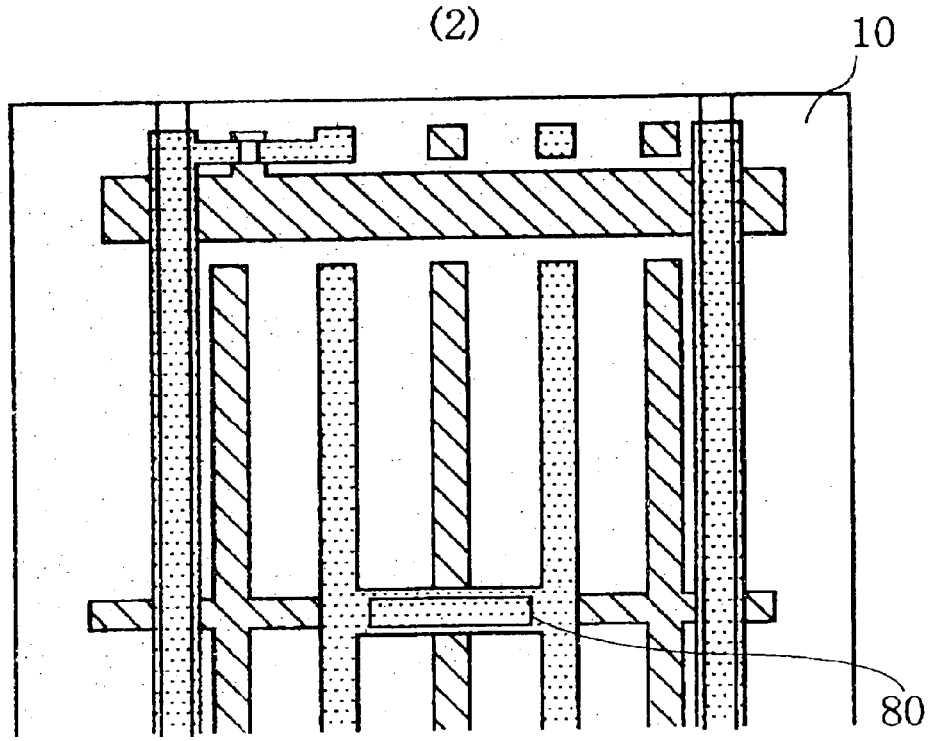

Fig. 32
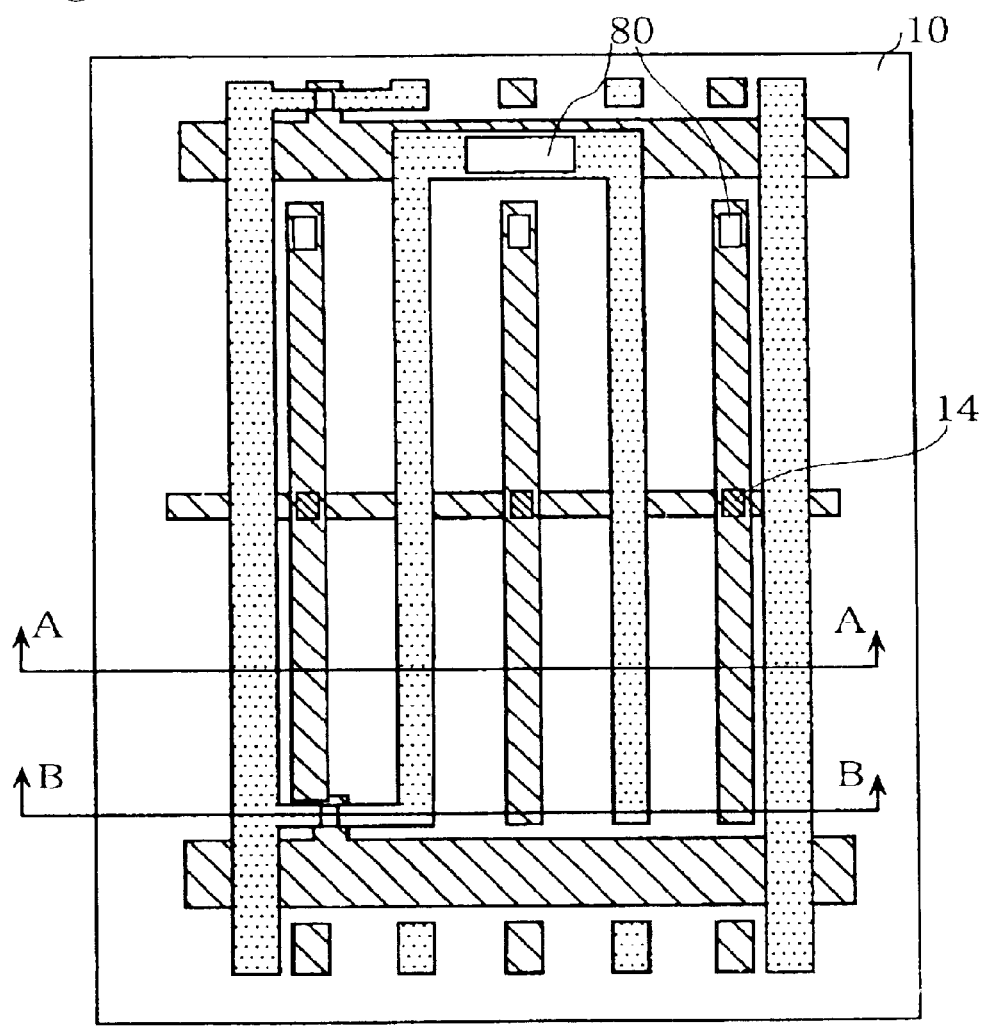
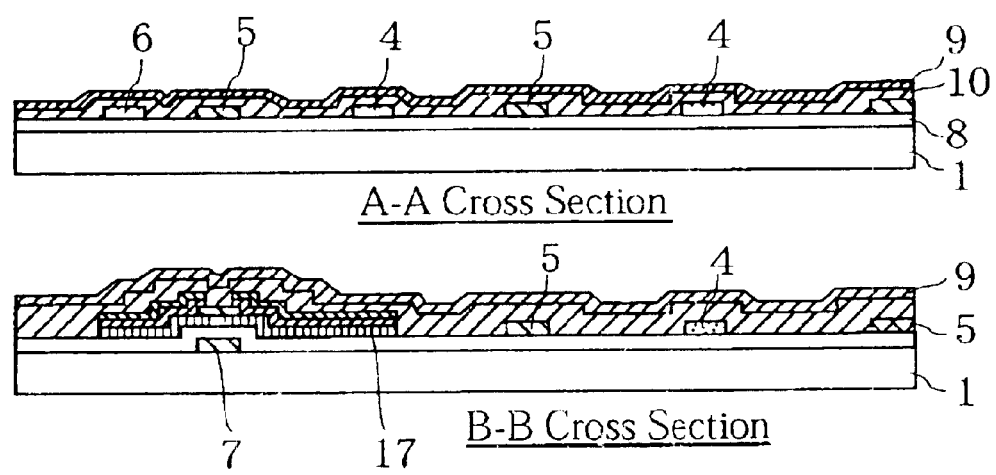
A-A Cross Section
B-B Cross Section

A-A Cross Section

B-B Cross Section

C-C Cross Section

Fig. 39
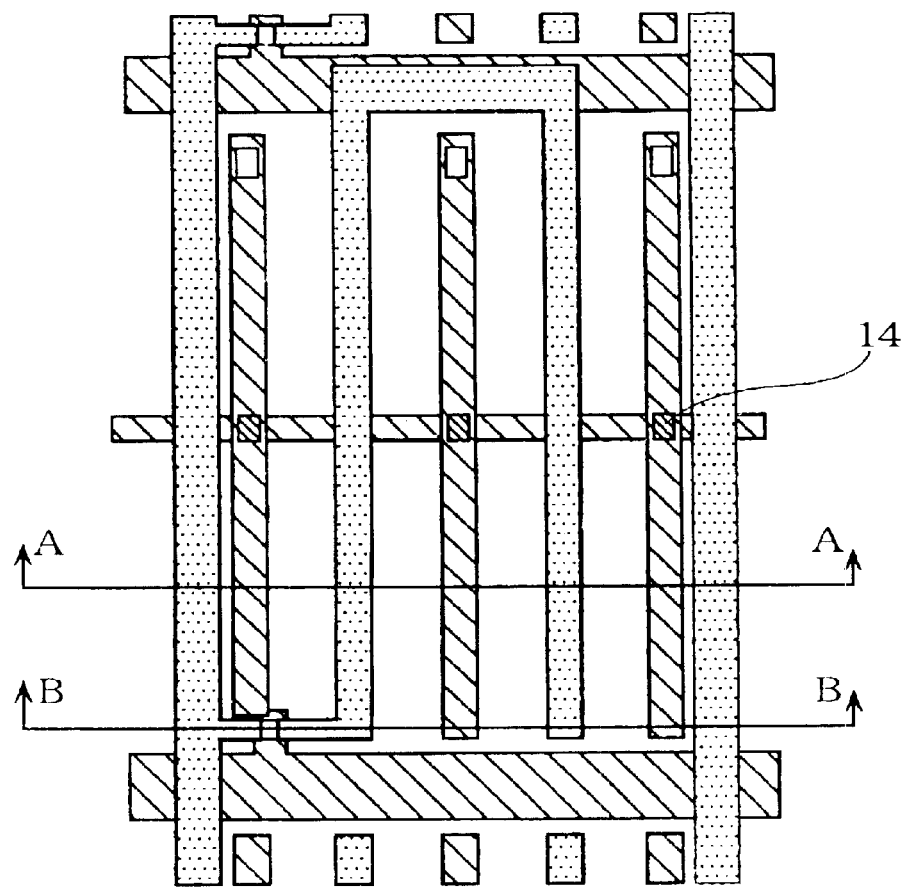
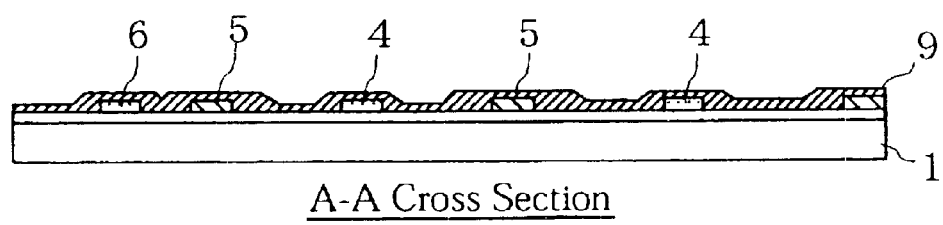
A-A Cross Section
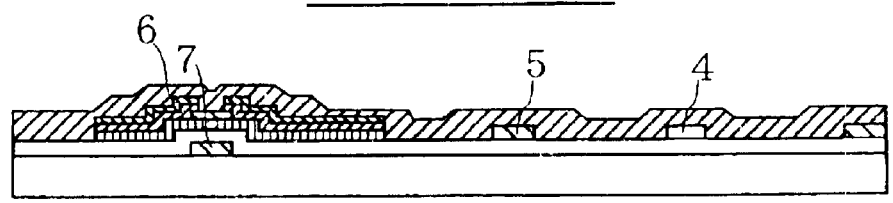
B-B Cross Section

Fig. 43
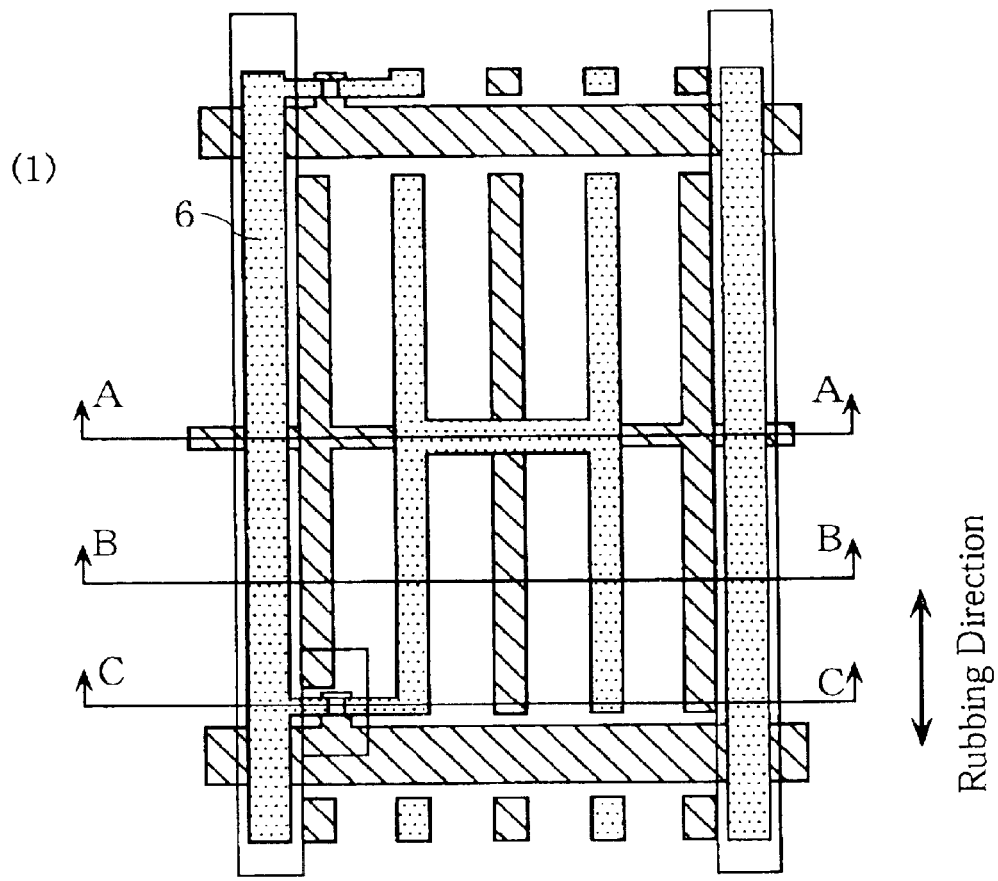
(1)
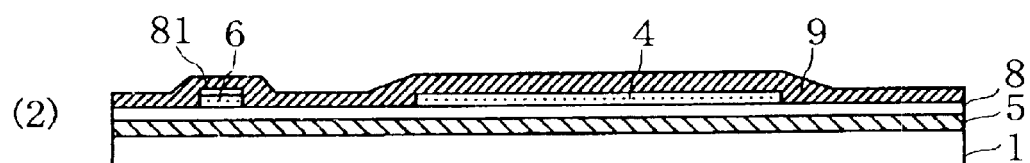
(2) A-A Cross Section
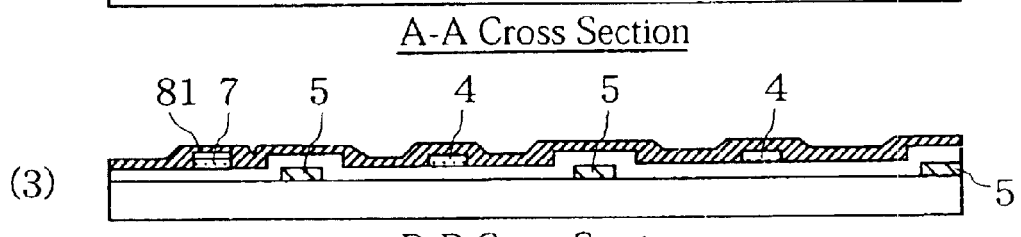
(3) B-B Cross Section
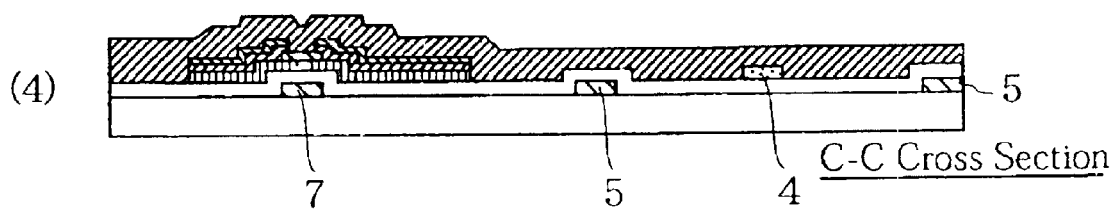
(4) C-C Cross Section A-A Cross Section B-B Cross Section C-C Cross Section Fig. 48
(1)
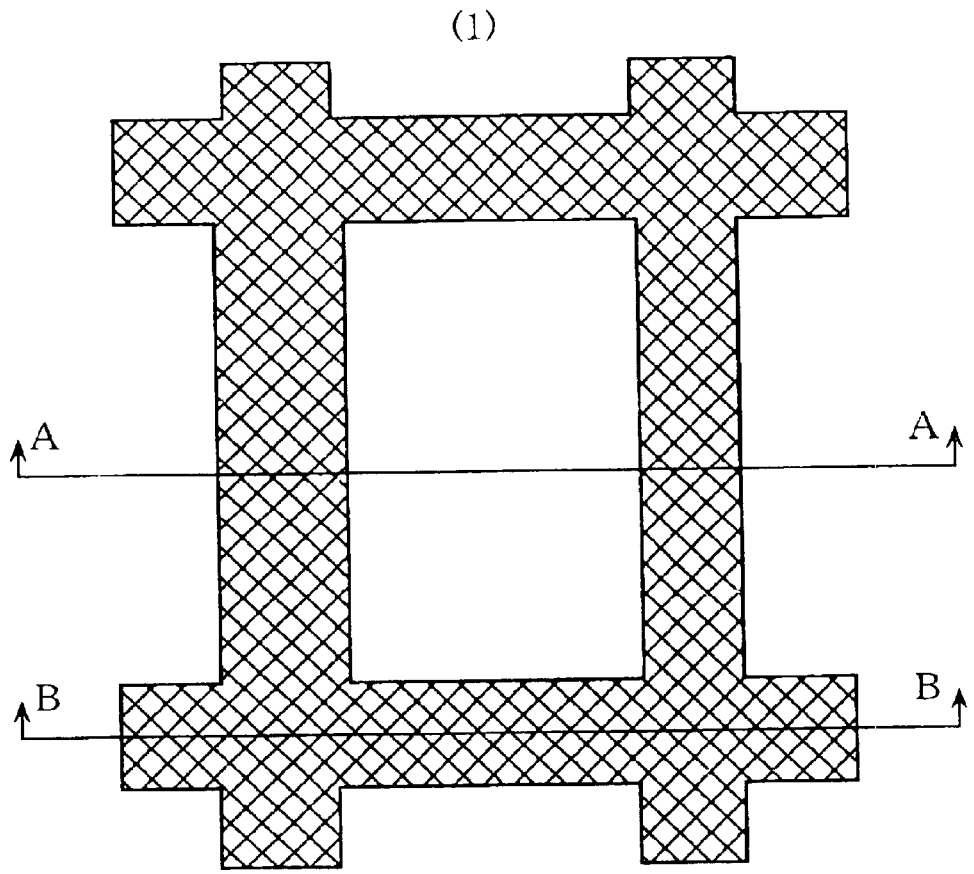
(2)
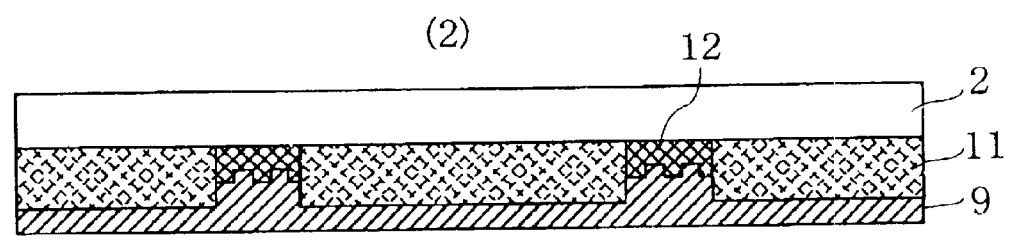
A-A Cross Section
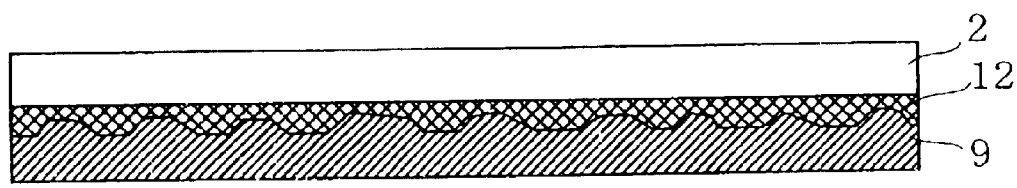
B-B Cross Section Fig. 50
(1)
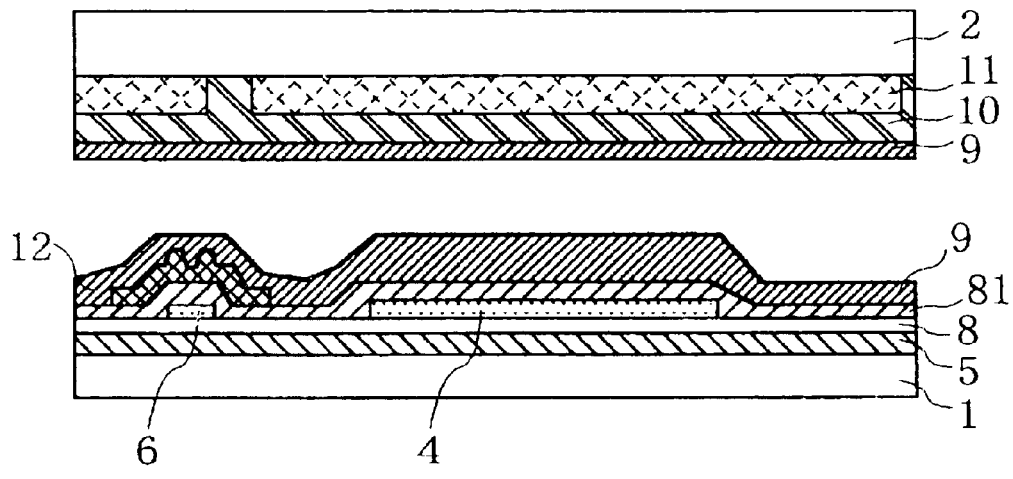
A-A Cross Section
(2)
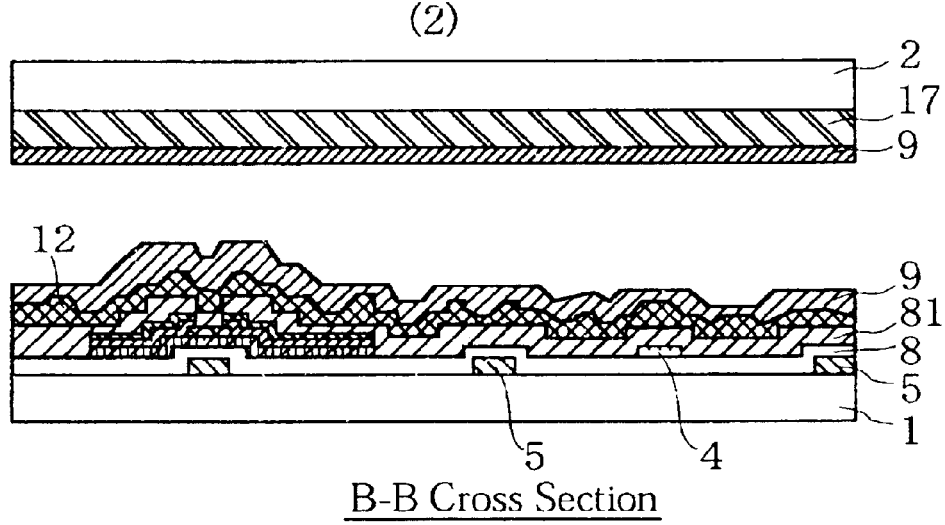
B-B Cross Section
(3)
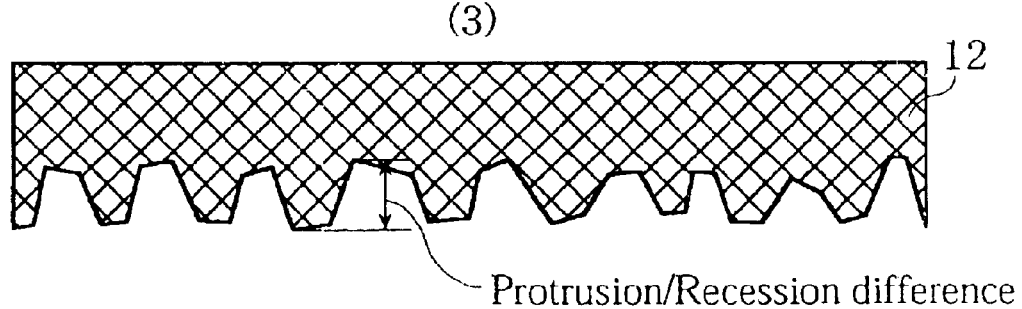
Protrusion/Recession difference Fig. 53
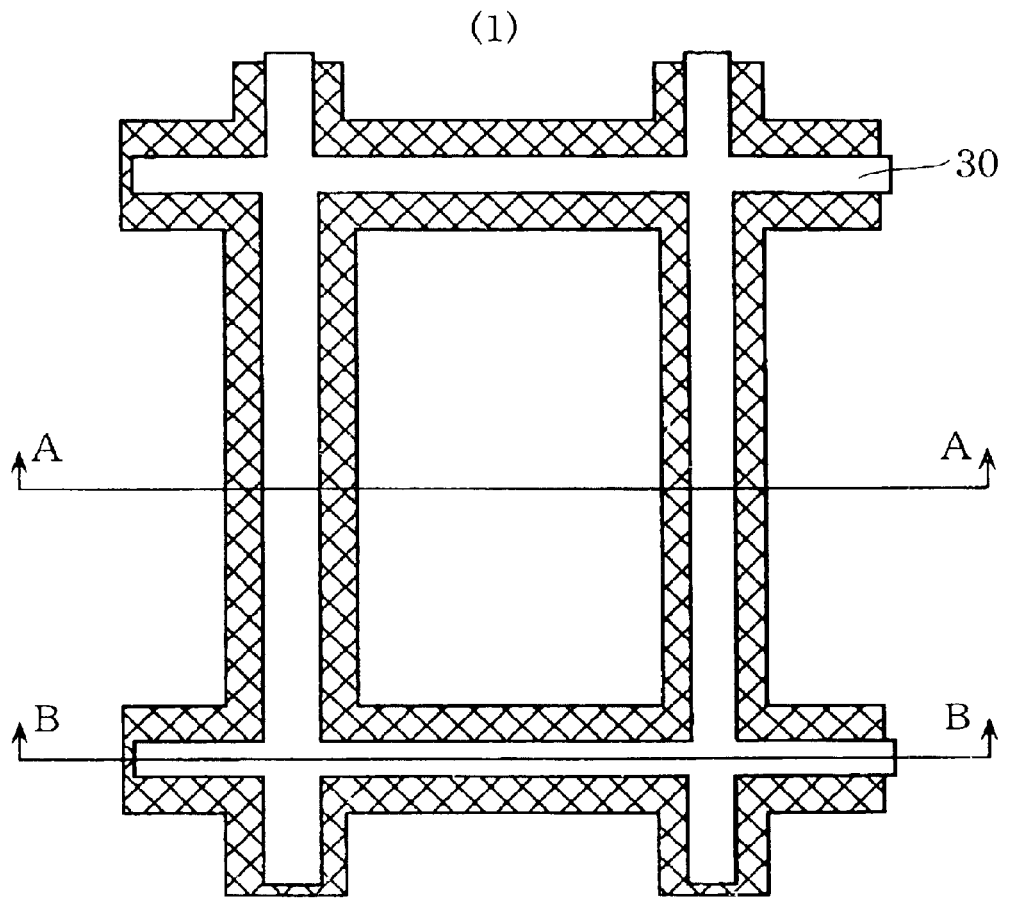
(1)
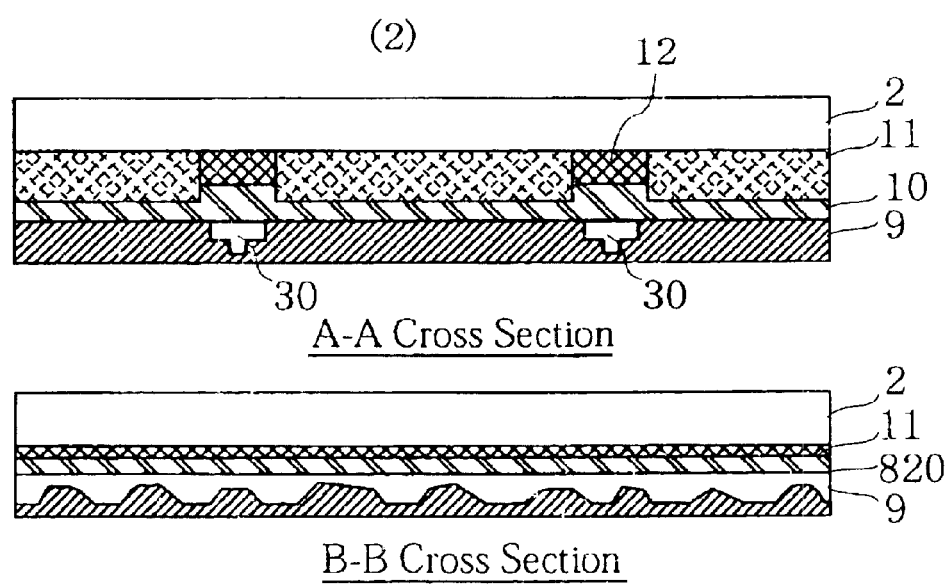
(2)
A-A Cross Section
B-B Cross Section Fig. 54
(1)
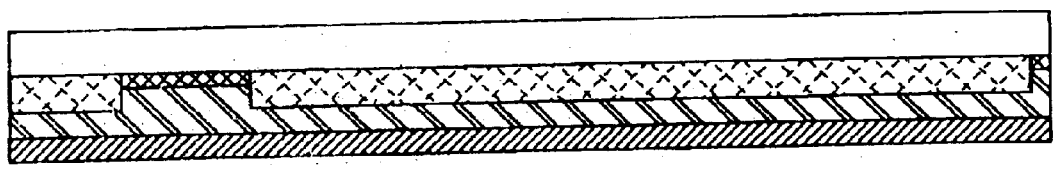
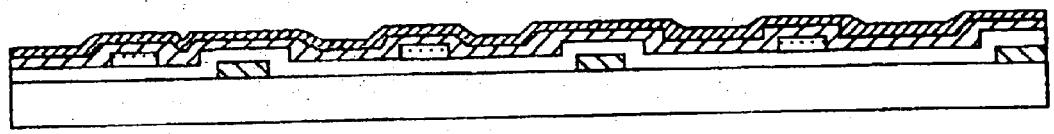
(2)
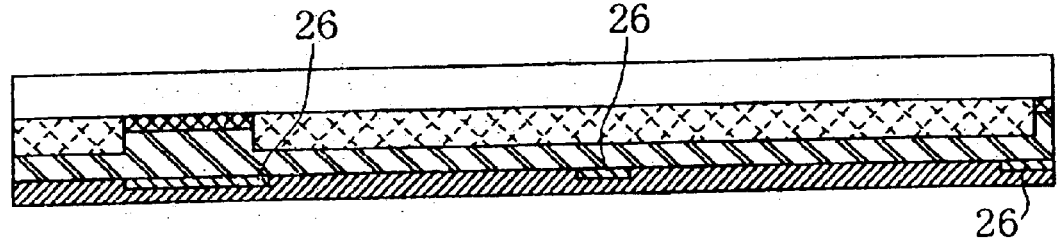
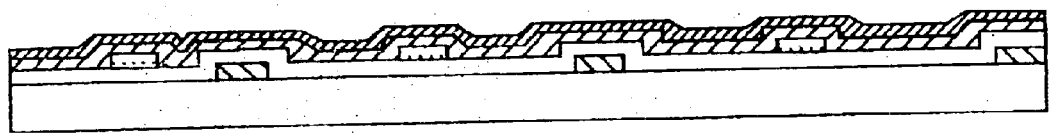

A-A Cross Section

Fig. 56
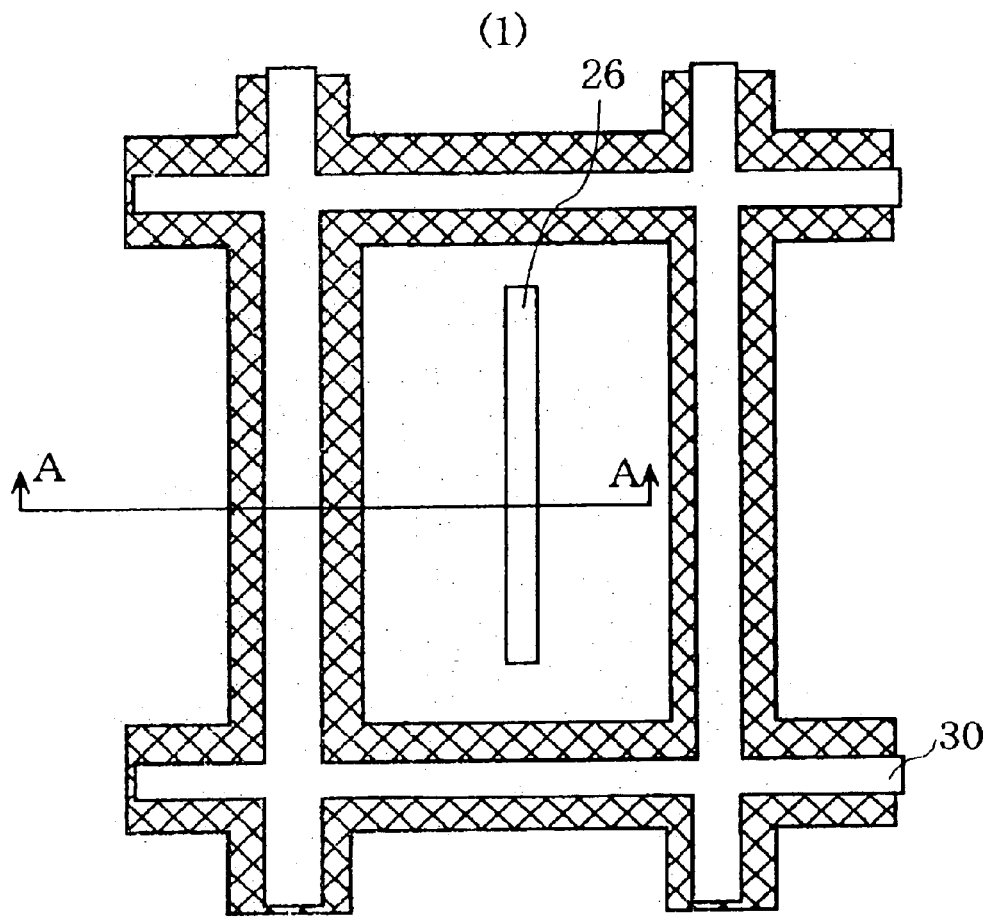
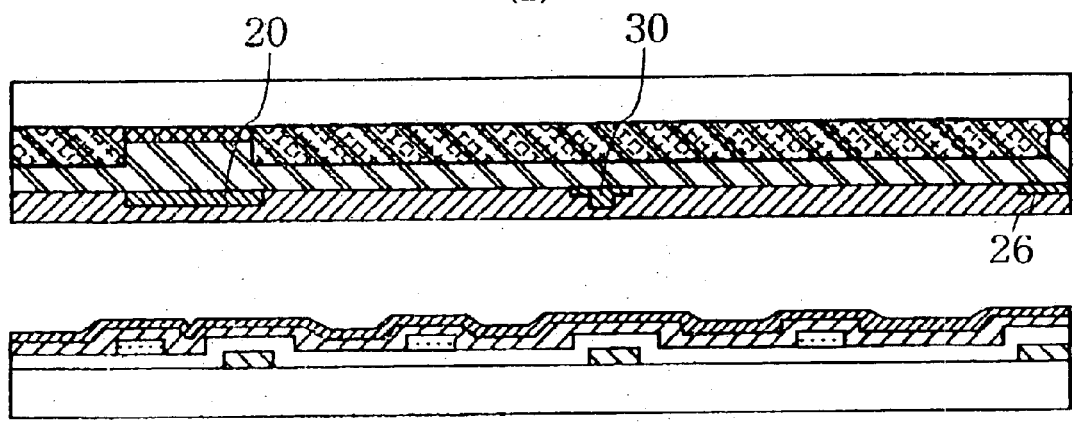

Fig. 57
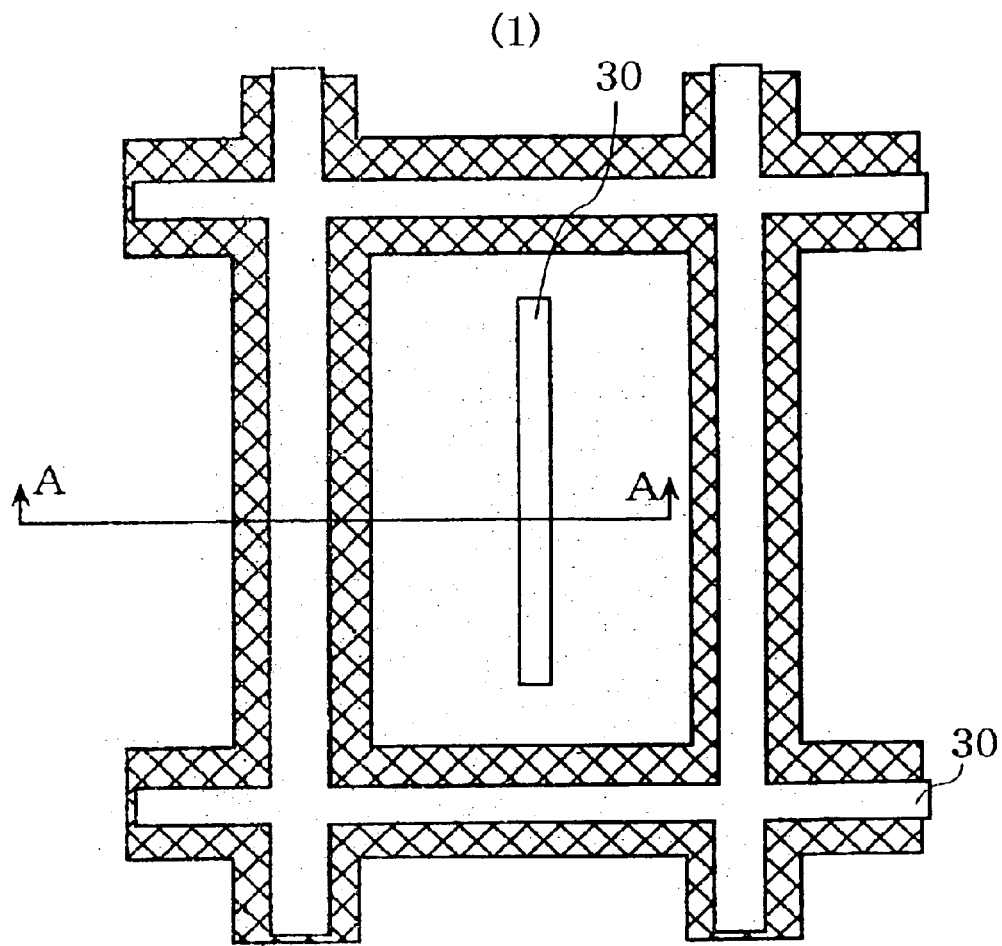
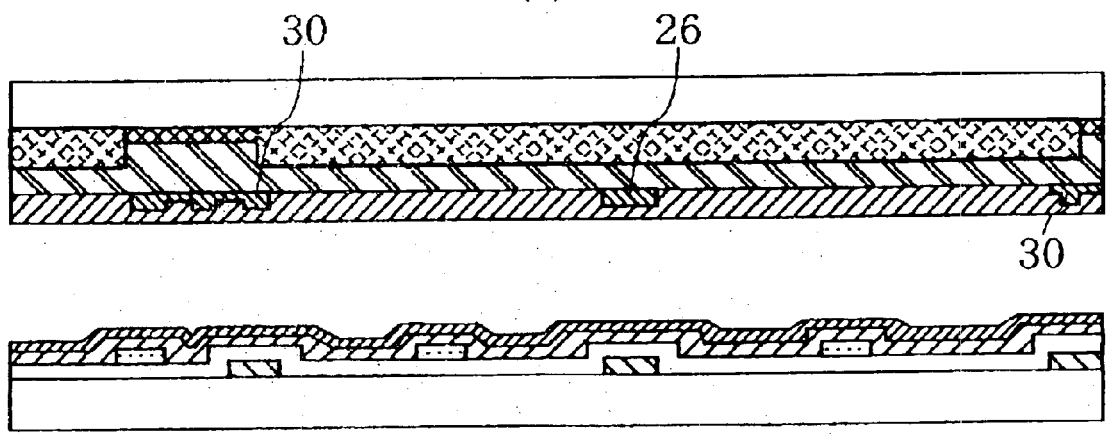

Fig. 58
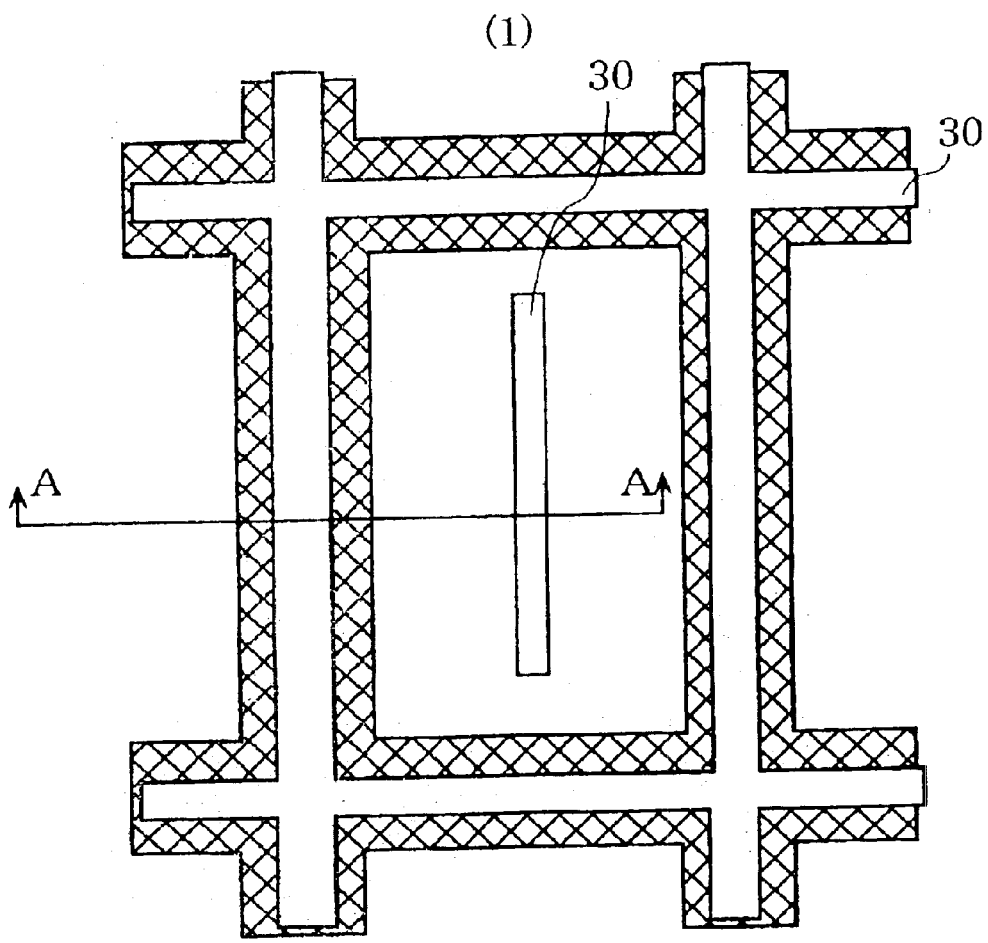
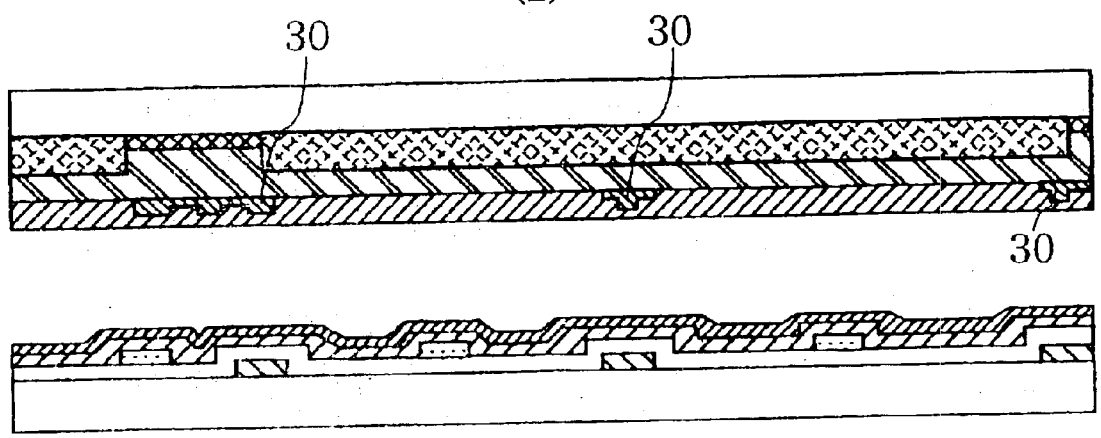

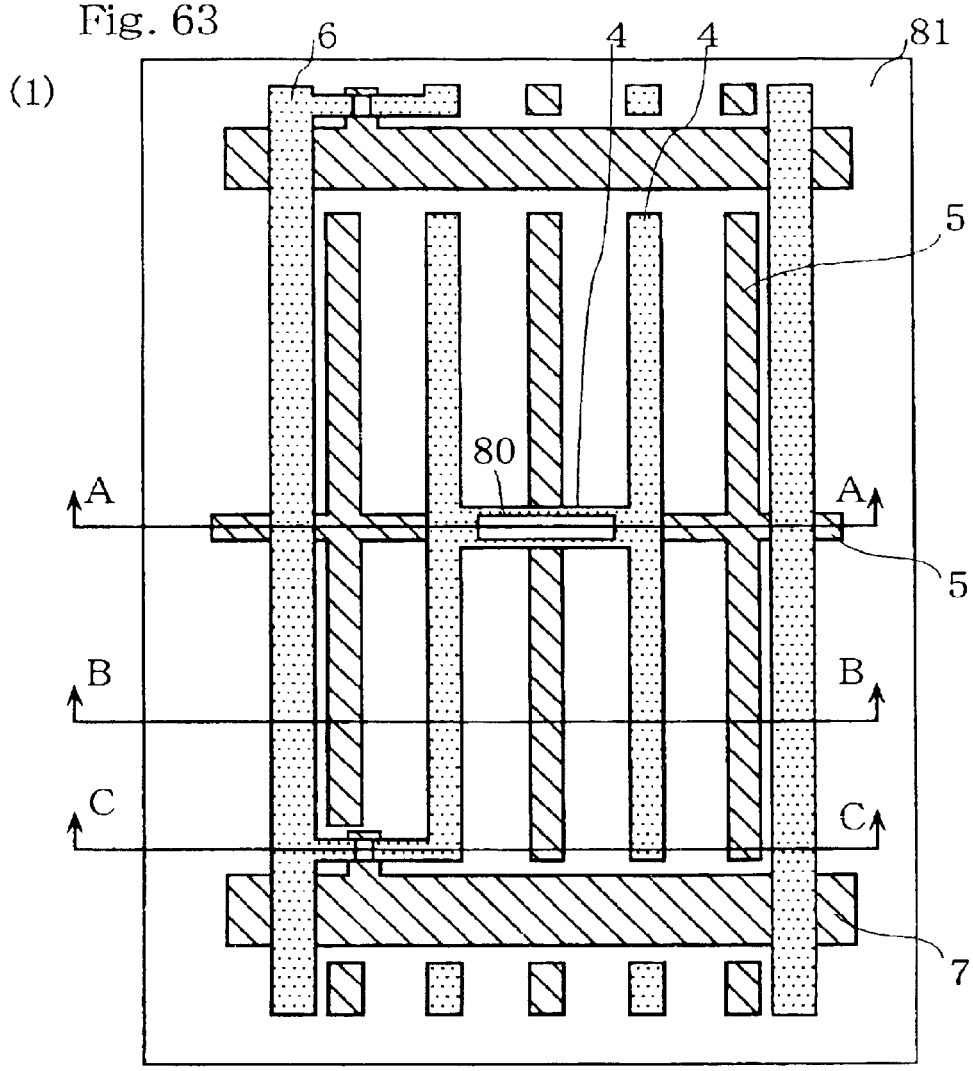
Fig. 63
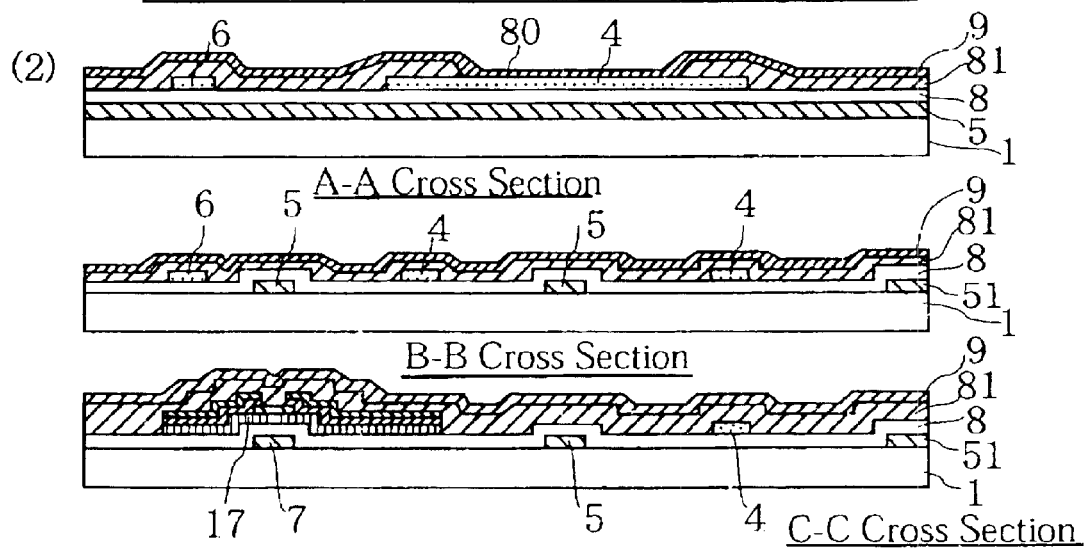

Fig. 64
(1)
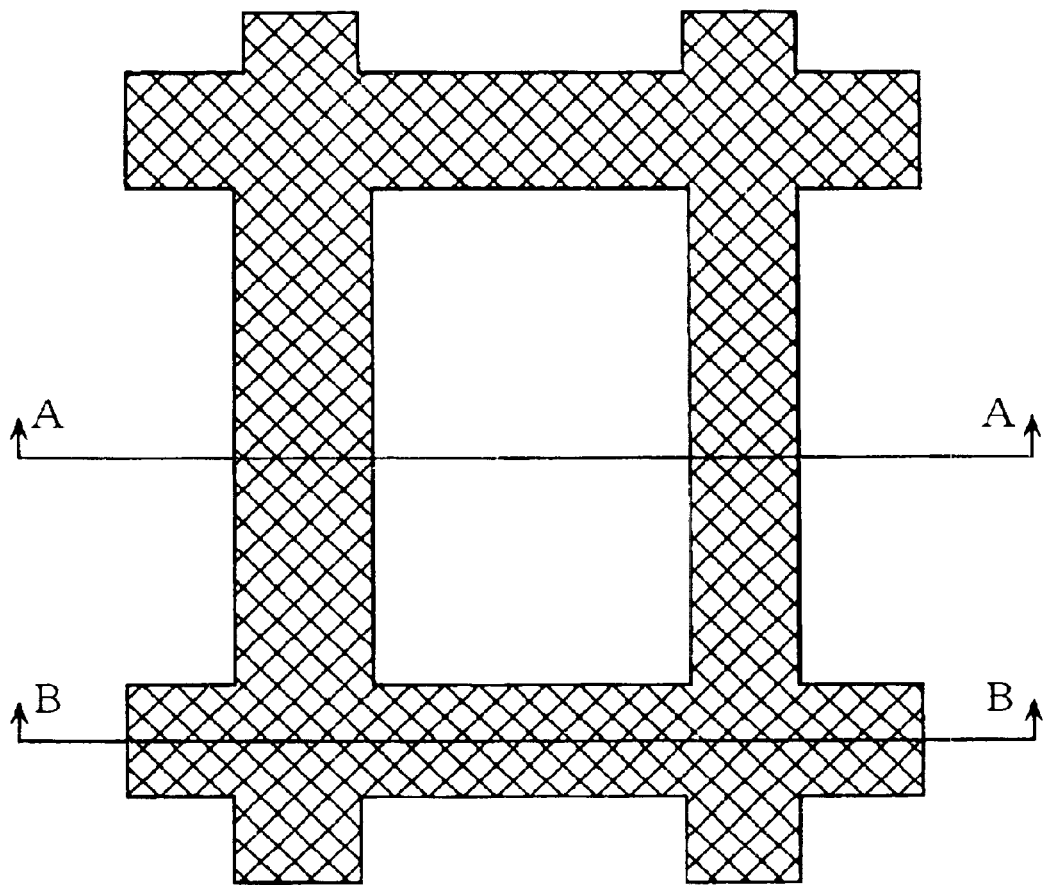
(2)
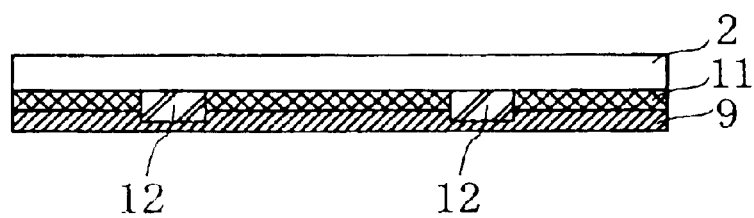
A-A Cross Section
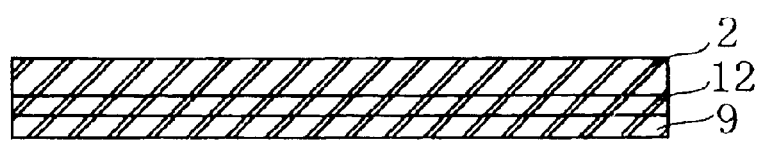
B-B Cross Section

Fig. 65

| | Embodiment (2-7-1) | Comparative Example 1 | Comparative Example 2 | Comparative Example 3 |
|---|---|---|---|---|
| Schematic View | | | | |
| Size of Black Dot Nonuniformities | 0.1mm | 5.0mm | 2.0mm | 2.0mm |

Fig. 66
(1)
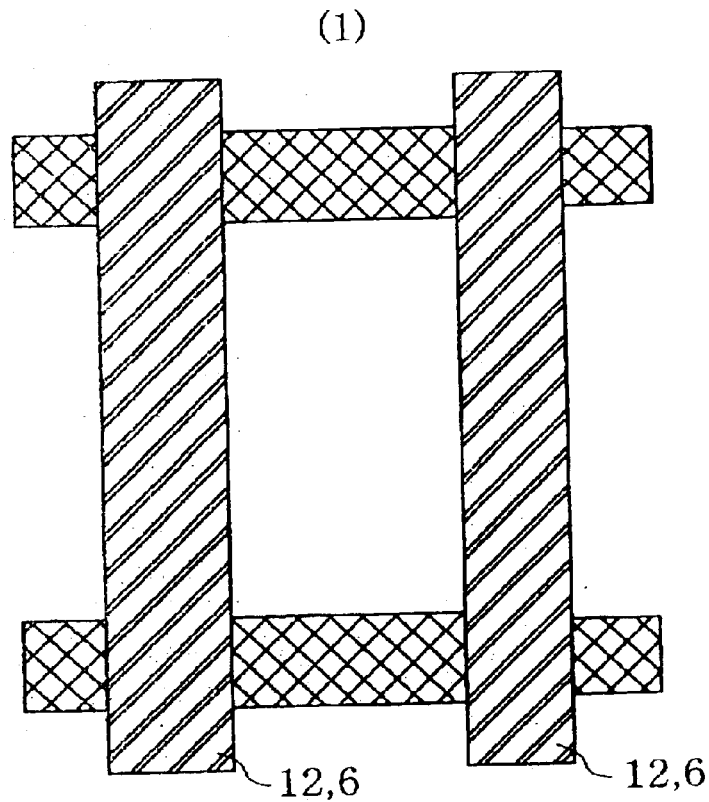
12,6    12,6
(2)
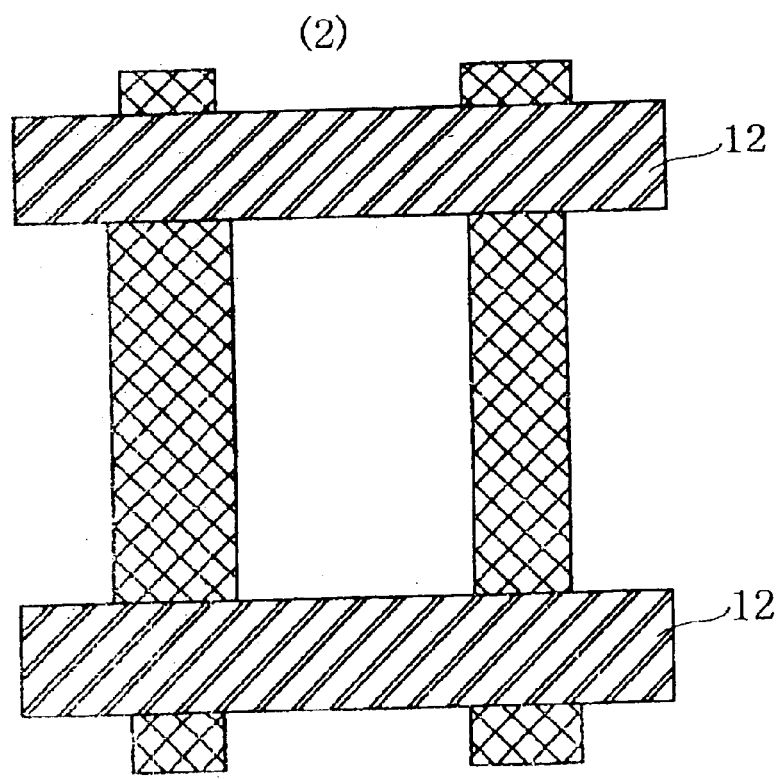
12
12

Fig. 68
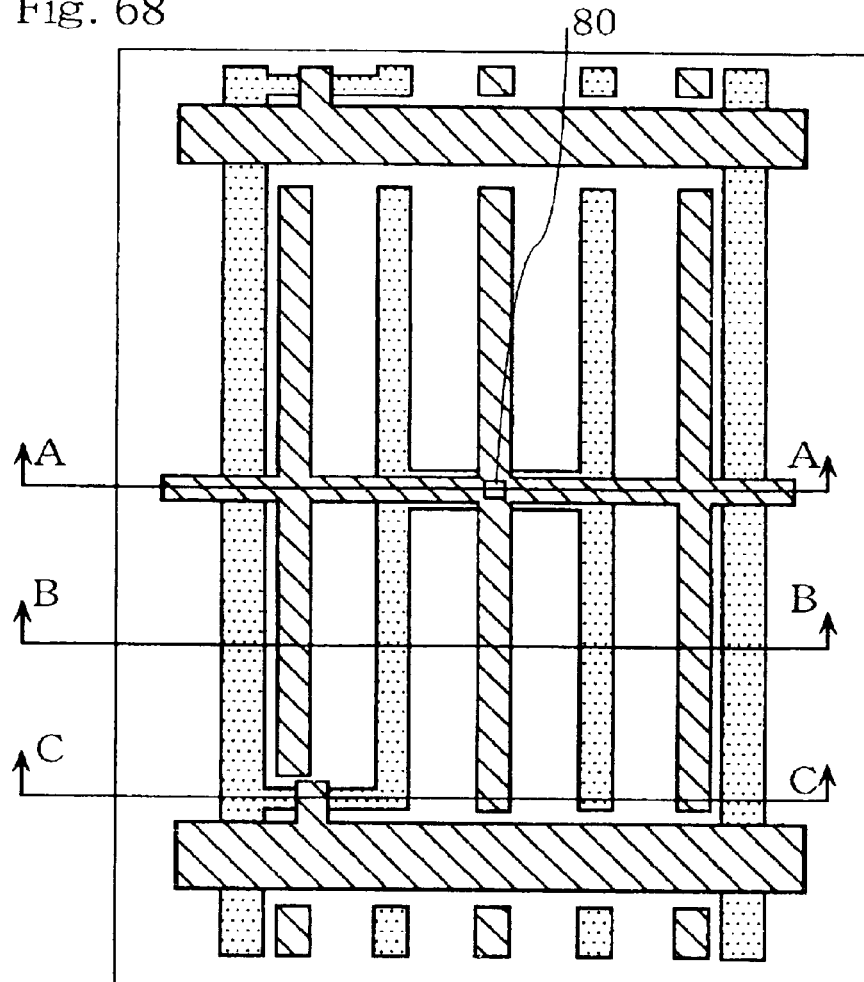
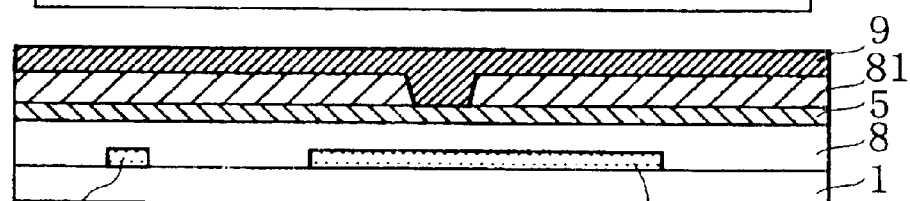
A-A Cross Section
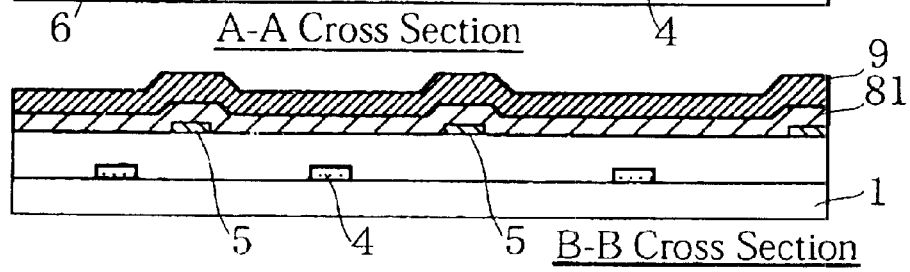
B-B Cross Section
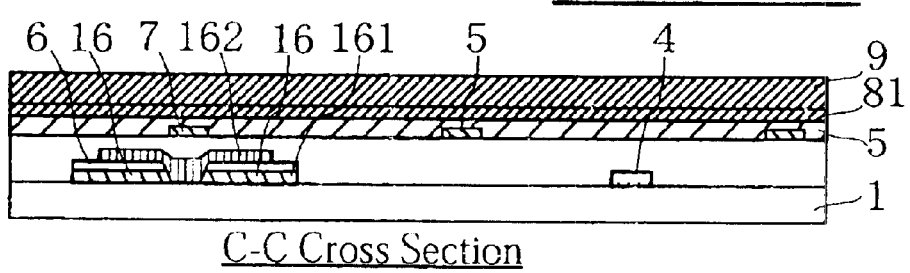
C-C Cross Section Fig. 69
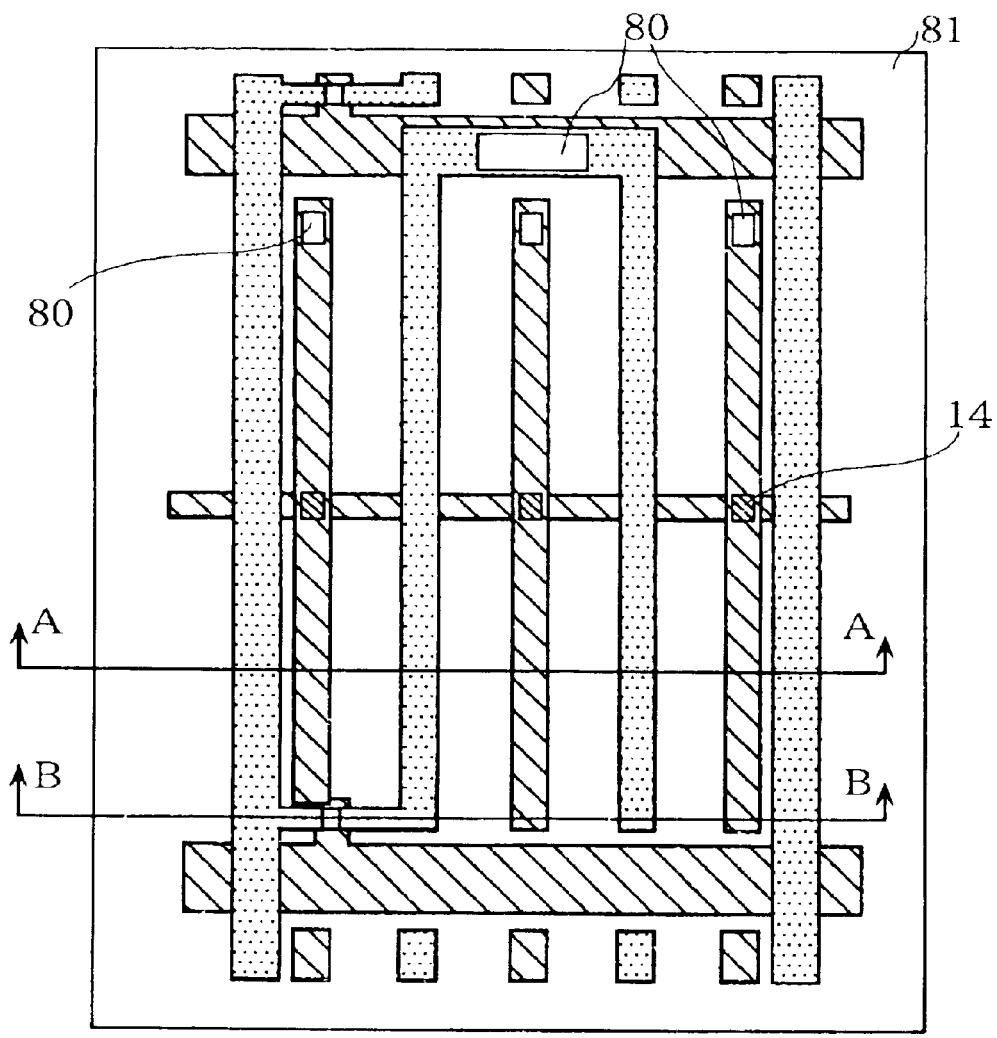
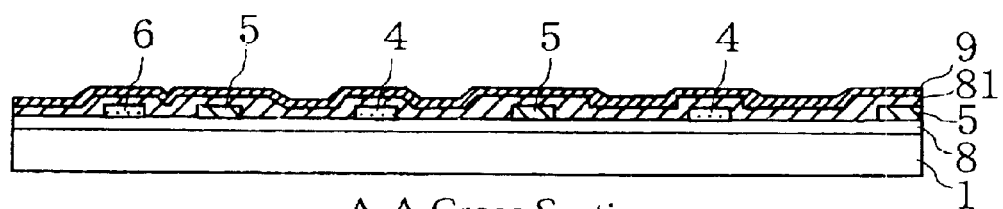
A-A Cross Section
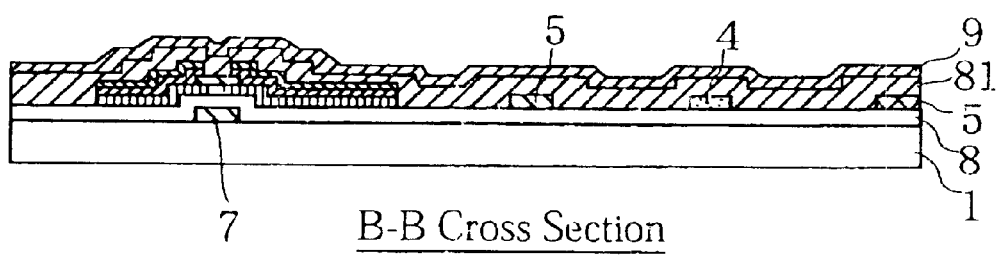
B-B Cross Section Fig. 74
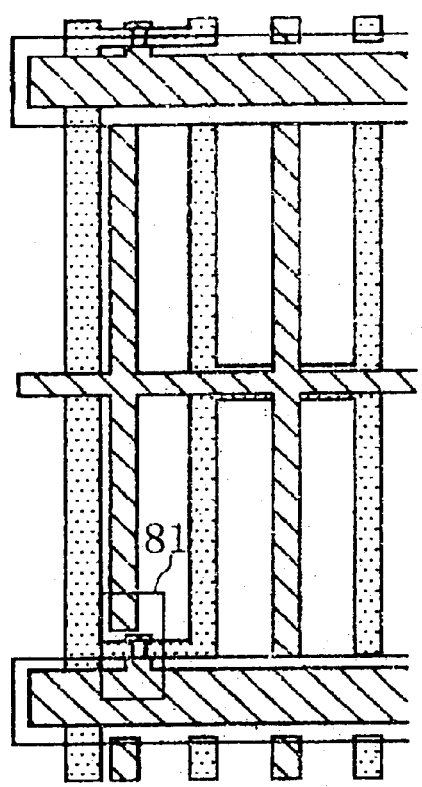
(1)
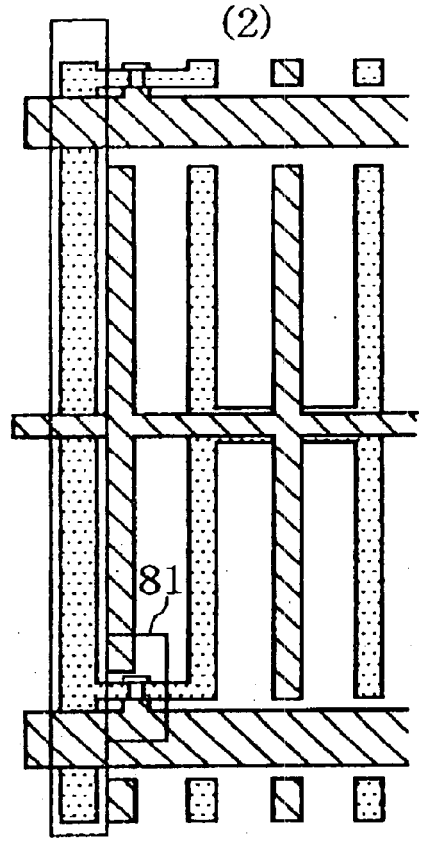
(2)
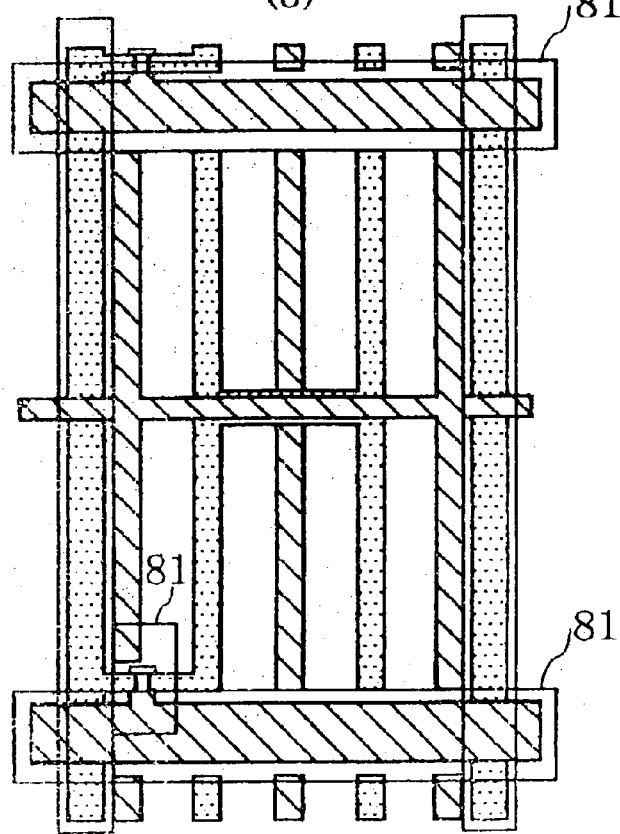
(3)

Fig. 75
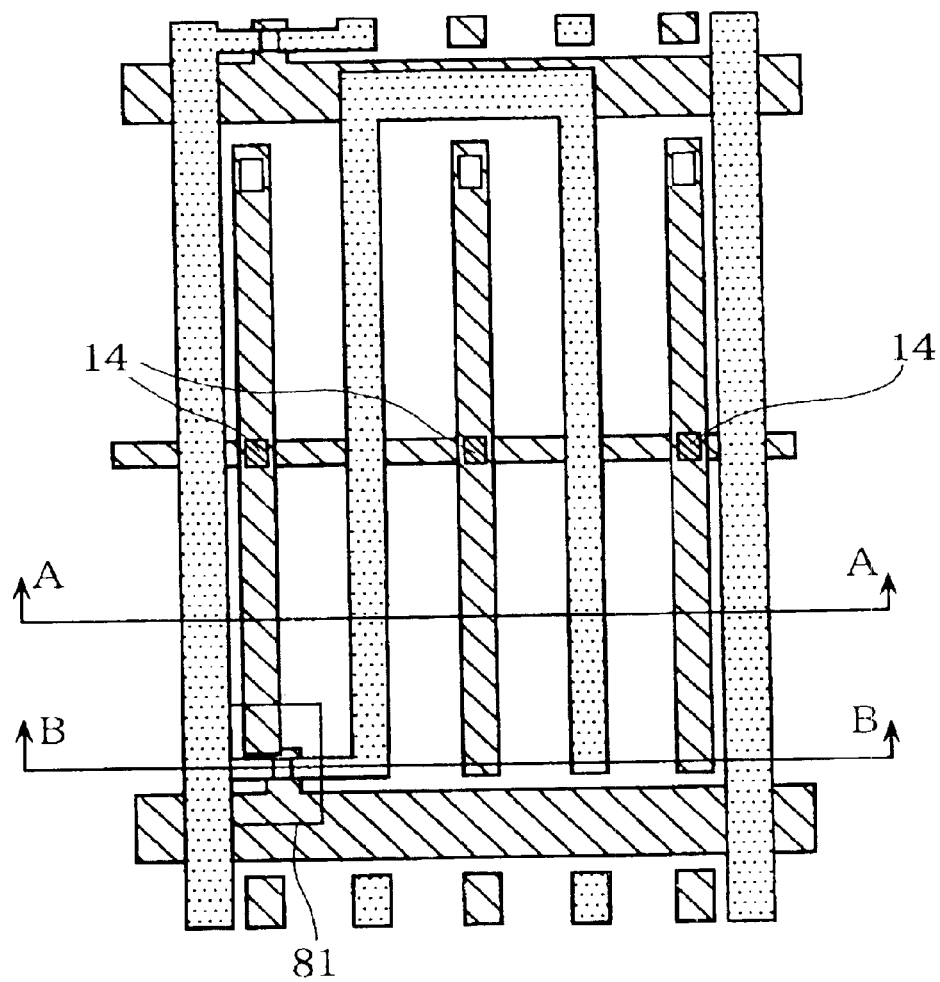
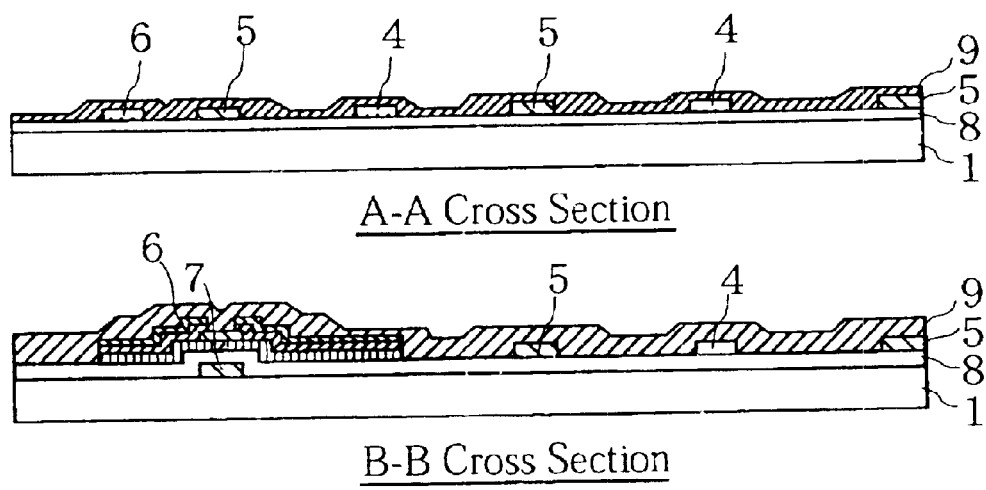
A-A Cross Section
B-B Cross Section

C-C Cross Section

Fig. 82
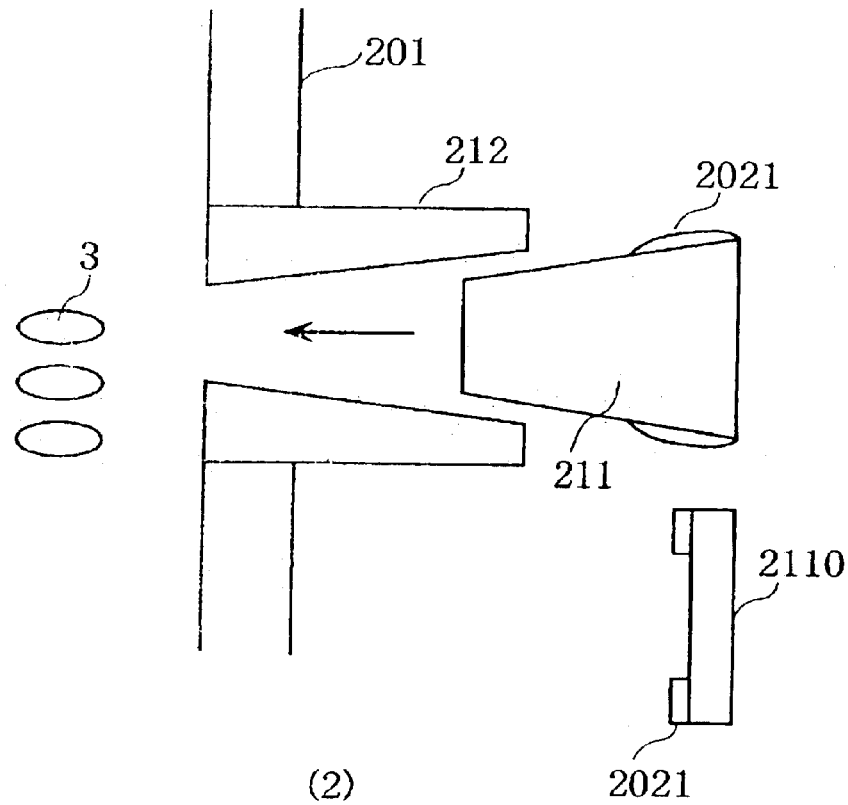
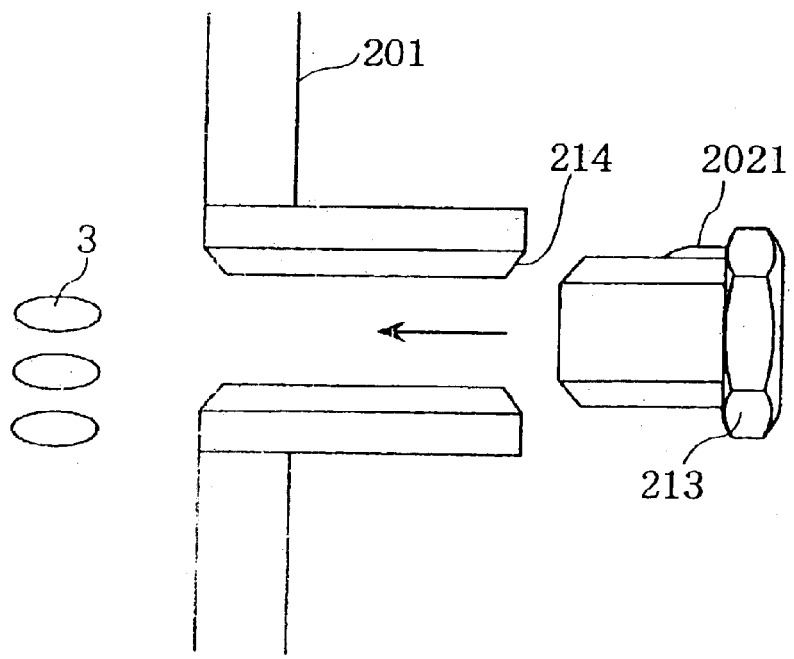

Fig. 83
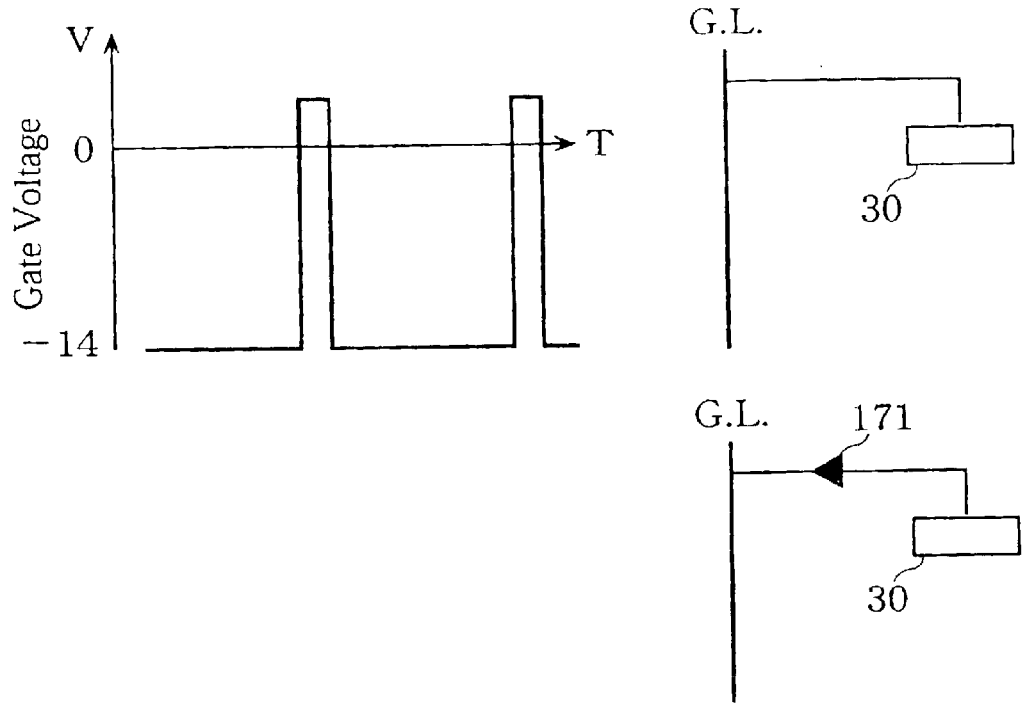
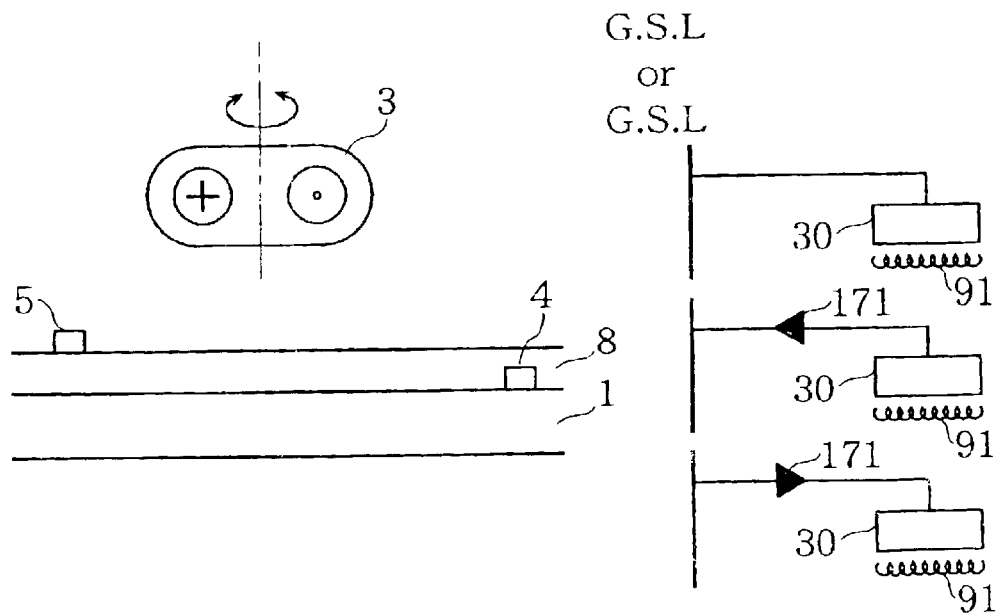

METHOD FOR MANUFACTURING AN IN-PLANE ELECTRIC FIELD MODE LIQUID CRYSTAL ELEMENT

TECHNICAL FIELD

The present invention relates to a liquid crystal element, and in particular to an in-plane electric field mode liquid crystal element.

BACKGROUND ART

Liquid crystal elements, and particularly liquid crystal display devices, are used not only in monitors for notebook computers and desktop computers but also in the display portion and portions related to the display portion of various apparatuses, including the viewfinder of video cameras and in projections displays, and recently they have come to be used as the display portion of televisions as well. Moreover, they are also utilized as optoelectronic-related elements such as optical printer heads, optical Fourier transform elements, and light valves.

Presently, liquid crystal elements are most often used in display devices, and typical liquid crystal display modes include the TN (twisted nematic) mode, the VA (vertical alignment) mode, and the IPS (in-plane-switching) mode.

Of these, the IPS mode, which is also called the in-plane electric field mode and the comb electrode mode, is characterized in that the liquid crystal molecules are orientated substantially parallel to the substrate surface so that by generating an electric field parallel to the substrate surface the liquid crystal molecules are rotated within the substrate surface, and therefore there are few changes in brightness due to the viewing angle direction, which in turn results in excellent viewing angle properties ("Liquid Crystal Display Technologies", pg. 4, published by Sangyo Tosho; also, JP H10-206867A).

In addition to the above, as an improved version of the IPS mode there is also the FFS (fringe field switching) mode, in which the electrode interval is narrowed and driving is performed using an oblique electric field, and the HS (hybrid switching) mode, in which electrodes are formed at opposing sides of the substrate and an oblique electric field is utilized. It should be noted that, strictly and purely technically speaking, both of these modes include features not present in the IPS mode, however, they share the object, configuration, and effect of the invention of the present application described below (or they can utilize the concept of the invention of the present application). For this reason, in the present specification, and especially in the scope of the claims, IPS mode or in-plane electric field mode also includes the FFS and HS modes.

For comparison, these three modes are illustrated in FIG. 1. In the drawing, numeral 1 is an array substrate, numeral 2 is an opposing substrate, numeral 3 is a liquid crystal, numeral 6 is a source line, numeral 7 is a scanning line, and numeral 17 is a thin film semiconductor. However, because the technical contents of these modes are so-called widely known technologies, a description of them has been omitted.

The filling of liquid crystal into the liquid crystal panel of not only the IPS mode is shown in FIG. 2. First, a belt 201 of sealing resin is printed thinly around the four corners of a single glass substrate 2 by printing, and the glass substrate 2 is aligned with a separate glass substrate 1 to form a cell. Next, liquid crystal is vacuum loaded into the cell through an injection port formed by leaving out a portion of the sealing resin, after which a UV curable resin 202 is applied to that injection port and the liquid crystal is sealed in. This is followed by curing the resin for sealing the port by UV light irradiation.

With this method, however, bubbles 151 or foreign matter 15 may be left in the gap of the injection port between the two glass substrates when applying the UV resin. If bubbles or the like are left, then, as shown in FIG. 3, the bubbles or foreign matter, for example, remaining in the UV curable resin scatter and refract or absorb the UV light during UV irradiation, and the UV curable resin behind the bubbles seen from the direction of UV irradiation is not sufficiently irradiated with UV light. The result is that not only does the UV resin at insufficiently irradiated portions simply remain uncured in this state, but the uncured resin disperses into the liquid crystal when used, and thus becomes a factor that lowers the long-term reliability of the liquid crystal element. Furthermore, countering this by irradiating the UV light from various directions complicates the process.

Also, continuously using a TFT liquid crystal display device of the IPS mode may cause display uniformities where, for a black-and-white display, what should originally be displayed white appears as black dots. These so-called black dot nonuniformities must be eliminated because they can significantly reduce the display quality. A method for countering and eliminating these black dot display nonuniformities is mentioned in JP-H10-206857A. According to this method, black dot nonuniformities are generated by an electrochemical reaction occurring at a cracked portion of the protective layer between the pixel electrode and the source signal line, which lowers voltage holding ratio in the liquid crystal layer due to the creation of ionic material and changes the arrangement of the liquid crystal. (Consequently, depending on whether the display mode is so-called normally white or normally black there can also be white dot display nonuniformities. Furthermore, in color displays, the color of display nonuniformities is not limited to black and white. For this reason, the concept referred in the present specification as "black dot display nonuniformities," for example, also encompasses "white or colored dot display uniformities resulting from a drop in voltage holding ratio.") The result is that black dot nonuniformities can be eliminated by making the protective layer thicker than the electrode or forming an organic polymer protective layer.

The following is a description of a conventional liquid crystal display device of the IPS mode, with reference to the drawings.

FIG. 4 schematically illustrates a plan view of a pixel of the array substrate of a liquid crystal display device. FIGS. 5(1) and 5(2) are views showing cross sections taken along the lines A—A and B—B, respectively, in FIG. 4. FIGS. 6(1), 6(2), and 6(3) are views showing cross sections taken along the lines C—C, D—D, and E—E, respectively, in FIG. 1. The opposing substrate in FIGS. 6(2) and 6(3) is identical to that in FIG. 6(1), and thus has been omitted from FIGS. 6(2) and 6(3).

In FIGS. 4 and 5, numeral 5 is a common electrode and numeral 7 is the gate signal line, and these are formed in the same layer. Next, an insulating layer 8 is formed on this layer (to the liquid crystal layer side), a thin film transistor (TFT) 17 made of a semiconductor layer, a source signal line 6, and a pixel electrode 4 are further pattern-formed, and a protective layer 10 is deposited thereon, thus forming an array substrate. Orientation films 9 are formed on the array substrate and on the opposing surface side of an opposing (color filter) substrate 2 that is in opposition to the array substrate, and furthermore a liquid crystal layer 3 is formed between these substrates, thus forming a liquid crystal display panel. FIG. 6 is a slightly more detailed cross-sectional view of the same, the contents of which will be described later.

As shown by these three drawings, unlike a TN-type liquid crystal panel, the electrodes in an IPS panel are in the same plane.

Also, the electrode connected to the drain of the thin film transistor is called the pixel electrode, and the electrode that is not connected to the drain is called the common electrode.

However, extremely fine processing is required in the manufacturing process of such a liquid crystal display panel, so contamination by foreign matter during manufacturing causes short circuits at the intersecting portions of the gate signal lines and the source signal lines and at portions where the gate signal lines are close to the common electrodes, for example, and this becomes a major factor that lowers production yield.

That is to say, when the gate signal line and the common electrode are formed on the same surface, as shown in FIGS. 4 to 6, there is the possibility that after the electrode material has been deposited by a normal sputtering technique, for example, and patterning is performed using photolithography, if the foreign matter 15 included in the material for the resist, for example, is in sites where the electrode material should be removed, as shown in FIGS. 7 and 8, then these sites are not exposed due to the foreign matter and spots are left which should have originally been removed and formed as separate lines or electrodes as shown in FIG. 4, but instead become continuous lines, causing short-circuits.

In general, there are usually several short-circuited spots in a liquid crystal display panel. One countermeasure is to cut off the shorted-circuited portions with a laser, for example.

However, removing short-circuited portions due to foreign matter by laser also cuts off the electrode at that spot and moreover destroys the insulating film on top of the gate electrode, thus exposing the gate electrode.

It has been found that black dot display nonuniformities occur at the exposed portion of a gate electrode when the liquid crystal display device is operated at high temperature while the gate electrode is exposed.

A conceivable cause for this is that the gate potential is negative except for when recharging in order to drive the liquid crystal layer, that is, most of the time electrons are being injected into the liquid crystal and a large number of ions in the liquid crystal are created, or ions in the liquid crystal layer gather at the exposed portion of the gate and cause an uneven distribution of ions. This mechanism is schematically shown in FIG. 9. FIG. 9 schematically shows how a substance A within the liquid crystal is ionized to $A^-$ by electrons $e^-$ that have been injected into the liquid crystal.

Cyano-based liquid crystals have conventionally been used particularly in liquid crystal modes that achieve a wide viewing angle by applying an electric field that is parallel or oblique with respect to the substrate. However, although cyano-based liquid crystals are advantageous in increasing speed, because the liquid crystal is qualitatively easily decomposed, the amount of ions in the liquid crystal easily increases, and from this aspect there is the risk that black dot nonuniformities occur readily.

JP-H10-206857A also mentions preventing the generation of these black dot nonuniformities. According to this publication, it is preferable that the film thickness of the protective film or the insulating film 8 is at least 0.4 μm thicker than the film thickness of the electrode in contact with this protective layer. With this method, however, the protective layer is destroyed, no matter how thick it is made, if a laser is irradiated to cut off the electrode to counter short-circuits, and thus black dot nonuniformities can occur.

Moreover, JP-H10-186391A proposes a method in which the specific resistance of the liquid crystal is at least $10^{13}$ Ω·cm, and the insulating film, which is the cause of drops in optical voltage holding ratio, is removed to so that a portion of the electrode structure generating the electric field is formed in direct contact with the orientation film.

Thus, with this method for forming a portion of the electrode structure in direct contact with the orientation film, there is a minor reduction in the size of the black dot spots compared to a case where the entire electrode is covered by the insulating film. However, with this method, the effect of reducing the black dot spots is small and is insufficient for meeting the capabilities of recent high standard displays.

Furthermore, the problem of display burn-in (when once a certain pattern has been displayed for a long time, that pattern remains even after another pattern has been switched to) becomes pronounced.

Studies conducted by the inventors have revealed the following reason for this: As schematically shown in FIG. 10, ionic is material in the liquid crystal, which are a cause of black dot nonuniformities, spread not only to the array substrate 1 side but also to the opposing substrate 2 side (color filter substrate side). Consequently, simply forming an electrode in which the insulating film has been removed at only one of the substrates (array substrate side) proves to be insufficient.

One conceivable measure to counter this would be to supply a positive electric potential with respect to the gate signal line directly from the pixel electrode, source signal line, common line, and common electrode to the liquid crystal layer to neutralize the generated ionic material. However, all of these lines and electrodes are necessary in driving the liquid crystal layer, and not only is it problematic from the perspective of display image quality for the electric potential necessary in driving the lines and electrodes to be altered by an electrode reaction with the liquid crystal, but this is also not preferable from the standpoint of long-term reliability.

Moreover, simply forming the above electrode is not sufficient for preventing black dot nonuniformities from occurring because of its small area for neutralizing and recovering ionic material in the liquid crystal.

Methods have been proposed for increasing the numerical aperture in a liquid crystal panel of the in-plane electric field mode by making the electric potential of the conductive black matrix substantially the same as that of the common electrode, or forming a conductive film of an electric potential substantially the same as that of the common electrode on the black matrix (JP H10-206867A and JP H09-269504A). However, as mentioned earlier, ionic material in the liquid crystal causing black dot nonuniformities spread not only to the opposing substrate side (color filter substrate side) but to the array substrate side as well, as schematically shown in FIG. 10, so it was not sufficient to form an electrode in which the insulating film is removed only on the side of one of the substrates (opposing substrate side).

Moreover, although these methods offered some improvement in black spot defects, they were unable to completely eliminate them during long-term continuous driving.

(Background art seen from the aspect of the problems to be solved by the invention)

Thus, there has been a need for the development of technology to securely and very reliably seal the liquid crystal injection hole (port) between the two substrates.

Moreover, although the curing period can be freely set when curing the resin by irradiating UV light, operator eye safety must also be taken into account. For this reason, there is also a need for a somewhat different resin.

Furthermore, there is a need for the development of an IPS mode liquid crystal display element and device that are inexpensive and in which there are no black displays after extended periods of use, the numerical aperture or other display properties are not adversely affected, and the manufacturing process is not complex.

Moreover, with the increase in size and price of display devices in recent years, there are cases of these devices being used for very extended periods of time. Thus, in these cases, there is a need for the development of technologies in which black display do not occur even if ions are generated for the above-mentioned reasons or when there is decomposition or hydrolysis of the liquid crystal due to user error or natural radiation.

DISCLOSURE OF THE INVENTION

It is an object of the present invention to solve the above problems.

The first major inventive group includes two inventive groups. The first inventive group of these is characterized in that a resin of a viscosity at 20 Pa·s or less, and preferably 10 Pa·s or less, is used to seal the injection port through which liquid crystal is loaded between the substrates during production of a liquid crystal element in which liquid crystal is sandwiched between two substrates.

Furthermore, to lower the viscosity of the resin, it is warmed by infrared light, for example, to 80 to 50° C. and preferably to 80 to 90° C. from the standpoint of eliminating air. It should be noted that the reason for heating with infrared light is that the procedure is uncomplicated from an equipment standpoint.

Furthermore, it is characterized in that to release air and foreign matter composed of dust and moisture suspended in the air inside the resin while or after it is applied, vibrations are applied to the resin using ultrasonic waves of at least 20 KHz or megasonic waves of at least 1 MHz.

Moreover, it is characterized in that during or after the application of the resin, air therein is released by placing the resin in an environment that is below atmospheric pressure, for example 0.5 atm, preferably 0.1 atm, and more preferably 0.01 atm or less.

Furthermore, it is characterized in that during or after the application of the resin, a velocity of 1 g or 2 g, for example, is applied to the resin to expel air therein.

Furthermore, it is characterized in that during or after the application of the resin to the injection port, the resin is wiped off and reapplied at least twice.

Furthermore, it is characterized in that during or after the application of the resin, air inside the resin is expelled by applying an acceleration to it.

Furthermore, it is characterized in that an acrylic or epoxy based UV curable resin is used as the resin. This makes it possible to freely set the timing at which the resin is cured and also the curing speed becomes fast.

The other inventions of this inventive group are taken from a product standpoint.

In a second inventive group, an anaerobic resin is used for the sealing resin. Here, "anaerobic resin" means a resin that does not cure when exposed to air, but is cured by the blockage of air at a tiny space. Anaerobic resins are generally used in thread locks, for example, and there are also some that are cured by blocking out air and pressing or heating.

The principle behind this is that by blocking out air, a dimetacrylate is polymerized to polyacrylate and cured. Thus, a polymer is formed on the adhesive surface and creates a powerful adhesive force that reaches its maximum strength several hours after air has been blocked out. Accordingly, a characteristic of anaerobic resins is that they do not require the irradiation of UV light and that curing discrepancies caused by impurities do not easily occur therein.

The second major inventive group includes eight different inventive groups, wherein each inventive group shares a common object in the elimination of the so-called black spots in in-plane electric field mode liquid crystal elements in a broad sense as described above.

It was found that conventional technologies have lacked the effect of preventing black display over extended periods of time, because generally, as shown in FIG. 5, for example, the substrate on the color filter side conventionally has been given the configuration of a conductive layer such as ITO on its top surface, then a glass substrate, a light-blocking layer, a color filter, an over-coating layer, and an orientation film and there are no sites at which the electrodes (conductive substances) are exposed, so that ions or ionized components, which are the cause of black spot defects, are not recovered at all by the color filter side substrate. Accordingly, ions and the like are reliably, and almost entirely, eliminated by some sort of means.

First, in the first inventive group, the fact is exploited that when in in-plane electric field mode liquid crystal elements the total thickness of the insulating layer (film) and the orientation film on the electrodes is extremely thin, the ions and charges in the liquid crystal layer are eliminated through narrow holes, for example, occurring in the insulating film, and that as a result, black spots substantially no longer occur.

A first invention of this inventive group is characterized in that there is a third layer, between a metal layer composed of the electrodes or the signal lines and the liquid crystal layer, which is made of an insulating layer and an orientation film, or a protective film, for example, that may also serve as these films, and there are regions in which the thickness of the insulating layer and the orientation film together is less than 1000 Å and preferably less than 500 Å. Here, an electrode in a pure in-plane electric field mode element refers to the pixel electrode and the storage electrode or common electrode associated (accompanying) therewith. In-plane electric field elements falling under a broader definition, such as IIS, further include other electrodes, for example. Also, it is even better if the total film thickness of the insulating layer and the orientation film, for example, between the pixel electrode and the liquid crystal layer and the common electrode and the liquid crystal layer is less than 500 Å, or if there are sections without these layers. It should be noted that if there is no orientation film or if there are regions in which there is partially no orientation film, then in these areas it may be preferable that some other orienting means has been devised. Of course, if below a black matrix (opposite the user side), for example, then such measures are not necessary. Moreover, in line with future technological advances, a liquid crystal material that does not require an orientation film may also be used.

Hereinafter, in the inventions, Similarly, it is characterized in that the light-blocking film, such as a black matrix, is conductive. Furthermore, it is characterized in that this conductive light-blocking film is formed on the opposing substrate. Furthermore, it is characterized in that the orientation film or the protective film are films of a conductive substance.

Thus, ions and charges in the liquid crystal are shifted and ions or charges in the liquid crystal molecules and the liquid crystal layer are eliminated and the misalignment, for example, of liquid crystal molecules at defective insulating portions, for example, is also eliminated, and thus, a favorable display is attained.

In addition to the above, for example an insulating film for preventing short circuits or a protective film also serving as an insulator is of course formed on the switching element and on electrodes and lines in portions unrelated to achieving the effects of the present invention. Of course, to achieve the operations and effects of the other inventive groups, it is possible to partially not form the protective film, for example. Also, if a configuration in which a specific potential is applied to the conductive light-blocking film is adopted, this is even better.

Similarly, it is characterized in that the process for manufacturing the in-plane electric field mode liquid crystal element includes a step for applying an orientation film and a step for removing the orientation film directly below the black matrix portion, which is not related to display quality, or on a center portion thereof.

Similarly, it is characterized in that after the step for applying the orientation film there is an etching step for removing a portion of the orientation film and a step for orienting the orientation film remaining after the etching step by irradiating UV light, for example.

Similarly, it is characterized in that the orientation film is rubbed and at least a portion of the orientating film is stripped off on the electrodes or wiring (including not just entirely stripping it off but also removing only the top portion (liquid crystal layer side) and forming fine holes or cracks). By setting the pushed-in amount to at least 0.5 mm as one condition during rubbing, the orientation film is more easily stripped off and even better results can be obtained.

In a second inventive group, the focus was on eliminating ions with a neutralization electrode.

In a first invention of this inventive group, apart from the conductive layers of the source signal line, the gate signal line, the pixel electrode, the common electrode, and the common line, for example, which in most cases are in principle composed of a metal, a neutralization electrode made of a conductive substance is provided at a location, which, of course, in principle does not affect the display, in direct contact with the liquid crystal layer or in indirect contact therewith via the orientation layer (film).

Now, the cause of black dot nonuniformities lies in the fact that created ions are not neutralized and thus the ion concentration in the liquid crystal near defect portions increases, which in turn lowers voltage holding ratio. However, if there is a neutralization electrode that is directly exposed to the liquid crystal layer or is in electrical communication with the liquid crystal layer via an orientating film made of a conductive substance, then electrons can once again be given to an electrode at the neutralization electrode, so that the ion concentration near the defective portions in the insulating layer does not increase very much and drops in voltage holding ratio are minimized, and in turn, the occurrence of black spot nonuniformities can be suppressed.

Hereinafter, in the various inventions, a neutralization electrode is formed in contact with the liquid crystal layer or the orientation layer, and a means for supplying to the neutralization electrode a potential that is positive with respect to the gate signal line is provided.

Accordingly, generated anions are more effectively neutralized and the occurrence of black spot nonuniformities can be suppressed.

Also, in another invention, a neutralization electrode is formed along the gate signal line and in contact with the liquid crystal layer or the orientation layer, and a means for supplying to the neutralization electrode a potential that is positive with respect to the gate signal line is provided.

Accordingly, generated anions can be more effectively neutralized before they diffuse from anion generation source into the pixel.

Moreover, a neutralization electrode is formed, along the gate signal line and in contact with the liquid crystal layer or the orientation layer, on the substrate in opposition to the substrate on which the gate signal line is formed, and a means for supplying to the neutralization electrode a potential that is positive with respect to the gate signal line is provided.

Thus, the spacing to the gate signal line is widened, so that parasitic capacitances formed between the neutralization electrode and the gate signal line can be reduced and the effect of parasitic capacitances on gate signal delay is eliminated.

Also, in a further invention, a neutralization electrode is formed, in contact with the liquid crystal layer or the orientation layer, on the substrate in opposition to the substrate on which the gate signal line is formed, a means for supplying to the neutralization electrode a potential that is positive with respect to the gate signal line is provided, and the neutralization electrode serves as a light-blocking layer, such as the black matrix, or a portion thereof.

Thus, the neutralization electrode also serves as the black matrix, for example, and thus the number of steps for forming this electrode can be reduced.

In addition to the above, the conductive light-blocking film can suitably be Cr, Ti, graphite, or a conductive resin, or have a two-layered structure of molybdenum oxide and molybdenum. Furthermore, the neutralization electrode can of course be formed in the direction of the source line or the gate line at the same time these lines are formed, for example, to achieve a reduction in the number of necessary production steps.

Also, it is of course possible to adopt a structure in which the neutralization electrode is given a predetermined potential.

The third inventive group is characterized in that it includes an open portion (exposed portion or portion without insulating film) and a neutralization electrode on the opposing substrate.

In a first invention of this inventive group, there is a site or region on at least one of the electrodes including the pixel electrode, the common electrode, and the signal line electrode, where the insulating film has at least partially not been formed, and at this portion the electrode is in contact with the liquid crystal either directly of via only the orientation film, and moreover a neutralization electrode is formed on the substrate side where the pixel electrode and the common electrode have not been formed and there are either sites on the neutralization electrode where the insulating film has not been formed or the insulating film has not been formed on the neutralization electrode at all.

With the aforementioned configuration, there is a portion where a potential other than that of the gate has been exposed, so that ions that are unevenly distributed in the gate potential portion give (or are given) electrons to the electrode at the portion where a potential other than that of the gate has been exposed and are therefore deionized and eliminated. Thus, an uneven distribution of ions does not occur and the occurrence of black spot nonuniformities can be suppressed.

In particular, because there are sites on both substrates (the array side substrate and the opposing side substrate) where the insulating film has not been formed, the ions are deionized at both substrates, so that there is an even greater effect in preventing black dot nonuniformities from occurring.

Also, the specific resistance of the liquid crystal injected into the liquid crystal panel has been made less than $10^{13}$ Ω cm.

Thus, the problem of display burn-in (in which after a certain pattern has been displayed for a long period of time, that pattern is retained even after switching to another pattern) can be inhibited.

Furthermore, it is characterized in that a positive potential with respect to the minimum voltage level of the scanning line is applied to the neutralization electrode.

Thus, ions that have been generated can be effectively deionized.

Also, the neutralization electrode is set to (substantially) the same potential as the common electrode.

Consequently, ions that have been generated can be more effectively deionized and black dot nonuniformities can be inhibited. Also, if the neutralization electrode is set to the same potential as the common electrode, then there is no need to provide a special potential supply means for the neutralization electrode, and therefore its structure/manufacturing process can be simplified.

Furthermore, it is characterized in that the neutralization electrode also serves as the black matrix or the color filter.

Furthermore, various materials for the orientation film have been considered.

Moreover, the liquid crystal panel is provided with a switching element, such as a TFT, and for example an insulating film is formed above this switching element.

Thus, deterioration of the switching element, such as a transistor or a varistor, can be prevented.

In the fourth inventive group, the focus was on neutralizing the liquid crystal by the presence of an open portion in the insulating film.

A first invention of this inventive group is characterized in that the pixel electrode and the opposing electrode are not formed in the same layer but instead, for example, an insulting film is formed on the opposing electrode, which is lower (and opposite the liquid crystal side), but is not formed at all on the higher pixel electrode.

With this configuration, a potential other than that of the gate is exposed, so that ions that are unevenly distributed in the gate potential portion are diffused into the exposed portion of the conductive layer and deionized, so that a liquid crystal panel of a favorable display quality without display nonuniformities can be obtained.

Moreover, since there is no insulating film on the opposing electrode there is also no increase in short-circuit defects.

Furthermore, it is characterized in that the pixel electrode and the opposing electrode are not formed in the same layer and the insulating film is formed on the pixel electrode but is not formed above the opposing electrode at all.

Also with this configuration, a liquid crystal panel of favorable display quality can be obtained without an increase in short-circuit defects.

Furthermore, as other inventive groups, it is characterized in that the specific resistance of the liquid crystal injected into the liquid crystal panel is less than $10^{13}$ Ω cm.

Thus, the phenomenon of display burn-in can be suppressed.

Furthermore, it is characterized in that the insulating film is formed over (on the liquid crystal side) the switching element, the signal line, and the scanning line.

Thus, deterioration of the transistor, for example, can be prevented, and these portions are protected.

Furthermore, it is characterized in that there is an insulating film at a portion along the rubbing direction.

With this configuration, the insulating film does not get in the way during rubbing, and therefore a liquid crystal panel of a favorable display quality is achieved.

A fifth inventive group is characterized in that at least a portion of at least the liquid crystal side surface of the light-blocking layer (film) or black matrix has a structure of protrusions/recesses.

A first invention of this inventive group is characterized in that the pixel electrode, the common electrode, the signal line, and the scanning line, for example, are formed on one of the substrates, and a black matrix or a light-blocking film such as a light-blocking layer for preventing semiconductor malfunction and for protection, for example, is formed on the substrate side on which the pixel electrode, for example, has not been formed, and this light-blocking film has a protrusion/recess structure in at least its liquid crystal layer side surface.

With this configuration, ions that are unevenly distributed in the gate potential portion give electrons at the portion (the black matrix portion, for example) where a potential other than that of the gate has been exposed and thus are deionized, so that an uneven distribution of ions does not occur and the occurrence of black dot nonuniformities can be suppressed. Particularly since protrusions/recesses have been formed into the liquid crystal side surface of the black matrix, for example, the surface area for recovering ions increases without a change in the numerical aperture and a sufficient effect can be achieved.

Furthermore, the various inventions are characterized in that a light-blocking film such as a black matrix is formed on the substrate side where the pixel electrode has been formed on the opposing substrate side where the pixel electrode has not been formed, and the surface of the light-blocking has a protrusions/recess structure.

With this configuration, an operation similar to the previous invention are achieved and similar effects thereto are realized.

Furthermore, a margin for adhering becomes unnecessary and an increased numerical aperture can be achieved when the black matrix, for example, is formed on the substrate side on which the pixel electrode is formed (array side).

Furthermore, it is characterized in that a neutralization electrode is formed on the substrate side where the pixel electrode etc. has not been formed or on the substrate where the pixel electrode etc. has been formed, and the surface of the neutralization electrode has a protrusion/recess structure.

With this configuration, an uneven distribution of ions does not occur and the occurrence of black dot nonuniformities can be suppressed. Particularly since the surface of the neutralization electrode is provided with protrusions/recesses, there is a large surface area for recovering ions and a sufficient effect can be achieved.

Furthermore, it is characterized in that the surface of the opposing electrode has a protrusion/recess structure.

With this configuration, in liquid crystal modes using an oblique electric field (if a precautionary note is to be made, those are included in the in-plane electric field format), ions that are unevenly distributed in the gate potential portion give electrons to the electrode at the portion where a potential other than that of the gate has been exposed and are thus deionized, so that an uneven distribution of ions does not occur and the occurrence of black dot nonuniformities can be suppressed. In particular, since the surface of the opposing electrode is provided with protrusions/recesses, there is a large surface area for recovering ions and a sufficient effect can be achieved.

Furthermore, it is characterized in that the light-blocking film, such as the black matrix, is conductive.

With this configuration, ions that are unevenly distributed in the gate potential portion give electrons to the electrode at the portion where a potential other than that of the gate has been exposed and are thus deionized, so that the occurrence of black dot nonuniformities can be suppressed.

Furthermore, it is characterized in that the specific resistance of the liquid crystal injected into the panel of the liquid crystal element is less than $10^{13}$ Ω cm.

Thus, as is in the other inventive groups, the phenomenon of display burn-in is suppressed.

Furthermore, it is also characterized in that at least the liquid crystal side surface of the light-blocking film, such as a black matrix, of a color filter side portion used in the image display device has a protrusion/recess structure and preferably has a structure with many holes and with protrusions/recesses.

With this configuration, an uneven distribution of ions does not occur and the occurrence of black dot nonuniformities can be suppressed.

Furthermore, it is characterized in that the difference between the protrusions and the recesses of the protrusion/recess structure is at least 0.1 μm, and preferably at least 0.3 μm.

With this configuration, a large surface area for recovering ions can be secured, so that a sufficient effect is attained.

Furthermore, it is characterized in that the light-blocking film or the neutralization electrode or both are in contact with the liquid crystal either directly or via the orientation film. Thus, ions can be recovered through the small holes in the orientation film or can be recovered directly.

With this configuration, ions can be reliably recovered.

In a sixth inventive group, the principle is that it has a conductive light-blocking film (layer).

A first invention in this inventive group is characterized in that the light-blocking film is in contact with the liquid crystal layer or in particular is in contact with the liquid crystal layer via a conductive orientation film, in a liquid crystal element in which liquid crystal is sandwiched between a pair of substrates, a pixel electrode and a common electrode are formed on one of these substrates, voltage is applied between the pixel electrode and the common electrode to drive the liquid crystal, and there is a conductive light-blocking film on the other substrate.

Furthermore, it is characterized in that there is a region where the light-blocking layer is in contact with the liquid crystal in a stripe shape extending in the direction of the signal line or the scanning line, or in a lattice shape extending in the direction of the signal line or the scanning line.

Therefore, the light-blocking film can also serve as a black matrix, for example, and there is an increase in numerical aperture.

The conductive light-blocking film used in the liquid crystal element can be any material that is light-blocking and conductive, but using CR, Ti, or a conductive resin results in higher light-blocking properties, which is better. Additionally, if the light-blocking film is an organic conductive film it can be produced easily.

Furthermore, it is characterized in that the light-blocking film, or wiring extending from the light-blocking film and of a potential substantially the same as that of the light-blocking film, and the common electrode, or wiring extending from the common electrode and of a potential substantially the same as that of the common electrode, are electrically connected between the substrate pair by at least one or more conducing substances.

Furthermore, it is characterized in that the light-blocking film or wiring extending from the light-blocking film and the common electrode, or wiring extending from the common electrode and of a potential substantially the same as that of the common electrode, are electrically connected between the substrate pair by at least one or more conducing substances.

Furthermore, it is characterized in that, in a liquid crystal element having a light-blocking film and an over-coating layer, a photosensitive material is used for the over-coating layer, and the over-coating layer on the conductive light-blocking layer is stripped off by photolithography to produce a region on the light-blocking film without the over-coating layer.

Other inventions are characterized in that substantially the same potential is applied to the conductive light-blocking film and the common electrode.

The seventh inventive group is characterized in having a light-blocking layer (film) on the opposing substrate and an opening.

A first invention in this inventive group is characterized in that a conductive substance, for example, for recovering ions is formed on both substrates in an in-plane electric field mode liquid crystal element in which liquid crystal is sandwiched between a pair of substrates, a pixel electrode a common, a signal line electrode, and a scanning line electrode are formed on at least one of these substrates, and voltage is applied between the pixel electrode and the common electrode to change the alignment of the liquid crystal molecules.

With this configuration, ions that are unevenly distributed in the gate potential portion give electrons to the electrode at the portion where a potential other than that of the gate has been exposed and are thus deionized, so that an uneven distribution of ions does not occur and black dot nonuniformities can be kept from generating.

Furthermore, it is characterized in that there is a site on at least one of the pixel electrode, the common electrode, and the single line electrode where the insulating film has at least partially not been formed, the electrode is in contact with the liquid crystal through this portion without the insulating film either via the orientation film or directly, a conductive black matrix is formed on the substrate side on which the pixel electrode and the common electrode have not been formed, and a portion or all of the conductive black matrix in the display region is in direct contact with either the orientation film or the liquid crystal.

With this configuration, a potential other than that of the gate is exposed, so that ions that are unevenly distributed in the gate potential portion give electrons to the electrode at the portion where a potential other than that of the gate has been exposed and are deionized, and thus an uneven distribution of ions does not occur.

In particular, since there is a site on both substrates (array side substrate and opposing side substrate) where the insulating film has not been formed, the ions are deionized at both substrate sides, so that the occurrence of black dot nonuniformities can be suppressed.

Furthermore, the insulating film has not been formed on the pixel electrode at all, and where the insulating film has not been formed, the pixel electrode is in contact with the liquid crystal via only the orientation film or is in direct contact with the liquid crystal. Also, a conductive black matrix has been formed on the substrate side on which the pixel electrode and the common electrode have not been formed, and part or all of the conductive black matrix in the display region is in direct contact with either the orientation film or the liquid crystal.

With this configuration, the occurrence of black dot nonuniformities can be suppressed.

Furthermore, it is characterized in that the insulating film has not been formed on the common electrode at all, and the common electrode is in contact with the liquid crystal via only the orientation film or is in direct contact with the liquid crystal through this portion where the insulating film has not been formed. Also, a conductive black matrix has been formed on the substrate on which the pixel electrode and the common electrode have not been formed, and part or all of the black matrix is in direct contact with either the orientation film or the liquid crystal.

With this configuration, the insulating film has not been formed on the common electrode at all and the conductive black matrix is formed on the opposing substrate side, so that the occurrence of black dot nonuniformities can be suppressed because ions are eliminated.

Furthermore, the insulating film has not been formed at all on either the pixel electrode or the common electrode, and the pixel electrode and the common electrode are in contact with the liquid crystal via only the orientation film or are in direct contact with the liquid crystal at these portion without the insulating film. Also, a conductive black matrix has been formed on the substrate side on which the pixel electrode, etc., has not been formed, and part or all of the black matrix is in direct contact with either the orientation film or the liquid crystal.

With this configuration, the occurrence of black dot nonuniformities can be suppressed (however, because there is no insulating film on the pixel or common electrodes, short-circuits easily occur between these electrodes).

Also, like in the other inventive groups, making the specific resistance of the liquid crystal injected into the liquid crystal element smaller than $10^{13}$ Ω cm, the phenomenon of display burn-in (in which after a certain pattern has been displayed for a long period of time that pattern is retained even after switching to another pattern) was suppressed.

A switching element is formed in the liquid crystal element in order to drive the element, and an insulating film is provided thereon. Thus, deterioration of the semiconductor, for example, can be prevented.

Furthermore, it is characterized in that a positive potential with respect to the minimum voltage level of the scanning line is applied to the black matrix.

With this configuration, generated ions can be more effectively deionized, and the occurrence of black dot nonuniformities can be suppressed.

Furthermore, it is characterized in that the black matrix has been set to a substantially the same potential as that of the common electrode. Accordingly, generated ions can be more effectively deionized, and the occurrence of black dot nonuniformities can be suppressed. Setting the black matrix to the same potential as the common electrode eliminates the need to provide a special potential supplying means for the black matrix, and thus the structure/production process can be simplified.

Furthermore, the conductive black matrix is formed by a conductive resin. For this reason it can be fabricated in the same step as that for forming the color filter. Moreover, in contrast to forming a metal such as Cr, which requires elevated temperature formation, this black matrix can be formed after the color filter has been formed. Accordingly, the black matrix can be formed at a site in contact with the orientation film or the liquid crystal.

Furthermore, it is characterized in that the substrates of the liquid crystal element are held at a certain spacing by forming columns at a specific location as spacers. By regulating in this way, the spacers can be selectively established at spots where the top and bottom substrates are not easily short-circuited, and thus short-circuits do not occur easily even if conductive substances are formed onto both substrates.

In an eighth inventive group, the orientation film or at least a surface portion thereof and at least a portion of the surface of the neutralization electrode, for example, has a cell structure (sponge structure having spaces with an extremely small diameter) caused by a foaming agent. Thus, the absorption of generated ions is achieved.

BRIEF DESCRIPTION OF THE DRAWINGS

FIG. 1 shows the configuration of liquid crystal elements according to the various in-plane electric field modes.

FIG. 3 shows how UV rays for curing the resin are diffracted by bubbles in the sealing resin.

FIG. 19 is a plan view of a modified example of the liquid crystal display device according to this embodiment.

FIG. 22 is a plan view of a modified example of the liquid crystal display panel according to this embodiment.

FIG. 27 conceptually shows the difference in structure of the panel according to this embodiment and that of the comparative example.

FIG. 28 shows the structure of the liquid crystal panel according to Embodiment 2-3-2 of the present invention.

FIG. 29 shows modified examples of the liquid crystal panel according to the previous two embodiments.

FIG. 30 shows a modified example of the same two embodiments.

FIG. 32 shows a modified example of the same two embodiments.

FIG. 39 shows the structure of the liquid crystal panel according to Embodiment 2-3-7 of the present invention.

FIG. 43 shows the structure of the liquid crystal panel according to Embodiment 2-4-2 of the present invention.

FIG. 48 shows the structure of the opposing substrate of the liquid crystal element according to Embodiment 2-5-1 of the present invention.

FIG. 50 shows the structure of the array substrate side of the liquid crystal element according to Embodiment 2-5-2 of the present embodiment.

FIG. 53 shows the structure of the opposing substrate side of the liquid crystal element according to Embodiment 2-5-3 of the present embodiment.

FIG. 54 shows the configuration in conventional IPS and in a HS mode.

FIG. 56 shows a modified example of this embodiment.

FIG. 57 shows a modified example of this embodiment.

FIG. 58 shows a modified example of this embodiment.

FIG. 63 shows the structure of the array side substrate of the liquid crystal element according to Embodiment 2-7-1 of the present invention.

FIG. 64 is a structural diagram of the opposing substrate in this embodiment.

FIG. 65 shows the difference between this embodiment and the comparative example.

FIG. 66 shows the structure of the opposing substrate of the liquid crystal element according to Embodiment 2-7-2 of the present invention.

FIG. 68 is a diagram of another modified example of the same.

FIG. 69 is a diagram of another modified example of the same.

FIG. 74 is a diagram showing a modified example of the array side substrate of this embodiment.

FIG. 75 shows the structure of the array substrate side of the liquid crystal element according to Embodiment 2-7-5 of the present invention.

FIG. 82 shows a modified example of Embodiment 1-2-1 of the resent invention.

FIG. 83 shows a modified example of the various embodiments of the second major inventive group of the present invention.

Figure 2:
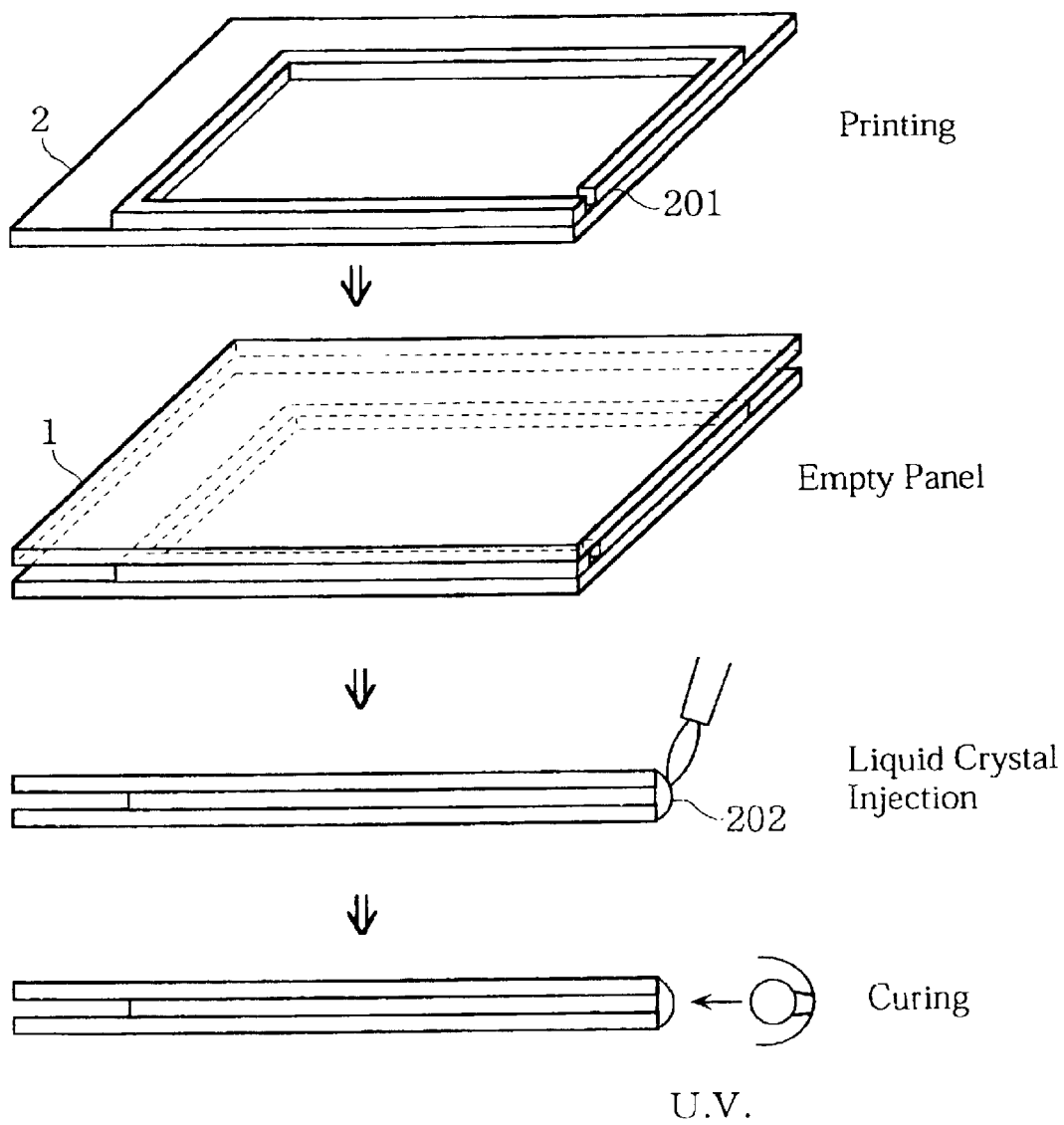
FIG. 2 shows how the liquid crystal is loaded into the liquid crystal panel and the resin at the sealing port is then cured according to conventional technologies.

| | Description of the Numerals |
|---|---|
| 1 | array substrate |
| 2 | opposing substrate |
| 26 | opposing substrate side electrode |
| 201 | sealing resin belt |
| 202 | sealing resin |
| 2021 | anaerobic sealing resin |
| 211 | sealing port jig |
| 212 | sealing port column |
| 213 | sealing port male screw |
| 214 | sealing port female thread |
| 3 | liquid crystal (layer) |
| 4 | pixel electrode |
| 41 | storage capacity electrode (portion) |
| 5 | common electrode (opposing electrode) |
| 51 | common electrode |
| 6 | signal line (source line) |
| 7 | scanning line (gate line) |
| 8 | insulating layer (film) |
| 80 | portion without insulating film |
| 81 | insulating layer (film) |
| 82 | portion without insulating film |
| 9 | orientation film |
| 91 | orientation resin incorporating foaming agent or which also serves to recover included ions. |
| 10 | protective film (also serving as insulating film, etc.) |

| | -continued |
|---|---|
| | Description of the Numerals |
| 100 | protective film (also serving as insulating film, etc.) |
| 11 | color filter |
| 12 | black matrix, light-blocking layer |
| 123 | conductive resin film |
| 13 | transparent conductive film |
| 14 | contact hole |
| 15 | foreign matter |
| 151 | air in sealing port resin |
| 16 | semiconductor layer |
| 17 | thin film transistor |
| 171 | diode |
| 18 | drain |
| 19 | photoresist |
| 191 | residual photoresist |
| 20 | light exposure mask |
| 21 | rubbing roller |
| 30 | neutralization electrode |
| 60 | protrusion for holding substrate spacing |
| 70 | brush |

BEST MODE FOR CARRYING OUT THE INVENTION

The following is an explanation of present invention, based on the embodiments.

FIRST INVENTIVE GROUP

This major inventive group is made up of two inventive groups, and relates to a resin for sealing the liquid crystal injection port.

This inventive group relates to keeping bubbles or the like from entering the UV curable resin or the like used to seal the liquid crystal injection port.

Embodiment 1-1-1

(Here, Embodiment 1-1-1 indicates the first embodiment of the first inventive group of the first major inventive group.) In the present embodiment, a UV curable resin with low viscosity is selected as the UV curable resin for sealing the liquid crystal injection port. If the resin has a low viscosity, there is a smaller probability that it contains bubbles when applied to the injection port. In particular, a viscosity of 20 Pa·s or less is even better, because then the resin contains hardly any bubbles.

In a second aspect, warming the substrate side by infrared (I.R.) light, for example, when the UV curable resin is applied to the injection port, or heating by warming only the resin once it has been applied or the entire substrate, has the effect of substantially lowering the viscosity of the resin. Also, if the viscosity of the resin becomes a viscosity of no more than 20 Pa·s due to this heating, then the resin hardly contains bubbles anymore, which is even better.

In a third aspect, the UV curable resin can be warmed in advance to a suitable temperature, for example 70 to 80° C., to lower the viscosity and then applied. The resin begins to cure if the heating temperature is too high, so the heating temperature should be no more than 80 to 90° C., however, depending on the resin, from the standpoint of working the resin the heating temperature is preferably 50° C. and even more preferably 40° C. Also, it is preferable that, when heated, the viscosity of the resin is 20 Pa·s or less.

In a fourth aspect, after the UV curable resin has been applied by a conventional method and taken in bubbles, an acceleration (g) is applied to the entire substrate or to the resin portion to create gravity. A method in which, for example, a device that revolves like the dehydrator of a washing machine is used can be adopted for this method, but other methods may be used as well. By doing this, bubbles and foreign matter, as well as moisture, are transferred in the direction opposite the acceleration direction and eliminated.

It should be noted that in this case, it is preferable that the spacing between the top and bottom substrates is maintained not by glass balls or fibers but instead by a support electrode for maintaining spacing that has been formed using photolithography on one of the substrates as far away from the TFT portions as possible and fixed immediately below the black matrix portion (back surface side seen from the user).

In a fifth aspect, after the UV curable resin has been applied by a conventional method and taken in bubbles, it is also possible to apply vibrations to the entire substrate or to the resin portion to remove the bubbles. Moreover, it is effective and preferable to use ultrasonic waves (UW) or megasonic waves (MW) as the method for applying vibrations at this time.

It should be noted that for this, warming the substrate in advance lowers the viscosity of the resin, and is thus preferable.

In a sixth aspect, after the UV curable resin has been applied by a conventional method and taken in bubbles, it is possible to bring an object such as a rigid body, a fiber, or a brush 70 into contact with the bubble portions to remove the bubbles.

In a seventh aspect, after the UV curable resin has been applied by a conventional method and taken in bubbles, the entire substrate or the resin portion is drawn to a vacuum (V) with a vacuum pump, for example, and exposed to an environment lower than atmospheric pressure, such as 0.1 atm. By doing so, the diameter of the bubbles is enlarged and ultimately the bubbles burst and are eliminated.

In an eighth aspect, after the UV curable resin has been applied by a conventional method and taken in bubbles, the resin is wiped lightly with a cloth, for example. This leaves a thin layer of resin on the glass surface near the injection port without the presence of air, and the resin is buried in the gap between the two glass substrates. If further UV curable resin is subsequently applied, the resin applicability becomes very good and there are no more residual bubbles. Moreover, this step can be performed repeatedly.

Figure 11:
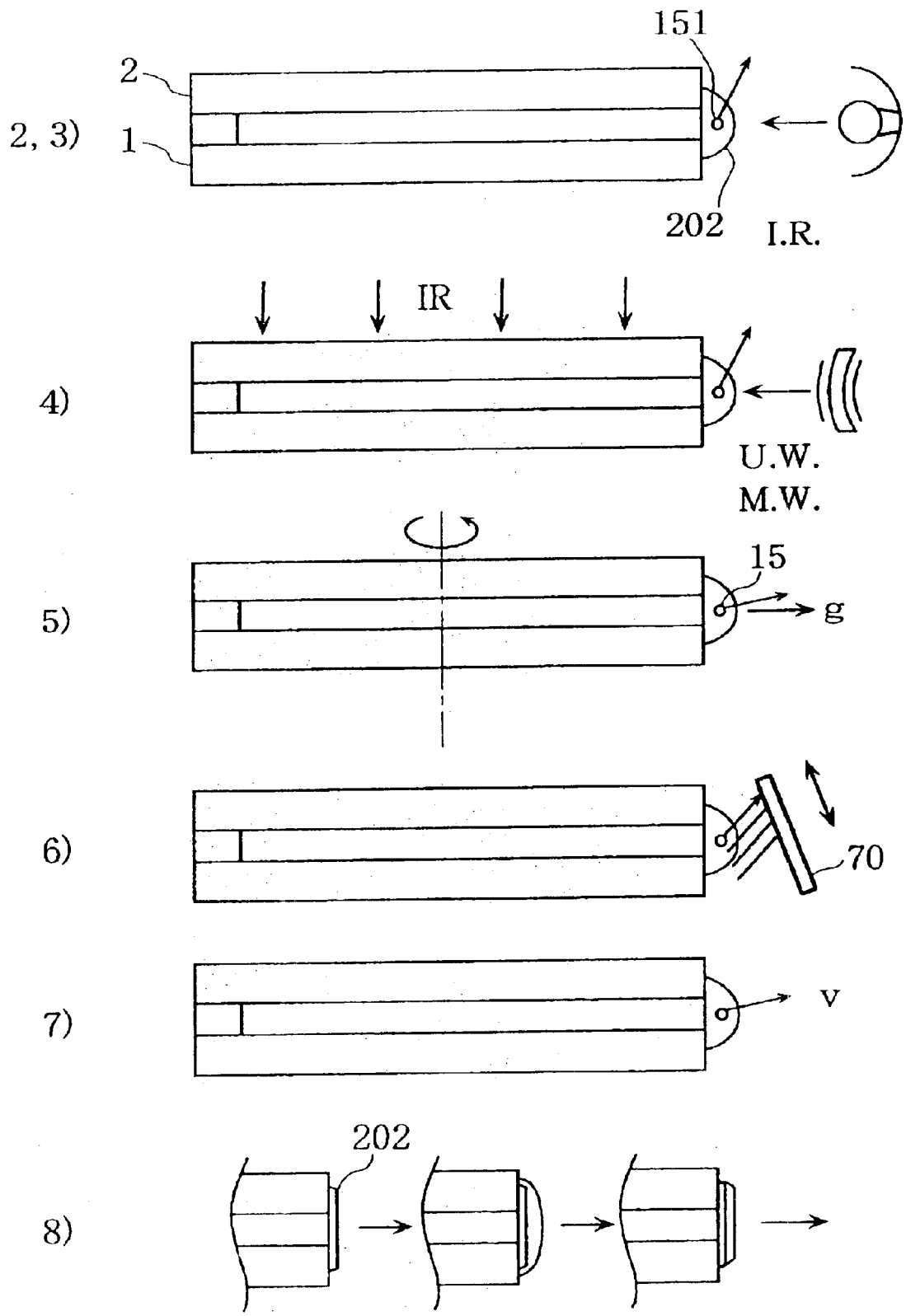
FIG. 11 shows the various embodiments according to the first major inventive group of the present invention.

As shown in FIG. 11, if a UV curable resin 202 is applied to he injection port by any of these various methods and then irradiated by UV light, absolutely no bubbles are mixed in the UV curable resin, so that the irradiated UV light is irradiated substantially uniformly (although with decay) without a significant refraction in the UV curable resin, and the entire resin is completely cured.

It was confirmed that a liquid crystal element fabricated in this way has initial properties exhibiting 99% voltage holding ratio, and moreover is stable for 10,000 hours in high temperature tests (70° C.), and furthermore shows no change in properties for 10,000 hours in continuous driving tests.

Second Inventive Group

Embodiment 1-2-1

In this embodiment, an anaerobic resin is adopted for the resin used for sealing after the liquid crystal has been injected as shown in FIG. 2, and the resin is cured by applying pressure with a thin plate instead of by irradiating UV light.

It should be noted that modified examples of the present embodiment will be explained further below with reference to the drawings.

Second Major Inventive Group

The second major inventive group relates to preventing black dot nonuniformities from occurring in an in-plane electric field mode liquid crystal element.

First Inventive Group

In the present invention, the thickness of the insulating film above (liquid crystal side) the electrodes, for example, formed on the substrate, or a protective film, for example, also serving as an insulating film, has been made thin in order to prevent the occurrence of black dot nonuniformities.

The inventions of the present inventive group are described below.

Embodiment 2-1-1

(Embodiment 2-1-1 means the first embodiment of the first inventive group of the second major inventive group.)

The present embodiment will be described below with reference to the drawings.

Figure 12:
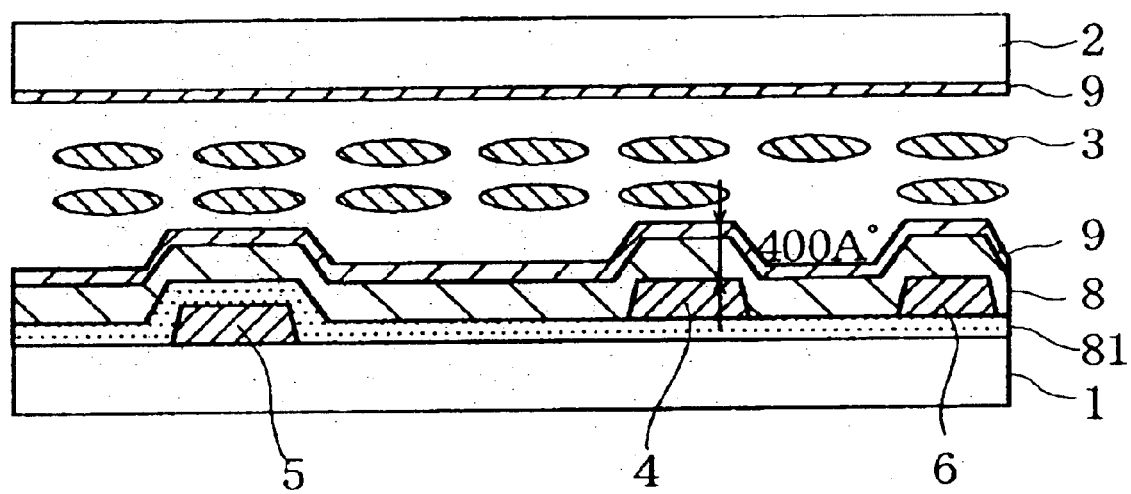
FIG. 12 shows a cross-section of the liquid crystal element according to Embodiment 2-1-1 of the present invention.

The liquid crystal element of the present embodiment is shown in FIG. 12. As shown in FIG. 12, the liquid crystal element has a pixel electrode 4 and a common electrode 5 for generating an electric field substantially parallel to the surface of an insulating film 81 formed over the entire surface of an array substrate 1. There is an insulating layer 8 and an orientation film 9 (strictly speaking, in FIG. 12 the top portion of the insulating layer and the orientation film) serving as a third layer between a liquid crystal layer 3 and the metal layer made of the pixel electrode 4, the common electrode 5 and the signal line 6, for example, (strictly speaking, this may also be an electrode made by a non-metal such as ITO; also, in principle the bottom of the insulating material and the orientation film are at an identical height from the substrate surface between the metal lines and the metal electrode) and which are different than the above-mentioned metal layer and liquid crystal layer, and there is a region in which the thickness of the insulating layer 8 and the orientation film 9 together is smaller than 500 Å. More specifically, due to the manufacturing circumstances, there is another normal insulating film 81 or a protective layer (not shown), for example, above or below the electrodes of the pixel electrode 4, the common electrode 5, and the signal line 6, etc. The total thickness of the insulating layer and orientation film, for example, serving as a third layer interposed between the liquid crystal layer and the metal layer is extremely thin at 1000 Å or less, and is preferably thinner than 500 Å. In the drawing this thickness is 400 Å.

The reason for this is that since the cause of black spot defects lies in lowered voltage holding ratio due to the local concentration of ion species components, the black spot defects can be eliminated by recovering the concentrated ion species via the electrodes. That is, by making the insulating layer and the orientation film above the electrodes as thin as possible, the concentrated ion species are more easily incorporated into the electrodes through these layers or from fine holes in these layers. It should be noted that the region thinner than 500 Å does not necessarily have to be formed over the entire surface of the electrodes, and it is sufficient if there are places that are partially less than 500 Å thick. Of course, the effect is greater when there are many of such regions and when the regions are wide. It should also be noted that both the orientation film and in particular the insulating layer may be composed of several layers.

Aside from the above, although not explicitly shown in the drawing because the drawing would be complicated and because it is obvious, switching elements such as TFTs are provided in a matrix arrangement on the array-side substrate, and the signal line includes an image signal line for supplying an image signal to the switching element and a scanning signal line for controlling the switching element. Also, the TFT transmits the image signal voltage from the image signal line to the pixel electrode in synchronization with the scanning signal. Moreover, a storage capacity for holding the voltage of the pixel electrode during the blocking period of the TFT is also provided. Also, one of the electrodes of the storage capacity is connected to the pixel electrode. Additionally, any of the electrodes formed on the substrate, including the storage capacity electrode, can be the electrode for recovering the aforementioned ion species. Electrodes or signal lines have been set forth as the electrode for recovering the ion species, but particularly if it is the pixel electrode 4 or the common electrode 5, there is a large total electrode area and a region where the total film thickness of the insulating layer and the orientation film is partially less than 500 Å is easily formed. Furthermore, making the total thickness of the insulating layer and the orientation film on both the pixel electrode and the common electrode less than 500 Å increases the electrode area for recovering the ion species, and is even better.

Embodiment 2-1-2

In the liquid crystal element of this embodiment, a portion of the orientation film is missing.

Figure 13:
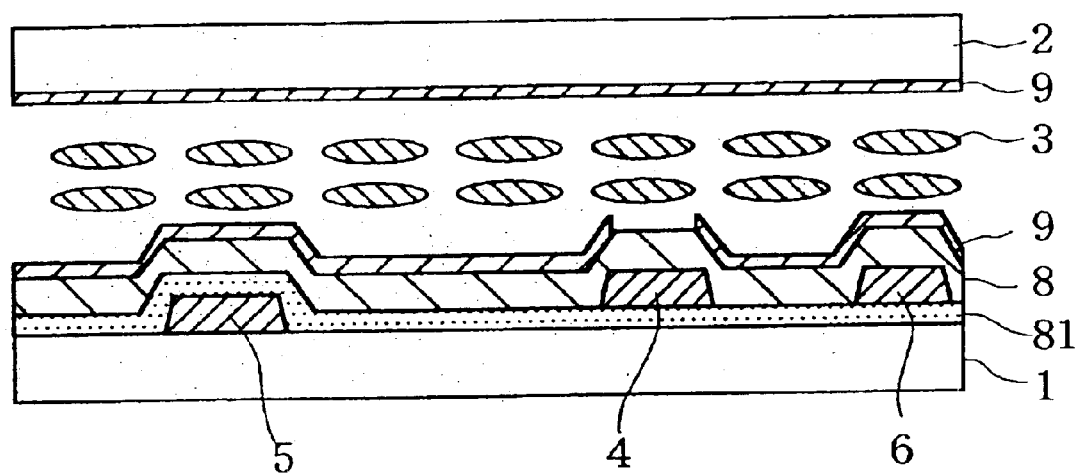
FIG. 13 shows a cross-section of the liquid crystal element according to Embodiment 2-1-2 of the present invention.

As shown in FIG. 13, in the present liquid crystal element, there is only the insulating layer 8 between the liquid crystal layer 3 and the pixel electrode 4, the common electrode 5, or the signal line 6, and there is a region where the insulating layer is less than 500 Å thick. That is, there is an insulating film on the pixel electrode 4, the common electrode 5, and the signal line 6, for example, and there is an orientation film for controlling the orientation of the liquid crystal on the insulating film on top of that, but in FIG. 13, a region exists partially in which there is no orientation film on the pixel electrode 4, for example, and the thickness of the insulating layer or the insulating film and the generally insulating protective layer at this portion is less than 500 Å. This is accomplished by providing a region where the insulating film on an electrode is made even thinner and partially removing the orientation film, which makes it even easier than in the previous embodiment to incorporate the concentrated ion species into the electrode.

It should be noted that, like in the previous embodiment, the region thinner than 500 Å does not have to be over the entire surface of the electrode, but the more of such regions there are, the greater the effect. Also, the insulating layer can be made of several layers, and the electrode can be any of the storage capacity electrode, the pixel electrode, the common electrode, and the signal line.

Also, although not shown in the drawing, it is of course preferable to provide them in regions that have no relation to the numerical aperture and the display properties, for example below the black matrix.

It should be noted that the portion without the orientation film is preferably arranged directly below the black matrix (not shown) of the opposing substrate, the electrode is given orientation by the irradiation of separate UV light, and is arranged as an extremely narrow strip or in dots (pinhole-shaped), so that it is does not disturb the orientation of the liquid crystal. For this purpose, it is for example possible to match this portion to the position of the black matrix, to use a substance for the electrode that has an orienting property, or to form pinholes by photolithography.

Embodiment 2-1-3

In the present embodiment, electrodes or the like are in contact with the liquid crystal layer via the orientation film 9 only.

Figure 14:
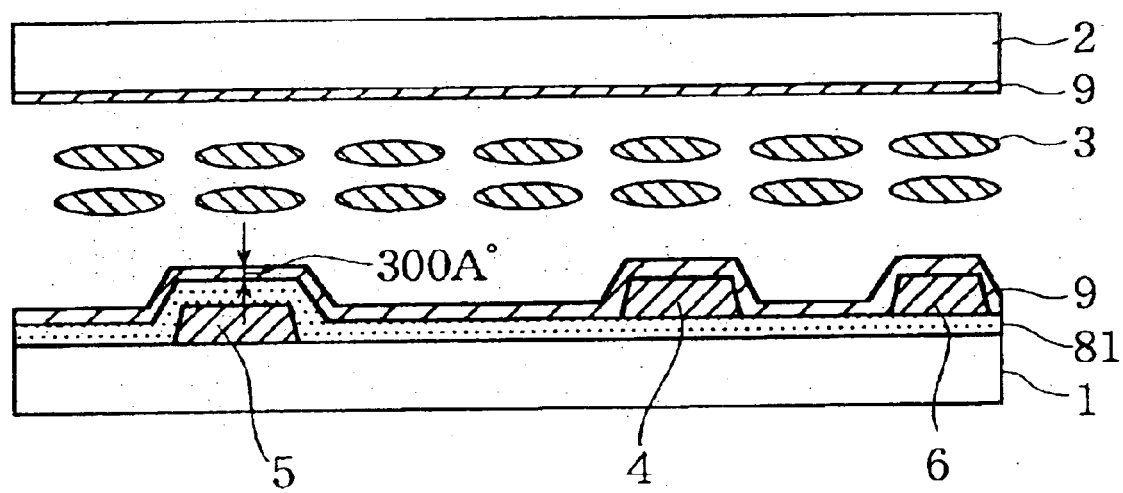
FIG. 14 shows a cross-section of the liquid crystal element according to Embodiment 2-1-3 of the present invention.

The liquid crystal element of the present embodiment is shown in FIG. 14. As shown in this drawing, in this liquid crystal element there is only the orientation film 9 between the liquid crystal layer 3 and the pixel electrode 4, the common electrode 5, or the signal line 6, and this orientation film 9 has regions that are less than 500 Å thick (in the drawing it is 300 Å). More specifically, there is ordinarily an insulating film and a protective film on the pixel electrode 4, the common electrode 5, and the signal line 6, for example, but in this case there is also a portion with regions lacking these films. In this portion there is only the orientation film, whose thickness is less than 500 Å.

Thus, similar to the previous embodiments, the concentrated ion species are recovered via the electrode, and black spot defects are eliminated. That is, the orientation film on the electrode is made even thinner, and concentrated ion species can be taken up even easier by the electrode than in the various previous embodiments.

Embodiment 2-1-4

The present embodiment is a case in which a portion (type) of the electrodes, for example, is in direct contact with the liquid crystal layer without the intermediate insulating layer and/or orientation film, for example.

Figure 15:
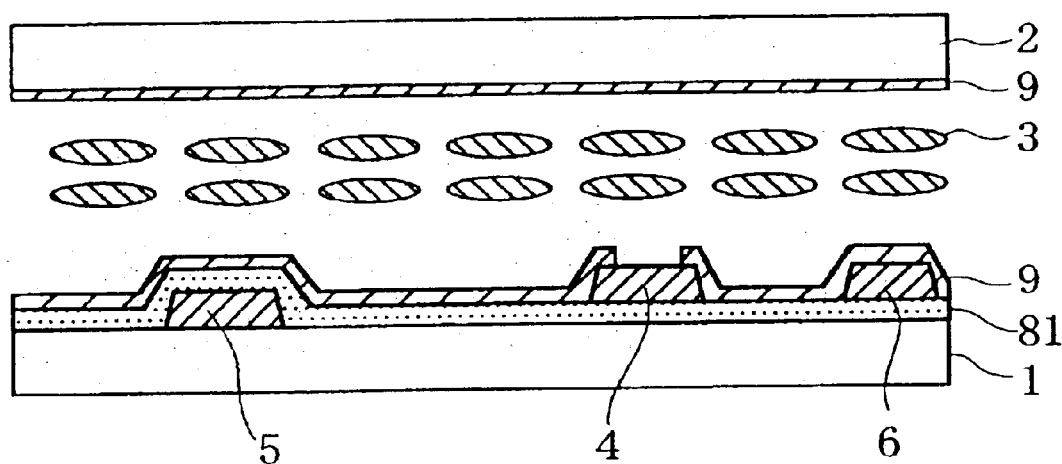
FIG. 15 shows a cross-section of the liquid crystal element according to Embodiment 2-1-4 of the present invention.

A liquid crystal element of the present embodiment is shown in FIG. 15. As illustrated in the drawing, the liquid crystal element has a region in which the pixel electrode 4, the common electrode 5, or the signal line 6 (in the drawing, it is the pixel electrode) is in direct contact with the liquid crystal layer 3. More specifically, in general there is an insulating film and an orientation film on the pixel electrode, the common electrode, and the signal line, for example, but in this case a region is formed in which neither of these layers or films exist. Thus, the concentrated ion species are even more easily incorporated into the electrode than in the previous several embodiments, because a region has been provided in which an electrode or the like is in direct contact with the liquid crystal.

Embodiment 2-1-5

The present embodiment relates to a method for manufacturing the liquid crystal elements according to the previous embodiments.

The embodiment in which there is a region without the orientation film has been taken as an example as described below.

The method for manufacturing a liquid crystal element according to the present invention is characterized in that after the step of applying the orientation film, it includes a step of removing or eliminating a portion of the orientation film that has been applied. The steps for forming the electrodes and the TFT on the array side substrate, as well as those for forming the insulating film and the orientation film, are no different than those for an ordinary in-plane electric field mode liquid crystal element, and thus a description thereof has been omitted.

Figure 16:
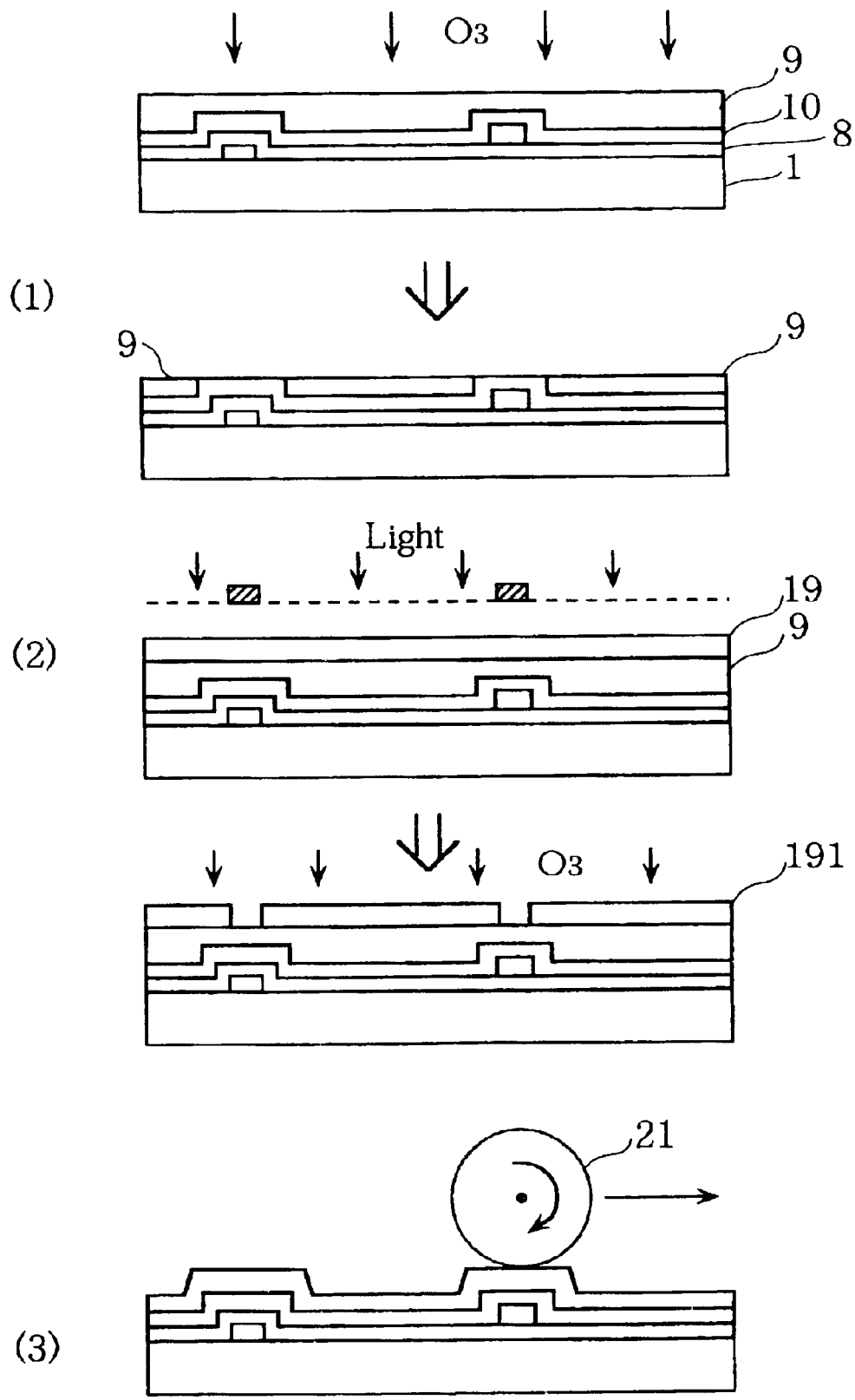
FIG. 16 shows the major aspects of the method for manufacturing the liquid crystal element according to Embodiment 2-1-5 of the present invention.

Specifically, the step of removing or eliminating the orientation film that has been formed includes the following means and methods, as shown in FIG. 16.

(1) The orientation film over the entire surface of the substrate is made thinner by dry etching or wet etching.

In (1), the orientation film 9, which is made of organic material and has been applied by spin coating such that its surface is parallel to the substrate surface, is removed by etching with $O^3$ (ozone). As a result, the orientation film is made thinner in portions where there are electrodes.

(2) Using photolithography, the orientation film is made thinner or removed only in specific regions.

In (2), a photolithography resist 19 and an exposure mask 20 are used to make only the orientation film above the electrodes thinner.

(3) The orientation film is partially and forcibly stripped by wiping or rubbing the surface of the orientation film with a rayon or cotton cloth. It should be noted that if the rubbing at this time is performed by pushing in at least 0.5 mm, a stronger force is applied to the orientation film and it becomes easier to strip.

In (3), because the orientation film has been applied, it sticks out where it is above the electrodes, and for this reason it is only these portions that are forcefully pushed in by a roller 21 for rubbing.

In addition to the above, depending on the material of the orientation film and the pushing force, the orientation film may not only be stripped in a strict sense but minuscule cuts or pinholes may also be created, which is also acceptable.

Second Inventive Group

In the second inventive group, a neutralization electrode is formed.

Liquid crystal elements of this inventive group are described below, with reference to the drawings.

Embodiment 2-2-1

Figure 17:
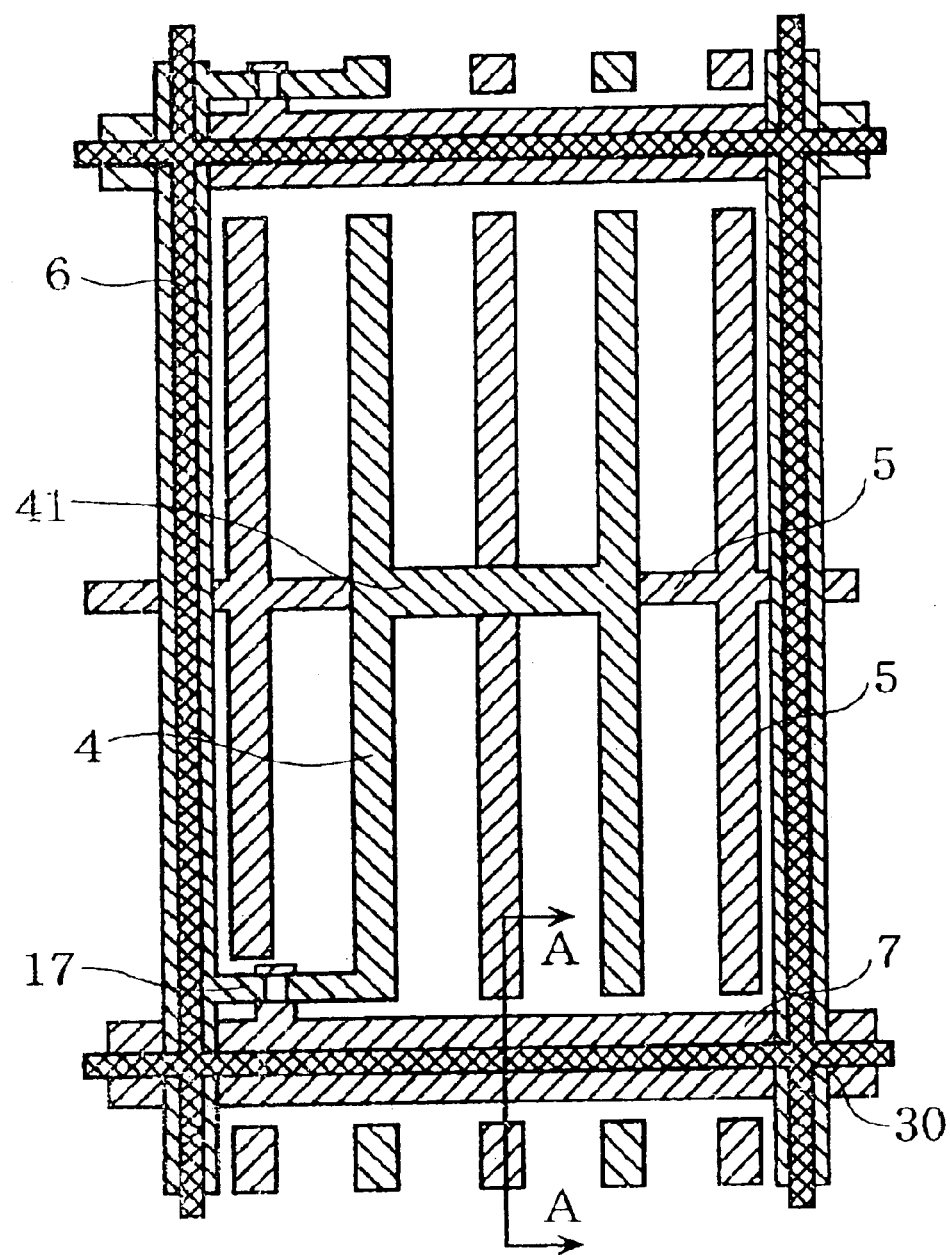
FIG. 17 is a plan view of the array substrate of the liquid crystal element according to Embodiment 2-2-1 of the present invention.
Figure 18:
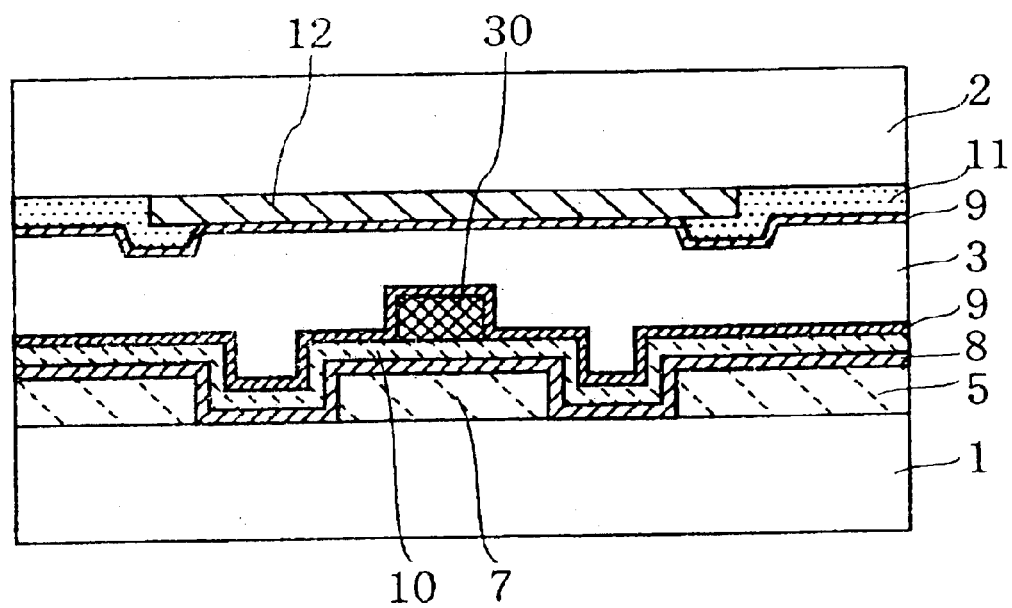
FIG. 18 is a cross-sectional view of the liquid crystal device taken along the line A—A.

A plan view of the array side of the liquid crystal element of this embodiment is shown in FIG. 17, and the cross-section taken along the line A—A in FIG. 17 is shown in FIG. 18.

Figure 4:
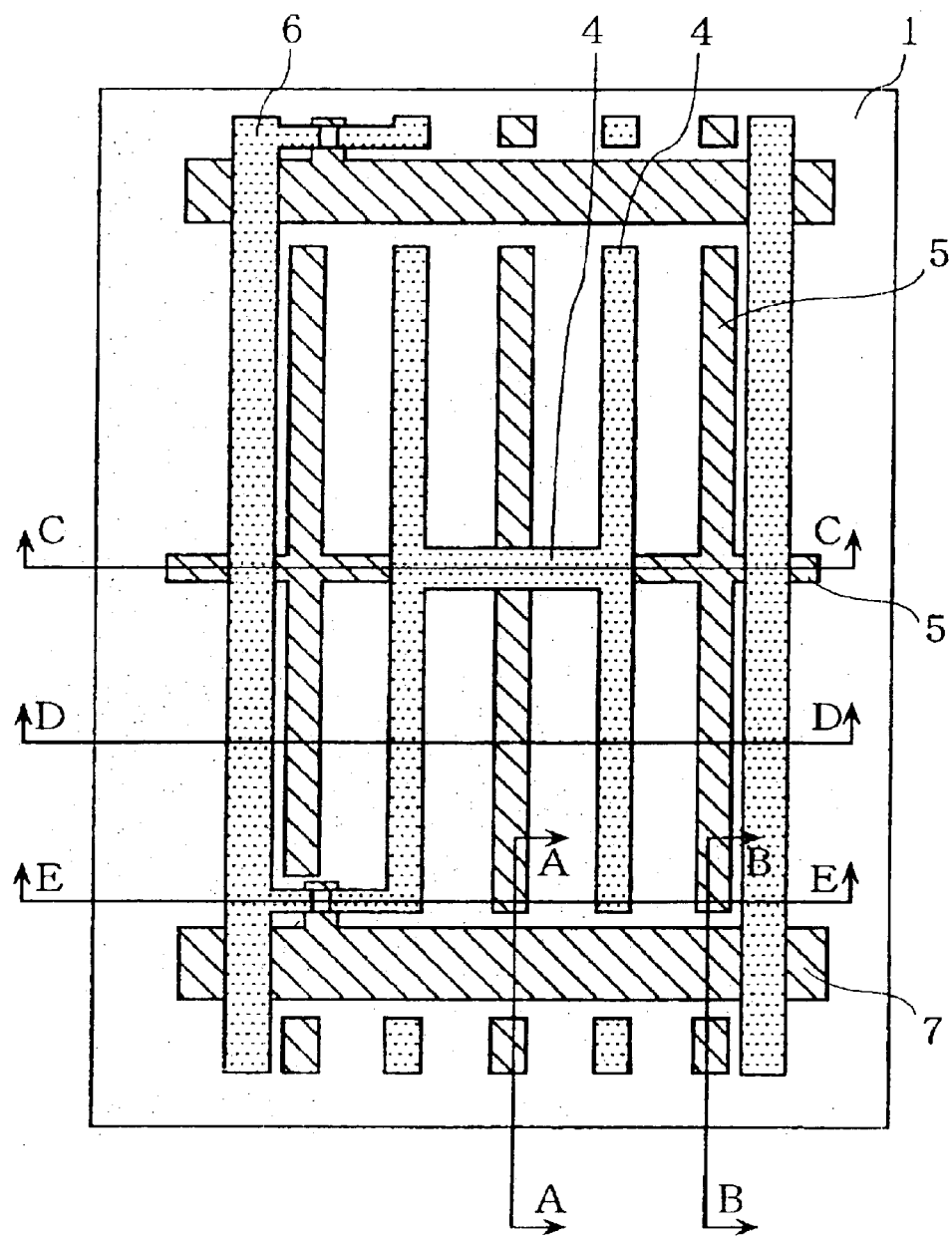
FIG. 4 shows a plan view of an IPS liquid crystal display device of the prior art.
Figure 5:
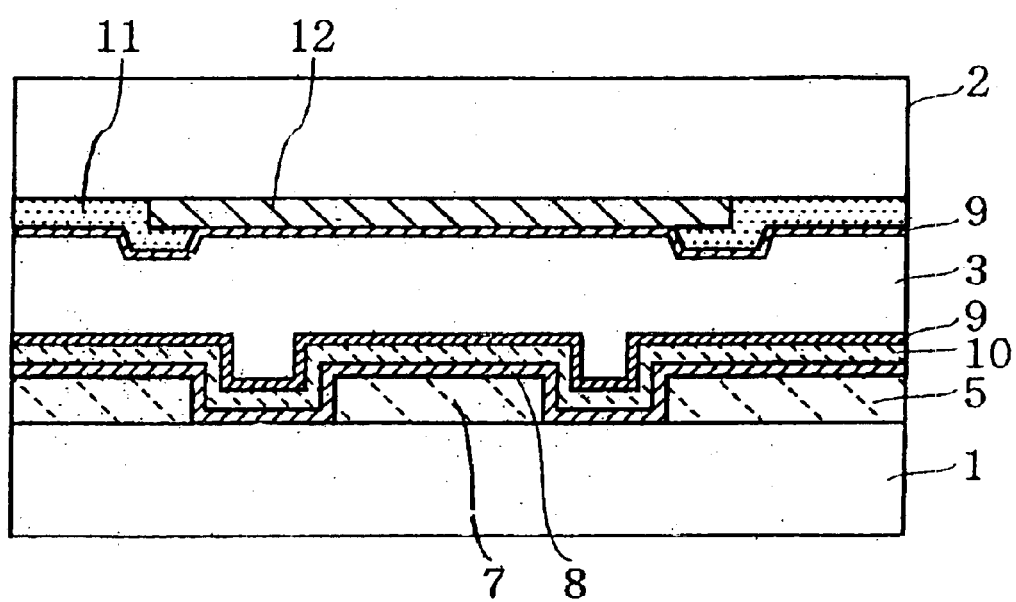
FIG. 5 shows the A—A and B—B line cross-sections of the liquid crystal display device of the same.
Figure 6:
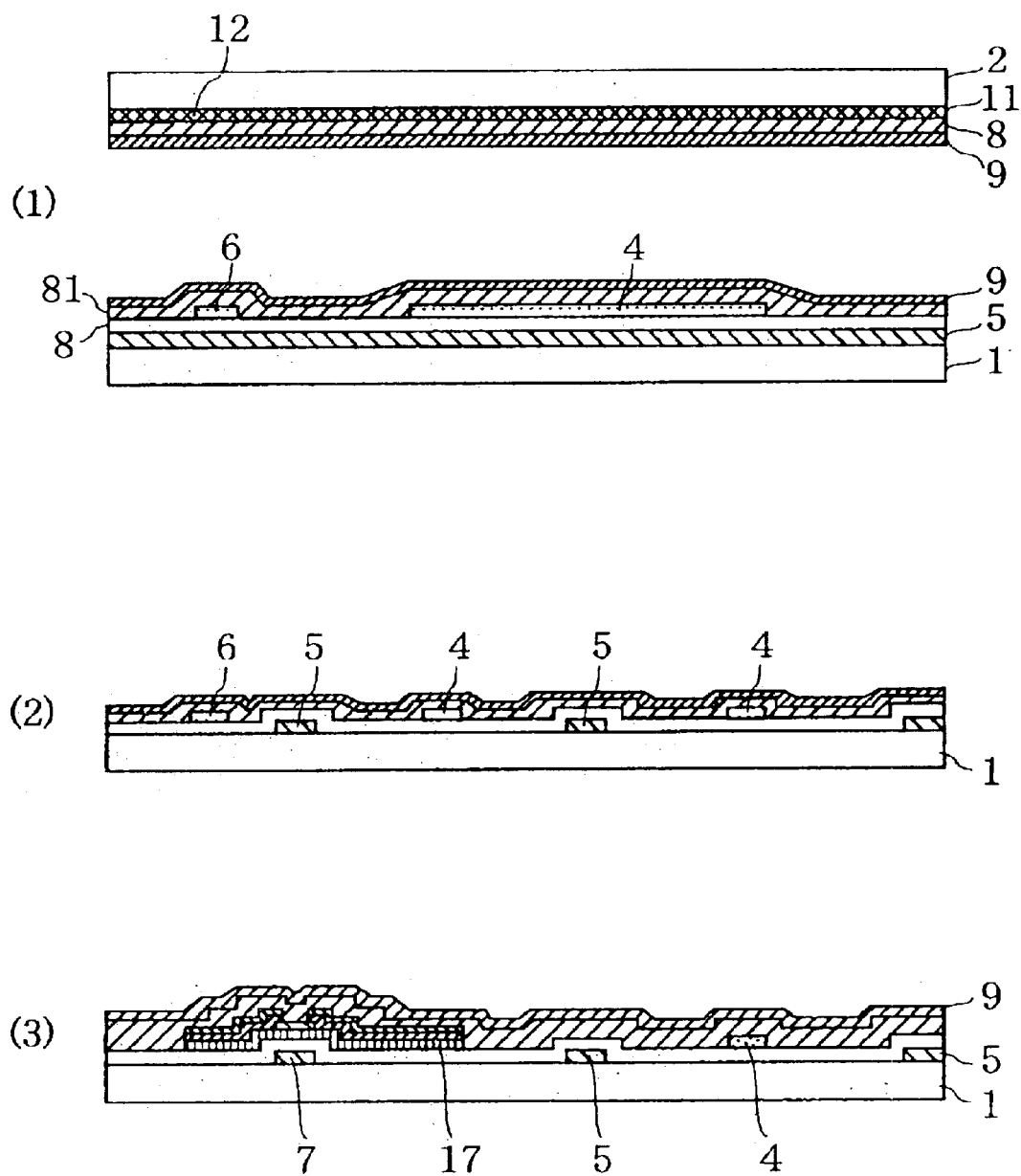
FIG. 6 shows the C—C, D—D, and E—E line cross-sections of the liquid crystal display device of the same.
Figure 7:
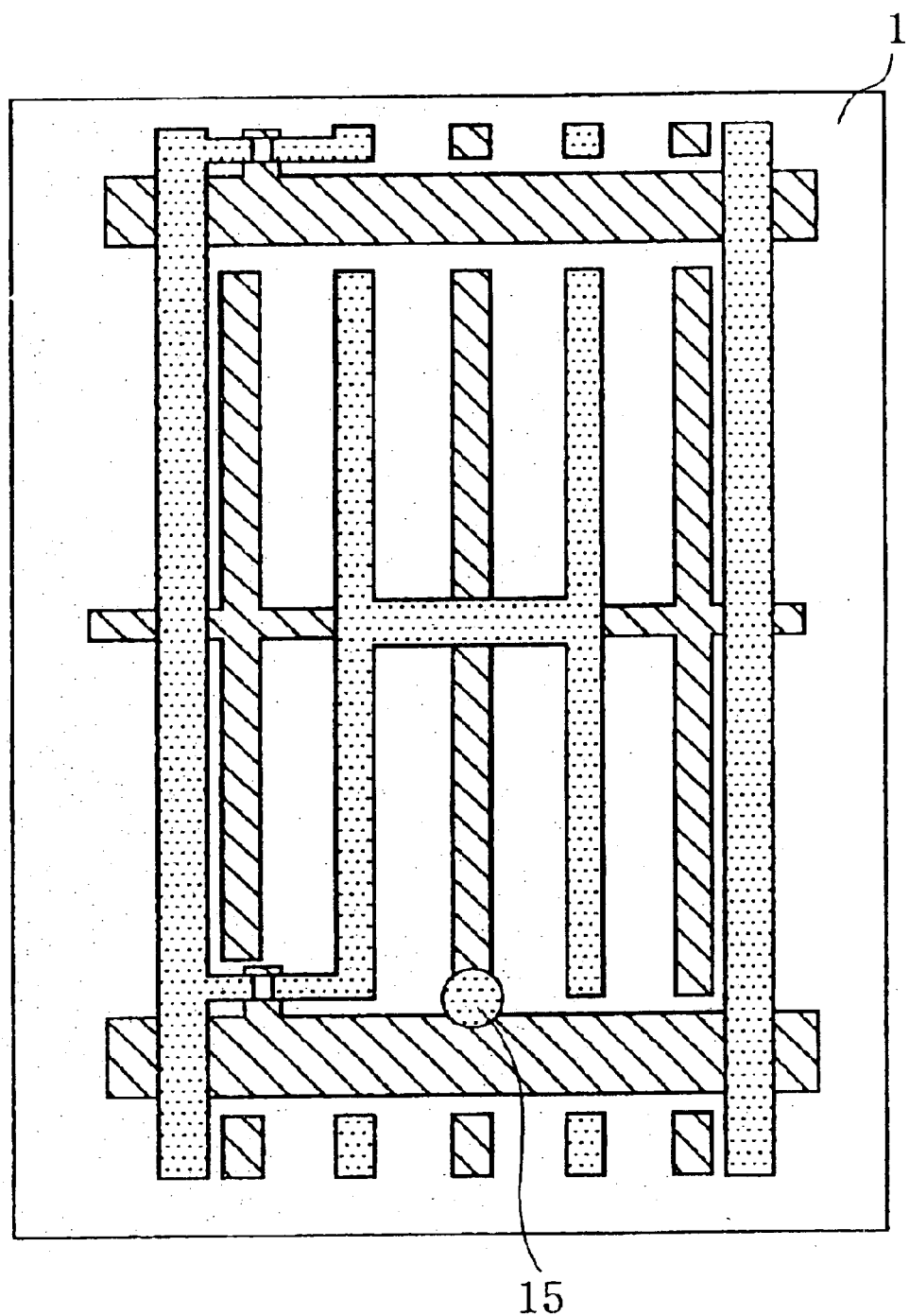
FIG. 7 is a plan view showing how foreign matter adheres in the liquid crystal display device.
Figure 8:
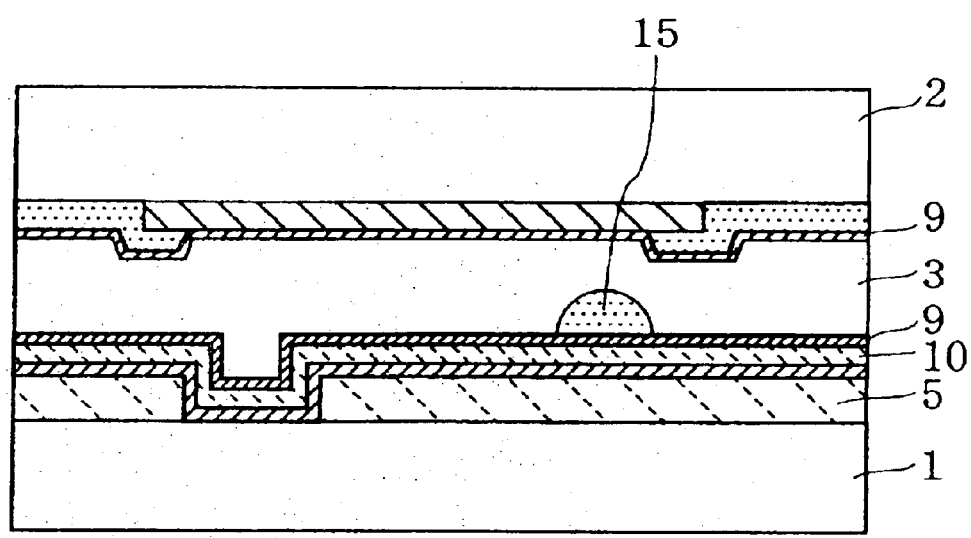
FIG. 8 is a cross-sectional view showing how foreign matter adhere in the liquid crystal display device.
Figure 9:
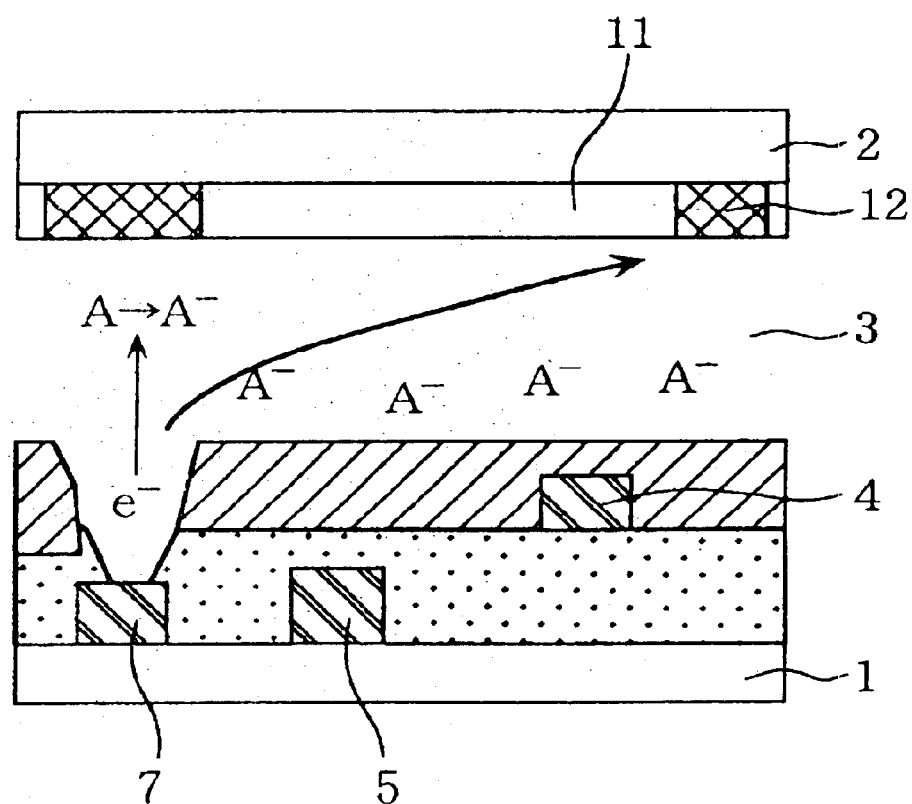
FIG. 9 schematically shows the mechanism by which black dot nonuniformities are generated.
Figure 10:
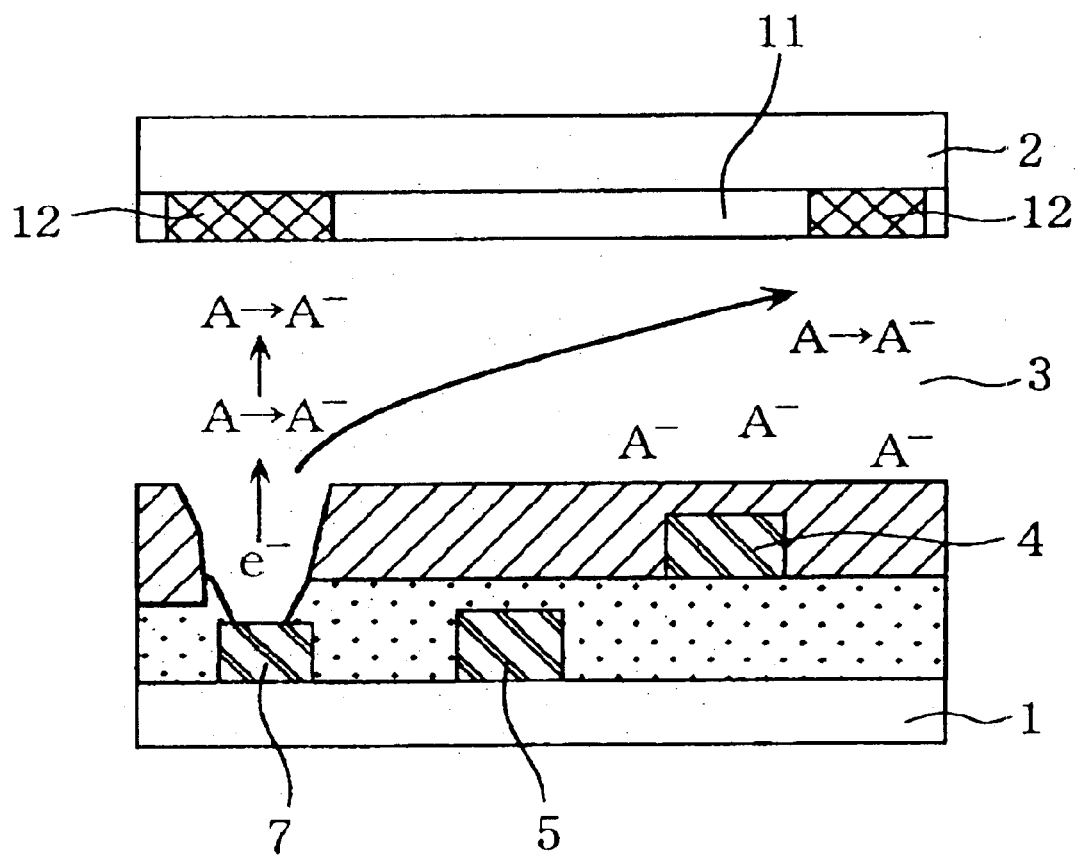
FIG. 10 schematically shows an expansion of the mechanism by which black dot nonuniformities are generated.

The major difference between this liquid crystal element and the liquid crystal element of the prior art shown in FIGS. 4 to 6 is that it has a neutralization electrode 30.

The liquid crystal element according to the present embodiment is for an RGB, IPS mode TFT liquid crystal display panel with a 15.2 inch (diagonal) screen, 16:9 aspect ratio, and 768×1364 (height×width) resolution. This panel and the liquid crystal element are fabricated as follows.

With reference to both drawings, but particularly to FIG. 18, a gate signal line 7, a common line 5, and a common electrode 5 are formed onto a glass-based array substrate 1 as a metal film that is primarily aluminum, and then patterned into a coplanar shape by photolithography leaving only the necessary portions. The material for the gate signal line is preferably a metal with low line resistance, and is not particularly limited to aluminum-based metals. Moreover, it can of course be a single-layered film or a multi-layered film.

Next, a layer of anodized aluminum film and silicon nitride ($SiN_x$) is deposited as an insulating layer 8 and amorphous silicon is deposited as a semiconductor layer 17 (not shown in detail in either drawing), a portion of the insulating layer on the gate signal line 7 is then removed, and two layers of aluminum/titanium (Al/Ti) are sputter-deposited and patterned by photolithography to form a thin film transistor (TFT) 17 as the switching element, a source signal line 6, and a pixel electrode 4, as well as a storage capacity 41 between the pixel electrode and the common electrode (not shown in FIG. 18). Furthermore, as shown in FIG. 18, a silicon nitride ($SiN_x$) 10 is deposited by CVD as a protective layer (film) 10, on which a metal film that is primarily aluminum is formed as the neutralization electrode 30 and patterned by photolithography along the gate signal line 7. The neutralization electrodes are formed so that they link to one another outside the region shown. Furthermore, an orientation film 9 is formed thinly over the neutralization electrode 30.

An orientation film 9 (AL5417, made by JSR) is printed on the opposing surface sides of the array substrate 1 formed as above and on an orientation (color filter) substrate 2 arranged in opposition to the array substrate and on which a black matrix 12 and a RGB (red, green, blue) color filter 11 have been formed. The orientation film 9 is then rubbed, the two substrates are laminated to one another with a 3.5 μm spaced gap therebetween, and liquid crystal 3 is vacuum injected into this gap to form the IPS panel. It should be noted that the liquid crystal that is injected is a p-type nematic liquid crystal whose primary component is cyano-substituted phenylcyclohexane, which serves as the p-type component. When no electric field is applied, the liquid crystal is oriented without twist between the top and bottom substrates and the direction of its director forms an 80-degree angle with the gate signal line 7. It should be noted that the polarizing plates, which are not directly related to the gist of the present invention and thus have not been shown in the drawings, make the polarizing axes of the top and bottom substrates perpendicular to one another and are laminated such that one of the polarizing axes matches the direction of the director of the liquid crystal.

In the liquid crystal display panel fabricated as above, to expose a portion of the gate signal line to the liquid crystal layer a laser beam has been irradiated onto a portion of the gate signal line in the same way as when laser repair is performed.

The panel was connected to a driving circuit and continually driven for 300 hours in a 60° C. temperature atmosphere. Up to approximately 300 hours the generation of black dot nonuniformities from defect portions in the insulating layer on the gate signal line could not be observed, and at 300 hours the generation of miniscule black dot nonuniformities could be observed. In the present embodiment, the electrodes are exposed without an insulating layer on the pixel electrode and the source signal line in order to minimize the generation of black dot nonuniformities, even if there are defective portions in the insulating layer on the gate signal line.

The neutralization electrode of this embodiment was formed by a metal with aluminum as its primary component, however, it can also be formed by an electrode material such as ITO.

In FIG. 17, the neutralization electrode 30 is also formed on the source signal line 6, but as partially shown in FIG. 19 (1), it is also possible to form it only on the gate signal line 7 and in such a way that the neutralization electrodes are linked to one another outside the region shown. In this case, the parasitic capacitance formed between the source signal line and the neutralization electrode can be eliminated and delays in the source signal can be kept down.

As partially shown in FIG. 19(2), the neutralization electrode 30 can also be formed removed of the gate signal line 7. In this case, the parasitic capacitance that is formed between the gate signal line and the neutralization electrode can be reduced and gate signal delays can be suppressed. From the standpoint of inhibiting parasitic capacitance and reducing the probability of pinholes, the protective layer formed between the gate signal line and the neutralization electrode is preferably thick and formed at a thickness of at least 2000 Å, and even more preferably formed at a thickness of at least 3500 Å.

Figure 20:
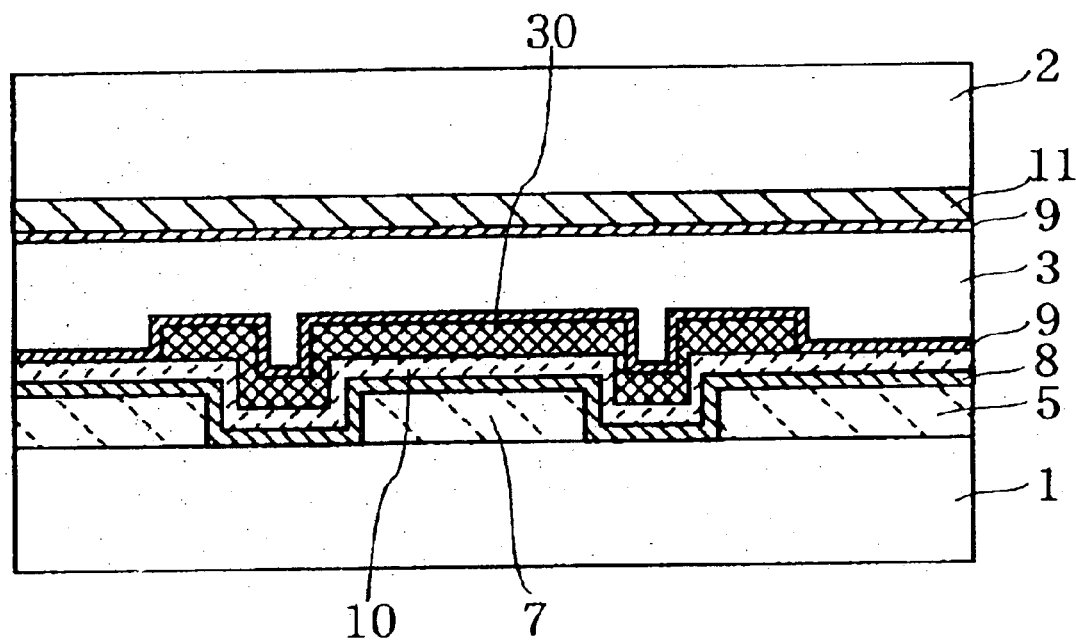
FIG. 20 is a cross-sectional view of a modified example of the liquid crystal display device according to this embodiment.
Figure 21:
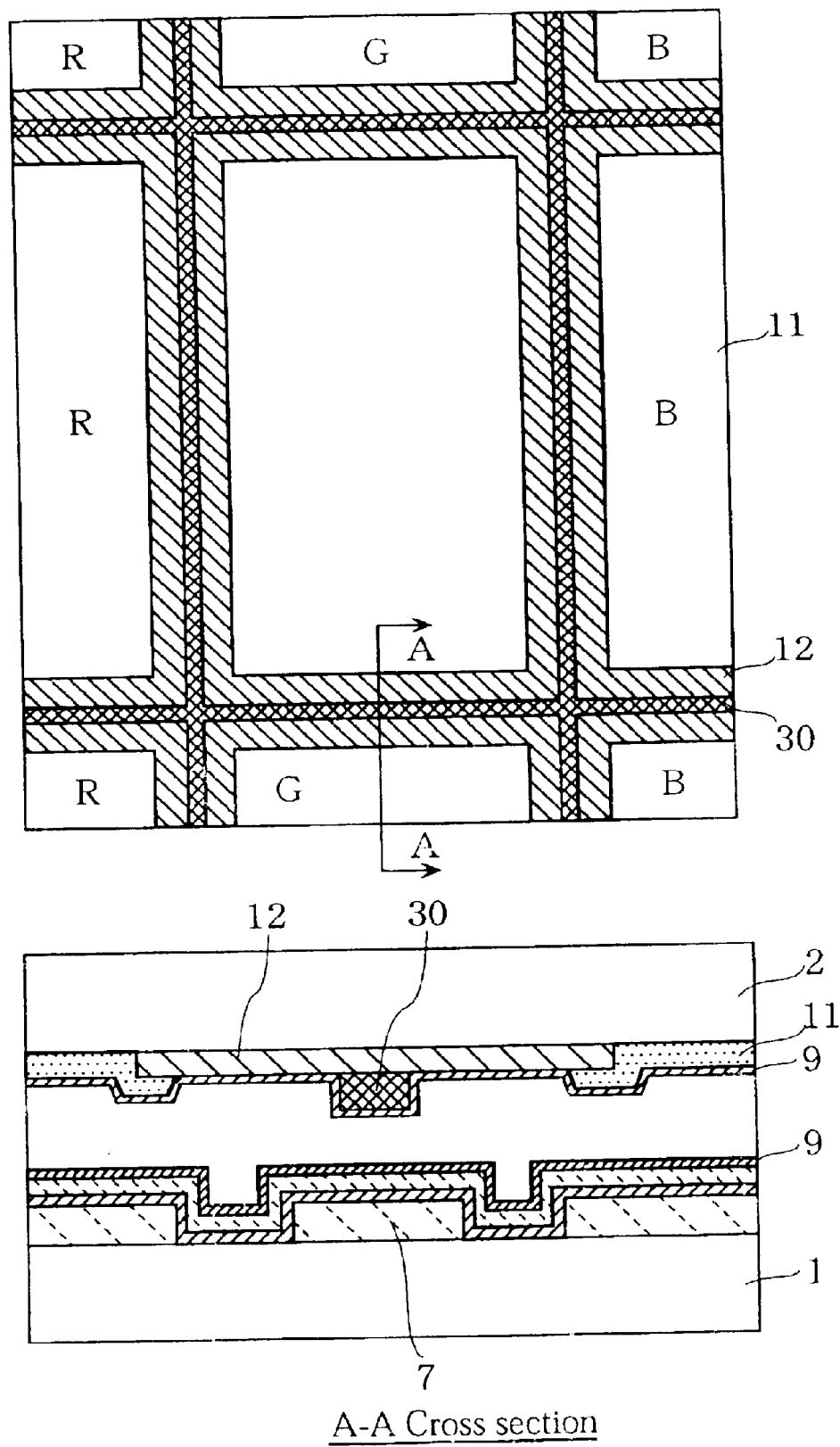
FIG. 21 is a plan view and cross-sectional view of the liquid crystal display according to Embodiment 2-2-3 of the present invention.

Furthermore, a light-blocking material with metal chrome or a conductive polymer such as polypyrrole as the main constituent can be used for the neutralization electrode, and as shown in FIG. 20, it can be formed such that it blocks light at the gap between the gate signal line 7 and the common electrode 5 or the gap between the source signal line and the common electrode. In this case, a black matrix doe not have to be formed on the color filter substrate, so that the number of process steps and the cost can be reduced.

Strictly speaking, forming the neutralization electrode makes the surface of the orientation film uneven, and thus a resin may be chosen that can be given an orientation by irradiating UV light.

Comparative Example 1

As a comparative example, a liquid crystal display panel was fabricated that was different from the liquid crystal display panel of the present embodiment only in that a neutralization electrode is not formed after silicon nitride ($SiN_x$) has been deposited over the entire surface of the pixel portion as a protective layer. A plan view and a cross-sectional view of the array shape in the pixel portion of this panel are the same as those illustrated by FIGS. 4 and 5, respectively.

In this comparative example, a laser beam has of course been irradiated onto a portion of the gate signal line to remove the insulating layer of that portion of the gate signal line, so that a defect portion in the insulating layer on the gate signal line is created in model fashion.

The panel was connected to a drive circuit and continually driven in an atmosphere of 60° C. temperature, and at 20 hours the generation of black dot nonuniformities from the defect portion of the insulating layer on the gate signal line was observed.

It seems that in this comparative example the black spots are caused in a relatively short time, because the other electrodes near the defect portion in the insulating layer on the gate signal line are all covered by the insulating layer.

Embodiment 2-2-2

A driving circuit was connected to the liquid crystal display panel fabricated in the previous first embodiment (hereinafter, in such cases the "2-2-" will be omitted), one end of the neutralization electrode was connected to the power source circuit of this driving circuit, and a +6V electric potential was applied. This panel was continually driven for 500 hours in an atmosphere of 60° C. temperature, but generation of black dot nonuniformities could not be observed from the defect portion of the insulating layer on the gate signal line.

Embodiment 2-2-3

In this embodiment, the neutralization electrode is formed on the opposing substrate side.

For this, an array substrate identical to that of the first embodiment was fabricated, except that no neutralization electrode was formed. Then, the neutralization electrode 30 was patterned on the black matrix 12 of the color filter substrate 2 in opposition to this substrate by the same method as described in the previous embodiments. Furthermore, an orientation film (AL5417, made by JSR) was printed on the opposing surface sides of both of these substrates, rubbed, and produced using the same steps as those of the previous embodiments. Moreover, also a laser beam was irradiated onto a portion of the gate signal line in the same way as when laser repair is performed, so as to expose a portion of the gate signal line to the liquid crystal layer.

A driving circuit was connected to this panel and one end of the neutralization electrode was connected to the power source of this driving circuit, and a +6V electric potential was applied. This liquid crystal display panel was continually driven for 500 hours in an atmosphere of 60° C. temperature, but no black dot nonuniformities generated from the defect portion of the insulating layer on the gate signal line were observed.

In the present embodiment, black dot nonuniformities can be prevented from occurring, even if there is a defect portion in the insulating layer on the gate signal line, because a neutralization electrode has been formed. Also, in the present embodiment, the neutralization electrode was formed on the color filter substrate side instead of on the array substrate side, so that a liquid crystal panel without signal delays is achieved in which there is hardly any increase in parasitic capacitance of the gate signal line or the image signal line.

It should be noted that in the present embodiment, the neutralization electrode was also formed on the source signal line, but as partially shown in FIG. 22(1), it can be formed only on the gate signal line 7 or only in that direction. Also, the neutralization electrode was formed separately on the black matrix, but as partially shown in FIG. 22(2), it is also possible to form the black matrix with a conductive material whose primary constituent is, for example, metal chrome or a conductive polymer such as polypyrrole, and to have the black matrix 12 itself serve as the neutralization electrode 30. In this case, the neutralization electrode does not have to be separately formed, and thus a reduction in the number of process steps and the cost is possible.

Third Inventive Group

In the present inventive group, an open portion in the insulating film, for example, is combined with the neutralization electrode on the opposite side.

Embodiment 2-3-1

Figure 23:
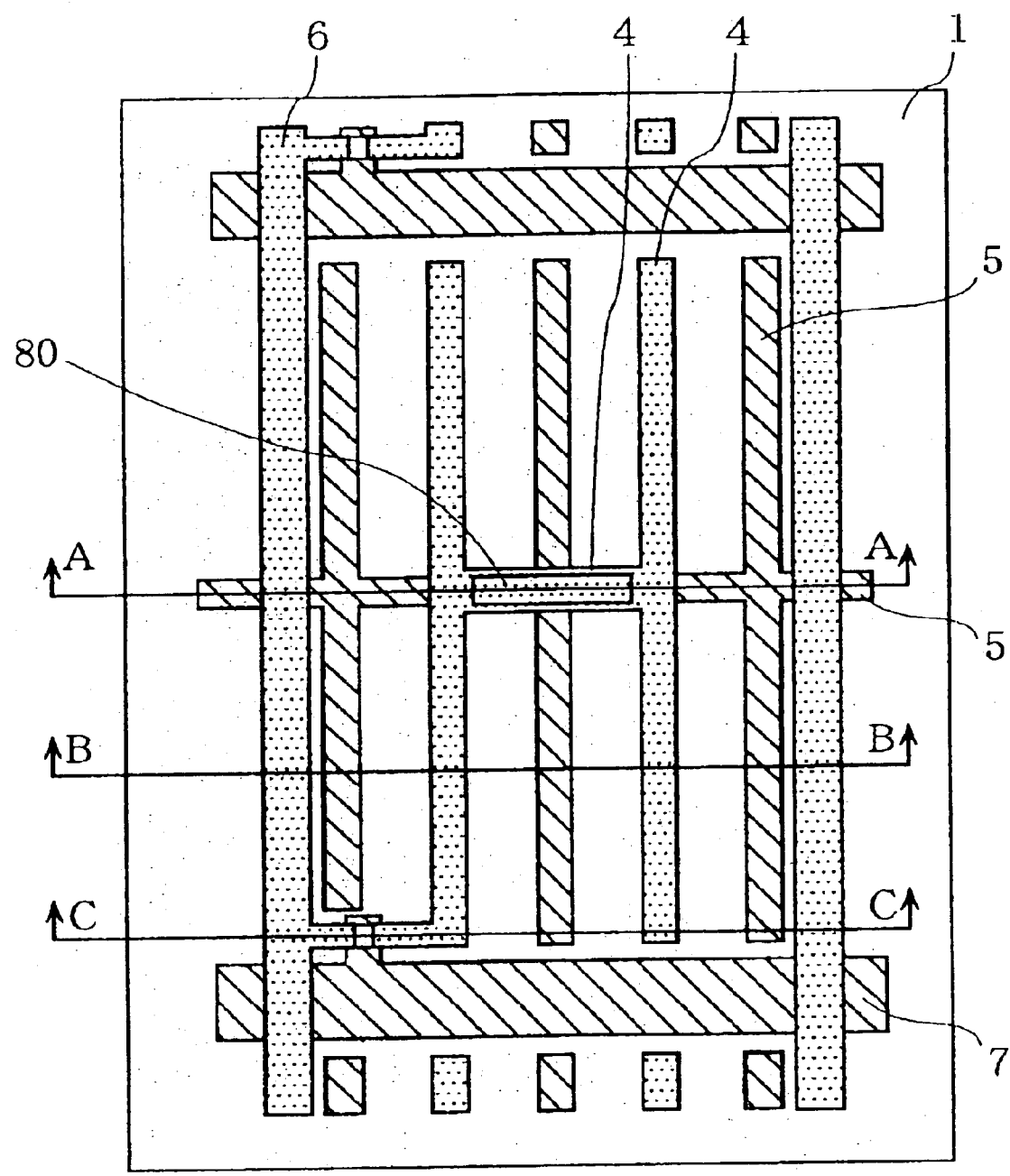
FIG. 23 is a plan view of the array side substrate of the liquid crystal panel according to Embodiment 2-3-1 of the present invention.

FIG. 23 is a plan view of the array substrate side of the liquid crystal panel according to this embodiment.

Figure 24:
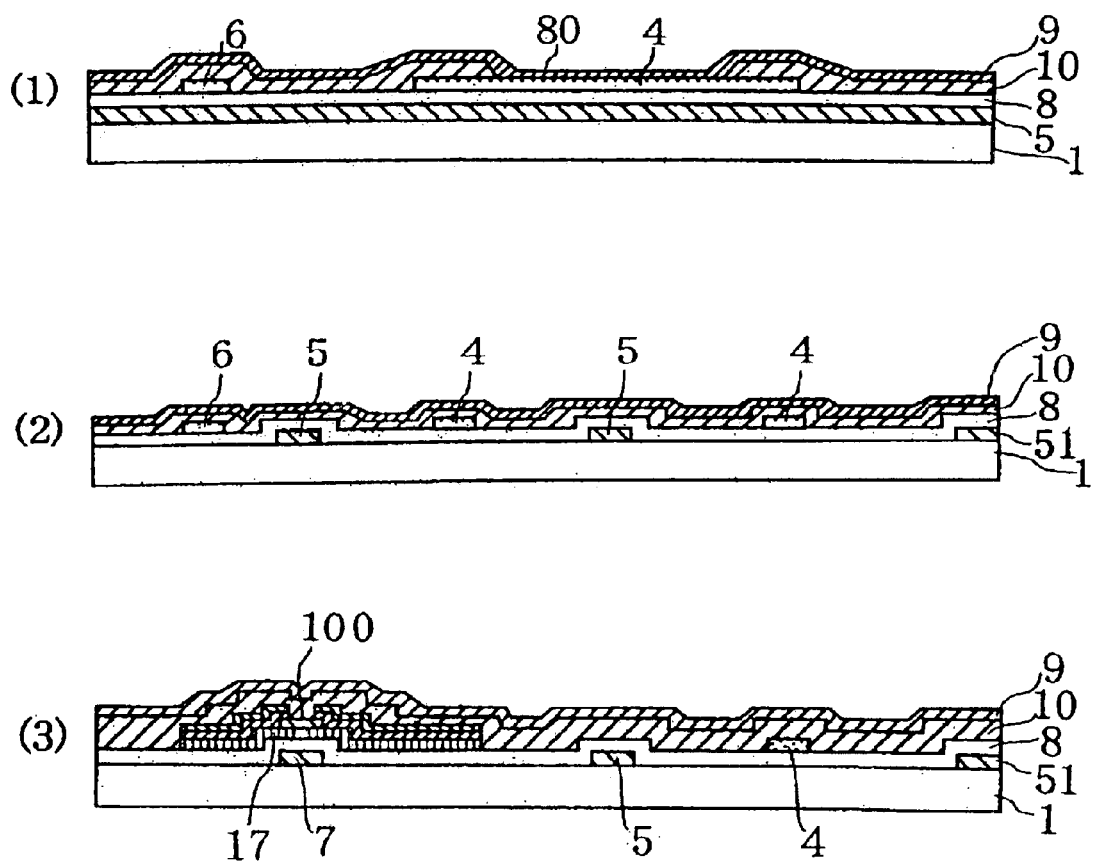
FIG. 24 is a cross-sectional view of this liquid crystal panel.

FIG. 24(1) is a cross-sectional view taken along the line A—A, FIG. 24(2) is a cross-sectional view taken along the line B—B, and FIG. 24(3) is a cross-sectional view taken along the line C—C in FIG. 23.

The following is a description of the liquid crystal panel shown in both drawings.

Although many aspects of the following are so-called widely known technologies, some of these aspects are relevant to the present invention, and thus a simple description including TFTs and the method for manufacturing them is made.

An image signal line (source) 6 and a scanning signal line (gate) 7 are formed as the metal wiring in a matrix on a glass substrate 1, and a semiconductor layer (TFT: Thin Film Transistor) is formed as an active element (switching element) at their intersection.

A gate electrode 7 and a common electrode 5 are selectively formed (in specified locations) on the glass substrate 1 using a metal such as Al.

Next, 3000 Å thick $SiN_x$ serving as a first gate insulating film and a protective film 10 is formed by plasma CVD, a 500 Å thick semiconductor layer (amorphous silicon layer) serving as the channel portion of the transistor is formed, and 1500 Å thick $SiN_x$ is formed as a protective film 100 also serving as an etching stopper. As shown in FIG. 24(3), the method for forming the channel portion of the transistor at this time is to obtain an ohmic junction by forming a $SiN_x$ insulating film above the gate electrode which is smaller than the gate electrode to serve as an etching stopper, and to form a 500 Å thick n+ amorphous silicon layer that includes phosphorous over that film by plasma CVD (n+: high-concentration doping, with a high ratio of added n-type impurities).

Next, contact holes were formed peripherally to the formed electrodes, for example, to establish contact with the wired portions.

Then, using a metal such as Al/Ti, the signal line (source line) 6, the drain line, and the pixel electrode 4 were formed at a thickness of 4000 Å.

After this, $SiN_x$ is formed by plasma CVD to a thickness of 3500 Å as a second insulating film (passivation film) or the protective film 10 protect the wiring.

For this, by applying resist with a spinner and performing mask exposure after the substrate has been cleaned, the second insulating film (passivation film) 10 is selectively formed (in a partial region) and the pixel portion is provided with a region 80 where a portion of the insulating film (or protective film 10) has not been formed. More specifically, as illustrated in the center of FIG. 23 and in FIG. 24(1), the second insulating film (passivation film) 10 is not formed at the partial region 80 on the storage capacity portion 4.

Developing and drying are then performed, and dry etching is conducted by RIE (reactive ion etching), after which the resist is removed.

Next, an Al electrode 30 is formed as a neutralization electrode at a portion of the black matrix 12 on the side of the opposing glass substrate 2 with the color filter 11.

$SiN_x$ is selectively formed (only to the partial region) on this Al electrode as an insulating film. A portion of the insulating film is removed at this time to enable ions generated even on the opposing substrate side to be deionized.

Figure 25:
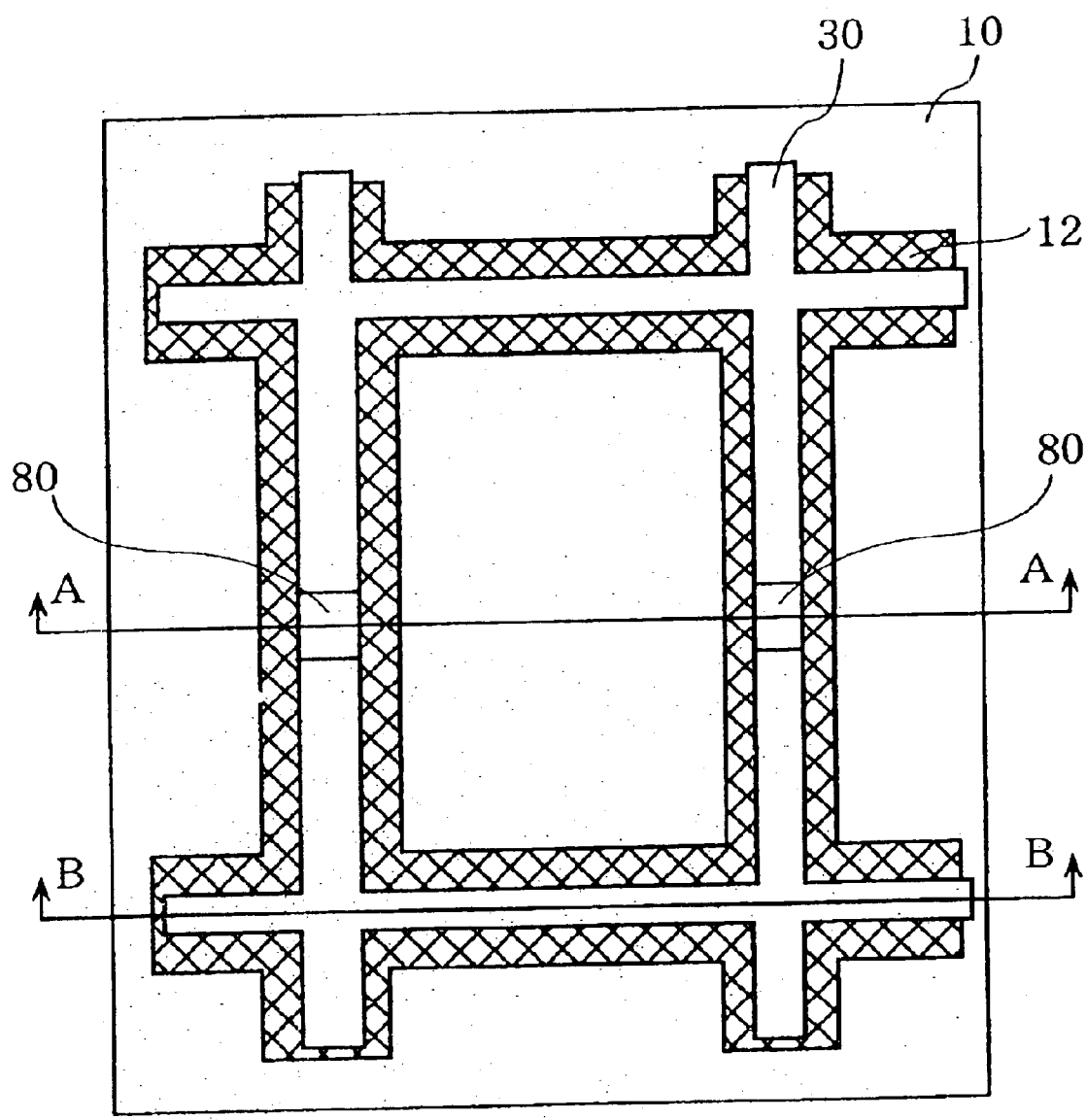
FIG. 25 is a plan view of the opposing substrate of the liquid crystal panel of this embodiment.

FIG. 25 is a top view showing the configuration on the opposing glass substrate side.

Figure 26:
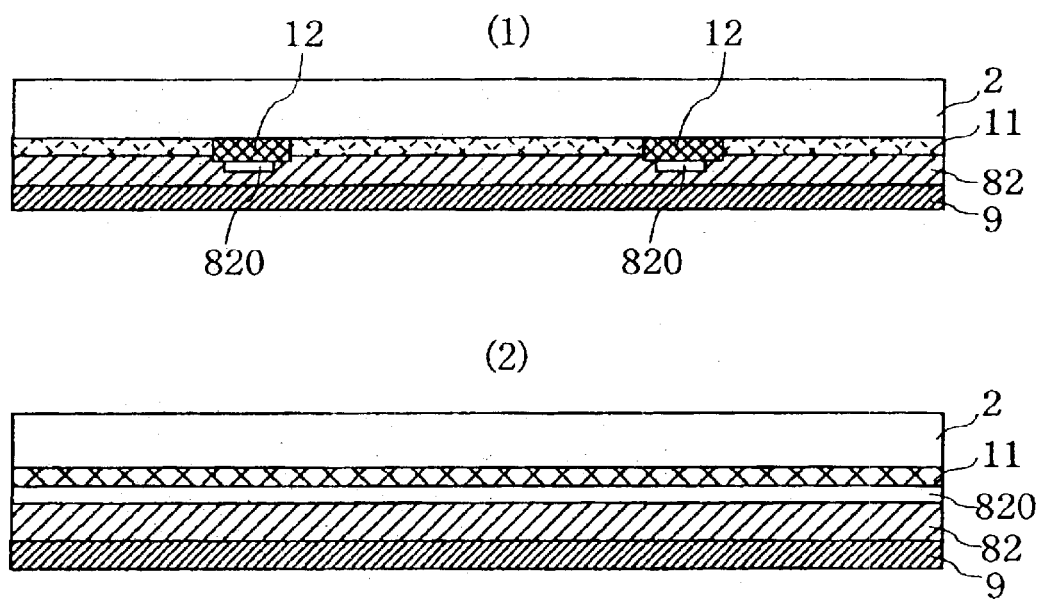
FIG. 26 is a cross-sectional view of this opposing substrate.

FIG. 26(1) is a cross-sectional view taken along the line A—A and FIG. 26(2) is a cross-sectional view taken along the line B—B in FIG. 25. In FIG. 26, numeral 82 denotes an insulating film on the opposing substrate side and numeral 820 denotes a partially defective portion of this insulating film located directly below the black matrix 12, which dually serves as the neutralization electrode. It should be noted that numeral 9 is the orientation film, numeral 10 is the protective film, and numeral 11 is the color filter.

Next, the orientation films 9 (AL 5417, made by JSR) are printed and cured on the opposing glass substrate 2 with the color filter 11 and on the substrate 1 on which the array has been formed, and the orientation films 9 are then rubbed.

Next, a sealing resin (STRUCTBOND, made by Mitsui Toatsu) is printed onto the edge of the glass substrate. 4.0 μm glass fibers (made by Nippon Electric Glass) are mixed into the sealing resin as spacers.

After this, 3.5 μm diameter resin spheres (EPOSTER-GP-HC, made by Nippon Shokubai Co., Ltd.) are spread throughout the display region as spacers to hold the spacing between the substrates.

The two substrates are then adhered to one another and heated at 150° C. for two hours to cure the sealing resin.

A liquid crystal 3 with a positive dielectric anisotropy is injected into the empty panel fabricated as above by vacuum injection (a method in which the empty panel is placed in a reduced-pressure tank and the inside of the panel is evacuated, after which the injection port is brought into contact with the liquid crystal and the inside of the tank is returned to normal pressure so that the liquid crystal is injected into the panel).

The liquid crystals used and their specific resistances are shown in Table 1.

TABLE 1

|   | specific resistance (Ω cm) | display burn-in |
|---|---|---|
| liquid crystal A | at least $10^{11}$ but less than $10^{12}$ | A |
| liquid crystal B | at least $10^{12}$ but less than $10^{13}$ | A |
| liquid crystal C | at least $10^{13}$ but less than $10^{14}$ | B |
| liquid crystal D | at least $10^{14}$ but less than $10^{15}$ | C |

Optically curable resin (Loctite 352A, made by Loctite Japan) is then applied to the entire injection port of the liquid crystal panel as a sealing resin and light is irradiated at 10 mW/cm$^2$ for five minutes to cure the sealing resin.

Polarizing plates (NPF-HEG1425DU, made be Nitto Denko, not shown) are then adhered to the top and bottom of the substrates (outer side of the glass substrates).

As a comparative example, the panels shown in Table 2 were produced.

TABLE 2

|   | Array Substrate Side Insulating Film | Opposing Substrate Side Electrode | Opposing Substrate Side Insulating Film | Size of Black Dot Non-uniformities |
|---|---|---|---|---|
| Present Invention | insulating film removed | yes | insulating film removed | 0.1 mm |
| Comparative Example 1 | insulating film not removed | no | — | 5 mm |
| Comparative Example 2 | insulating film not removed | yes | insulating film not removed | 5 mm |
| Comparative Example 3 | insulating film not removed | yes | insulating film removed | 2 mm |
| Comparative Example 4 | insulating film removed | no | — | 2 mm |
| Comparative Example 5 | insulating film removed | yes | insulating film not removed | 2 mm |

In Comparative Examples 1 and 2, the black dot nonuniformities are large, because the electrode for deionizing the ions unevenly distributed in the gate potential has not been exposed.

In Comparative Example 3, the insulating film on the array substrate was not removed, however, since the electrode for deionization was formed on the opposing substrate side, the black dot nonuniformities were smaller than in the Comparatives Examples 1 and 2 but still not small enough.

In Comparative Examples 4 and 5, the ions unevenly distributed in the gate potential can be deionized to a certain extent, because the insulating film on the array substrate has been removed, however, because an electrode for deionization was not formed on the opposing substrate side, or because the electrodes on the opposing substrate side were not exposed, the black dot nonuniformities were smaller than in the comparatives examples 1 and 2 but still not small enough.

In present embodiment, the insulating film of the array substrate has been removed and an electrode for deionization has been formed on the opposing substrate side as well, so black dot nonuniformities can be kept sufficiently small at 0.1 mm or less.

The differences between this embodiment and the comparative examples are schematically shown in FIG. 27.

A laser was irradiated onto the gate portion of these panels to expose the gate potential and the panels were placed into a 70° C. high temperature tank and driven for 12 hours, after which they were displayed at half tone and evaluated.

The electric potential of the neutralization electrode on the opposing substrate side was set so to the same electric potential as that of the common electrode of the array substrate side.

As shown in Table 2, the result was that the Comparative Examples 1 and 2 exhibited large black dot nonuniformities because the electrode for deionizing the ions unevenly distributed in the gate potential was not exposed.

In Comparative Example 3, the insulating film on the array substrate was not removed, but because the electrode for deionization was formed on the opposing substrate side, the black dot nonuniformities are smaller than in the Comparatives Examples 1 and 2 but still not small enough.

In Comparative Examples 4 and 5, the ions unevenly distributed in the gate potential can be deionized to a certain extent because the insulating film on the array substrate has been removed, however, because an electrode for deionization has not been formed on the opposing substrate side, or because the electrodes on the opposing substrate side have not been exposed, the black dot nonuniformities are smaller than in the Comparatives Examples 1 and 2 but still not small enough.

In the present embodiment, the insulating film of the array substrate has been removed and an electrode for deionization has been formed on the opposing substrate side as well, so black dot nonuniformities could be kept sufficiently small at 0.1 mm or less.

Also, as can be seen from Table 1, a favorable display without display burn-in can be obtained by making the specific resistance of the liquid crystal less than $10^{13}$ Ω cm.

Embodiment 2-3-2

FIG. 28 shows the structure of the opposing glass substrate side of the liquid crystal panel of this embodiment.

FIG. 28(1) is a plan view and FIG. 28(2) is a cross-sectional view of FIG. 28(1).

In the previous embodiment, a portion of the insulating film on the neutralization electrode on the opposing substrate side was removed, but in this embodiment, no insulating film has been formed at all on the neutralization electrode 12, which also serves as the black matrix, on the opposing substrate side.

Apart from this, the present embodiment is the same as the previous embodiment.

As shown in FIG. 28, there is no insulating film formed on the neutralization electrode at all, so that black dot nonuniformities can be inhibited even more than in the previous embodiment.

In this embodiment, for example, the insulating film on the pixel electrode above the storage capacity was removed like in FIG. 23, but as shown in FIGS. 29 and 30, the removed portion 80 can also be removed above the signal line electrode 6 (vertical direction in the drawing) or above the pixel electrode 4 (center portion of pixel in the drawing), or in other combinations such that it spans these electrodes, for example.

Figure 31:
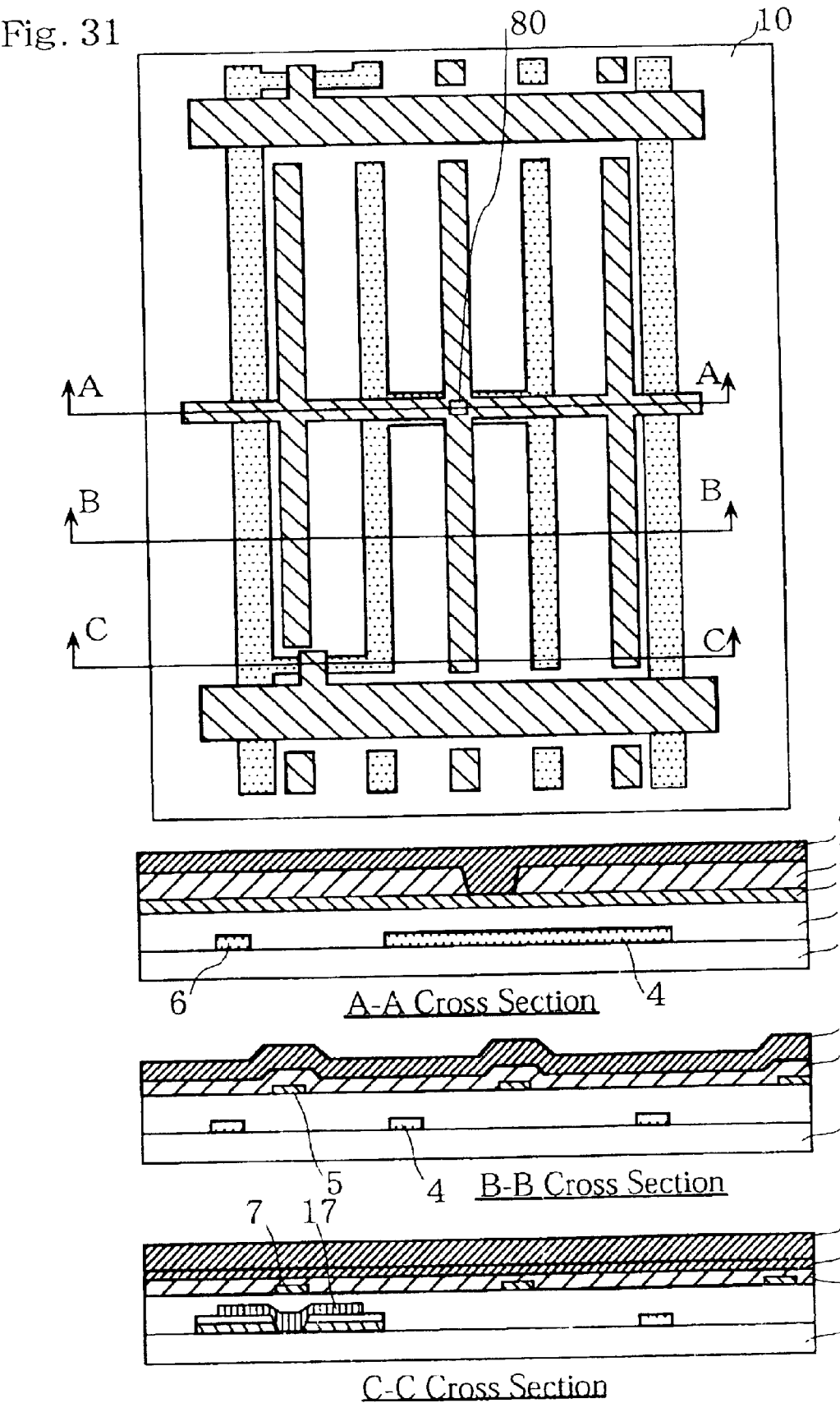
FIG. 31 shows a modified example of the same two embodiments.

Also, as shown in FIG. 31, the common electrode 5 may be formed higher than the pixel electrode 4 and a portion of the insulating film on the common electrode removed.

Furthermore, as shown in FIG. 32, it is also possible to form the common electrode 5 and the pixel electrode 4 in the same layer, and to remove a portion of the insulating film on top.

Figure 33:
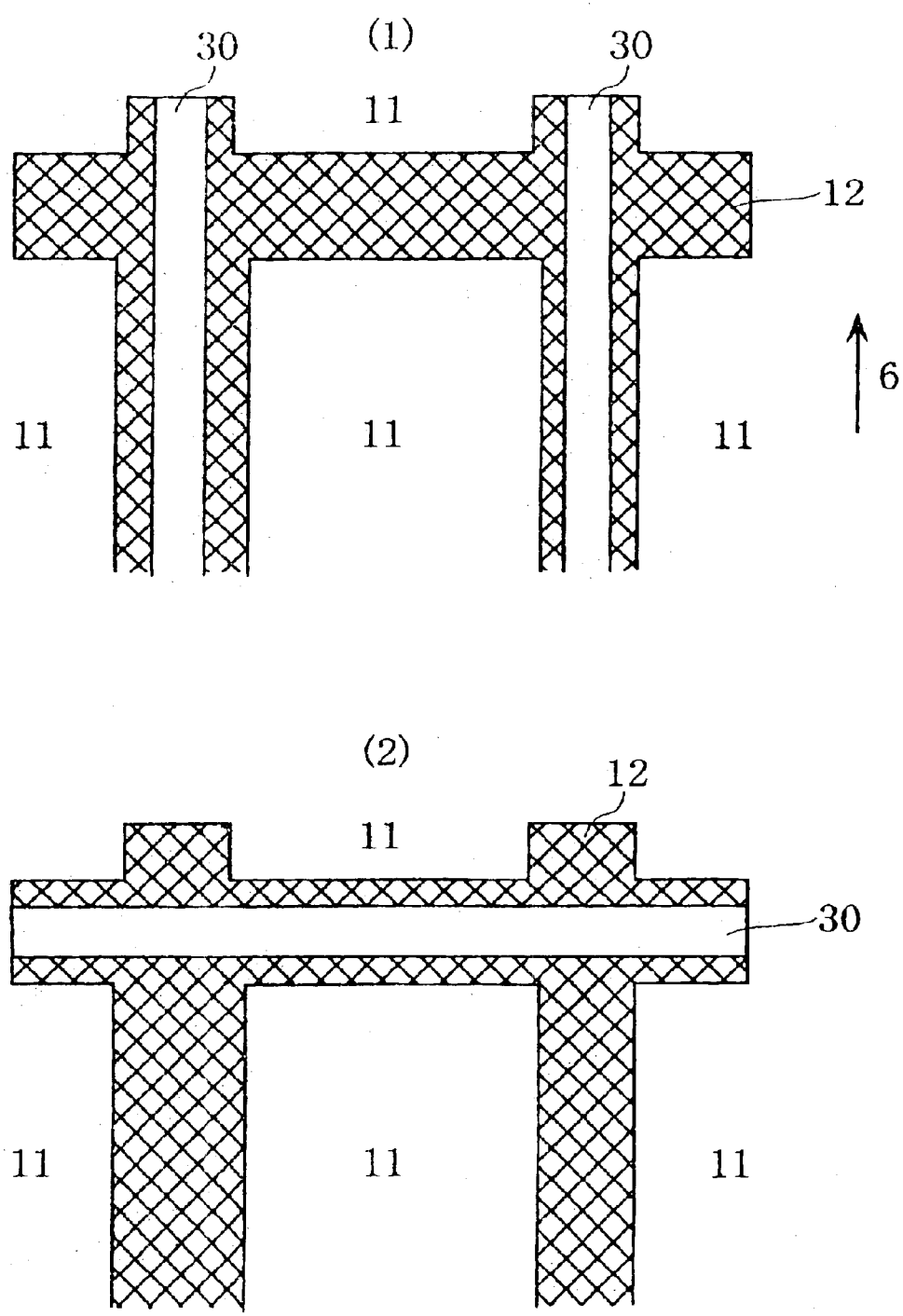
FIG. 33 shows a modified example of the same two embodiments.
Figure 34:
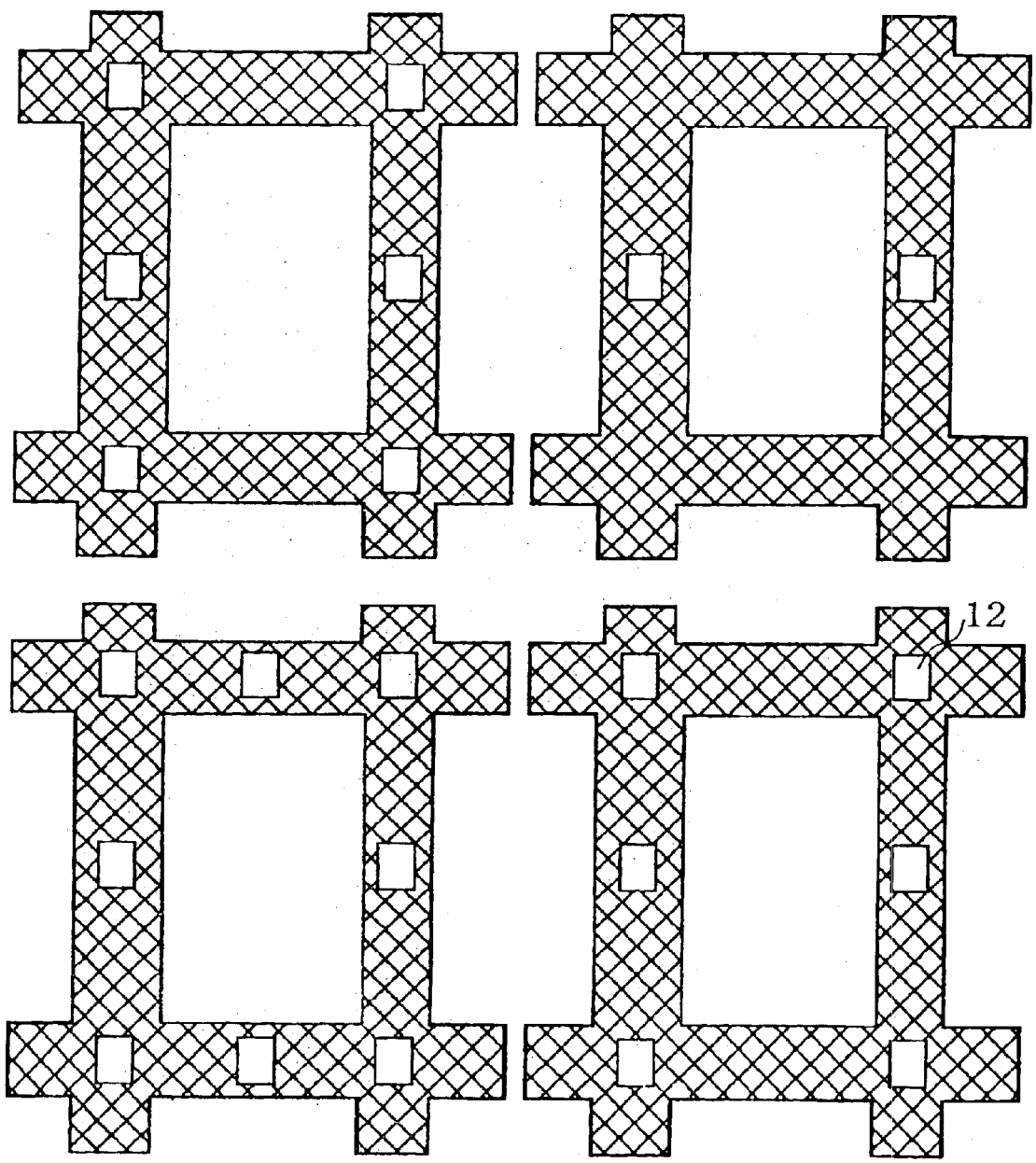
FIG. 34 shows a modified example of the same two embodiments.

In the present embodiment, the electrodes formed on the opposing substrate side were formed in a matrix on the black matrix portion, as shown in FIGS. 25 and 28, however, it is also possible to form the electrodes only on a portion of, or the direction corresponding to, the signal line electrode 6 and indicated by the arrow in FIG. 33(1), or only on the portion of, or the direction corresponding to, the scanning line 7 indicated in FIG. 33(2). They can also be formed in islands as shown in FIG. 34.

Embodiment 2-3-3

Figure 35:
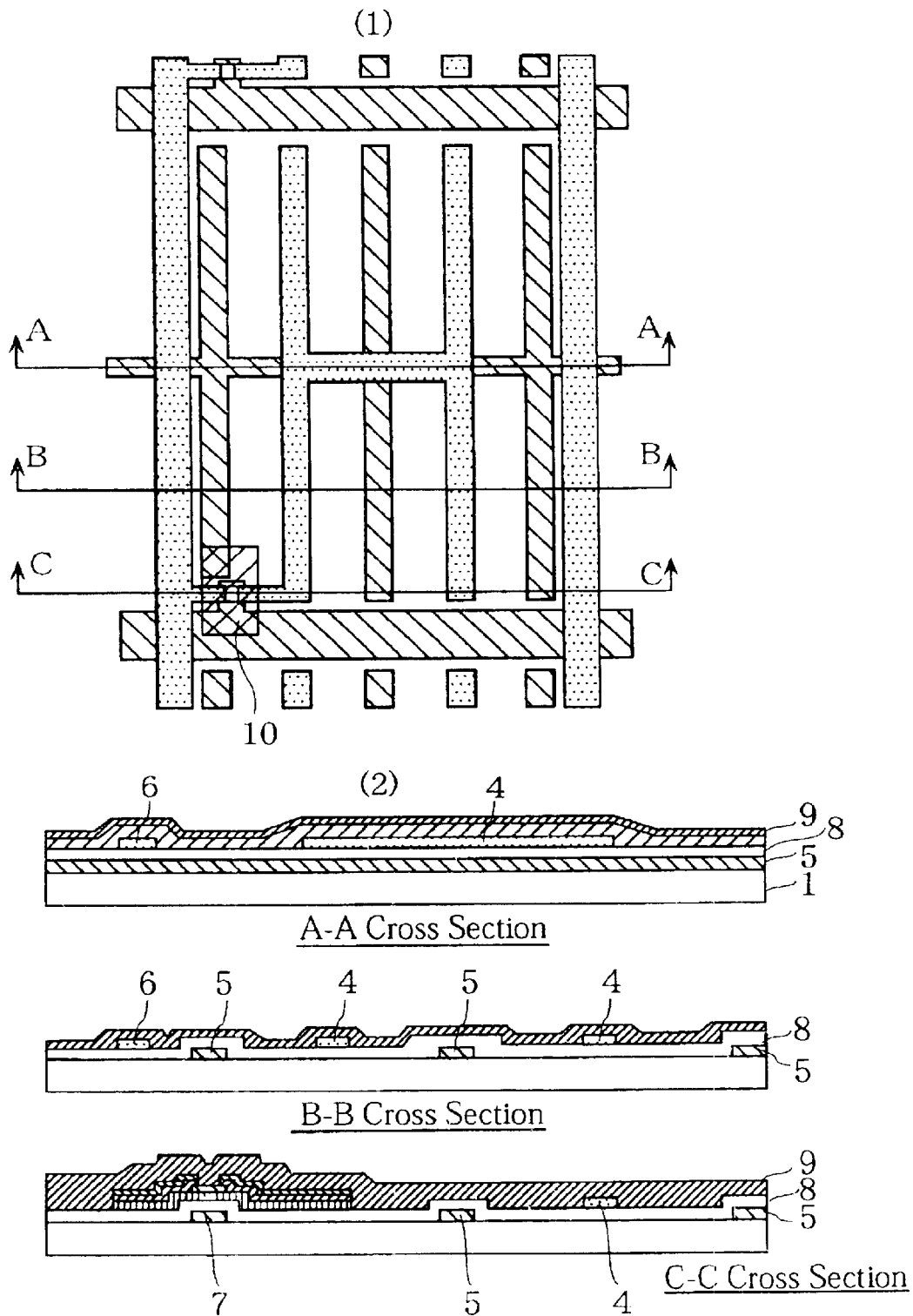
FIG. 35 shows the structure of the liquid crystal panel according to Embodiment 2-3-3 of the present invention.

In the previous two embodiments, the second insulating film was removed only from a portion above the storage capacity, but in the present embodiment, the second insulating film (passivation film) 10 is formed only above the TFTs, which is the switching elements, as shown in FIG. 35(1) (that is, as shown in FIG. 35(2), the insulating film is not formed at all on the pixel electrode 4). Aside from this, the present embodiment is the same as the previous embodiment.

FIG. 35 shows the structure of the liquid crystal panel of this embodiment.

FIG. 35(1) is a plan view and FIG. 35(2) is a cross-sectional view of the same.

As shown in FIG. 25, a site where the insulating film is partially not formed on portions of the neutralization electrode was also formed on the opposing substrate side.

With this configuration, the insulating film has not been formed above the pixel electrode at all, so that black dot nonuniformities can be kept from occurring even more so than in the previous two embodiments.

Embodiment 2-3-4

This embodiment is different from the previous embodiment in that no insulating film is formed on the opposing substrate side. Apart from this, the present embodiment is the same as the previous embodiment.

That is to say, as shown in FIG. 28, the insulating film is not formed on the opposing substrate side, and the second insulating film (passivation film) 10 is formed only above the TFTs, that is, the switching elements, on the array substrate side, as shown in FIG. 35 (that is, the insulating film is not formed at all on the pixel electrode 4).

By doing this, the insulating film is not formed at all on either the pixel electrode or the neutralization electrode also serving as the black matrix on the opposing substrate side, so that black dot nonuniformities can be kept from occurring even more than in the previous three embodiments.

Figure 36:
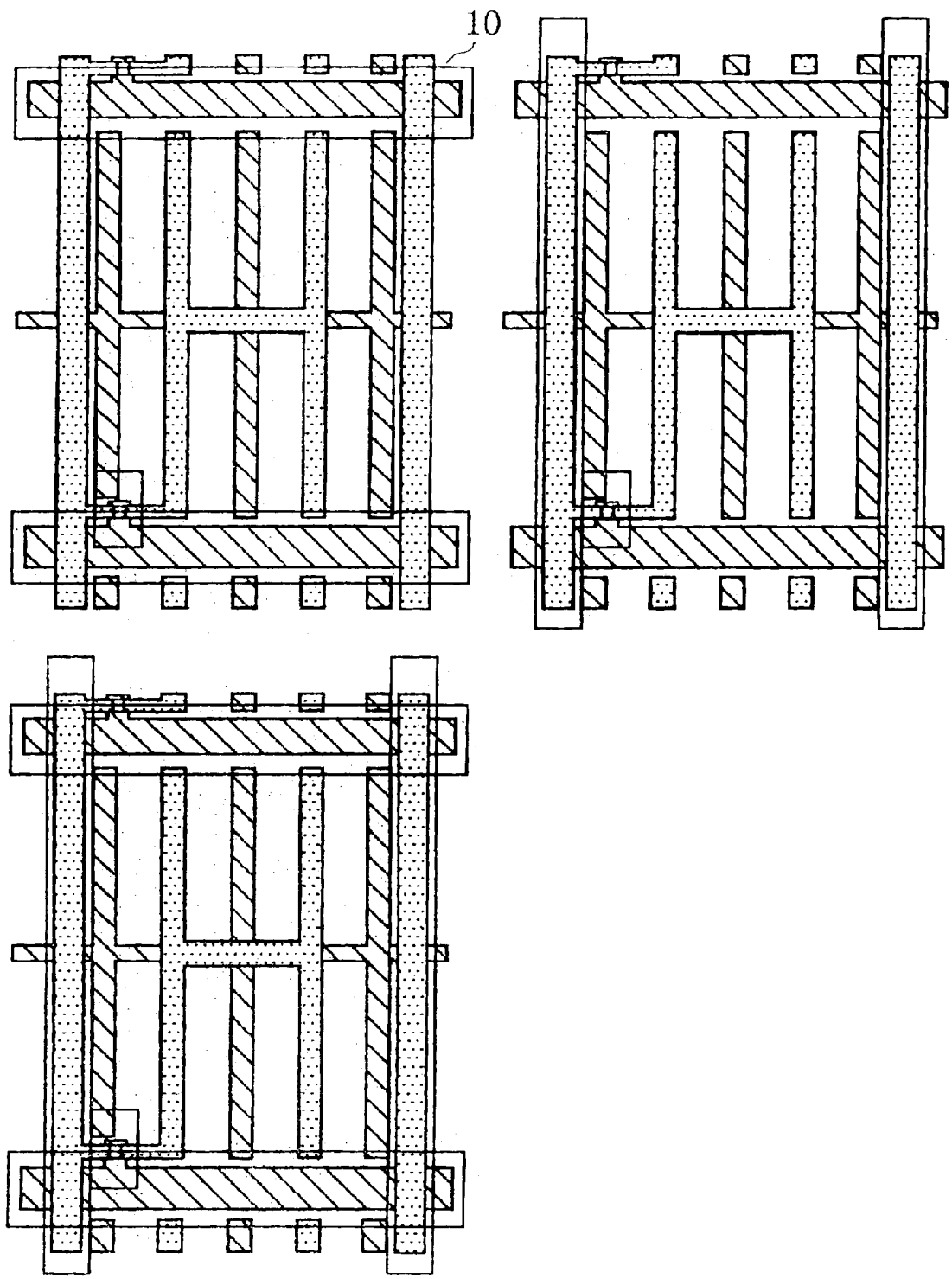
FIG. 36 shows a modified example of the liquid crystal panel according to Embodiment 2-3-4 of the present invention.

In this embodiment, as well as the previous embodiment, it is also possible to configure the opposing substrate side as shown in FIGS. 33 and 34, and it is also possible to form the insulating film 10 on the scanning line electrode, the signal line electrode, or on the scanning line electrode and the signal line electrode on the array substrate side, as shown in FIG. 36.

Embodiment 2-3-5

Figure 37:
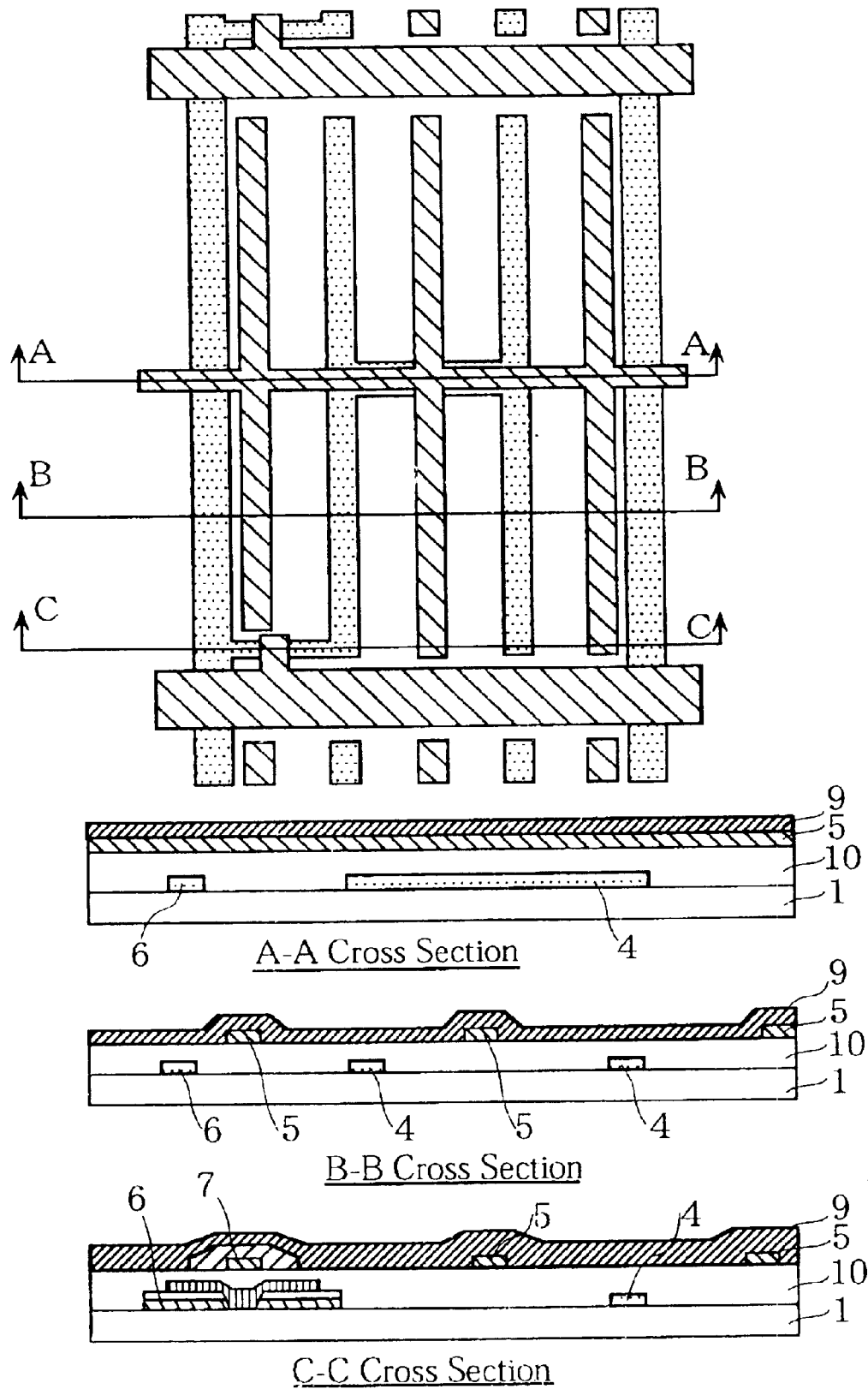
FIG. 37 shows the structure of the liquid crystal panel according to Embodiment 2-3-5 of the present invention.

FIG. 37 shows the structure of the liquid crystal panel of this embodiment.

In the previous embodiment, the scanning line and the common electrode were formed on the glass substrate, the first insulating film was formed on top of these, and the semiconductor layer, the signal line, and the pixel electrode were formed on top of this, however, in the present embodiment, the signal line, the drain, the pixel electrode, and the semiconductor layer are formed on the glass substrate, the first insulating film is formed on top of these, and the scanning line and the common electrode are selectively formed on top of this.

This means that in the third embodiment, the insulating film was not formed on a portion of the pixel electrode but was formed on the common electrode, but in the present embodiment, the insulating film is formed on the pixel electrode but is not formed on the common electrode.

It should be noted that the opposing electrode is formed in the same way as in the first embodiment.

Furthermore, sites and regions in which the insulating film is partially not formed on the neutralization electrode or the black matrix also serving as the neutralization electrode, as shown in FIG. 25, are formed on the opposing substrate side.

Thus, by removing a portion of the insulating film on the common electrode and the insulating film on the neutralization electrode on the opposing substrate, it is possible to obtain a liquid crystal panel with favorable display quality without black dot nonuniformities, because the ions that are unevenly distributed in the gate potential portion are diffused into the pixel electrode portion and deionized.

Embodiment 2-3-6

In the previous fifth embodiment, sites in which the insulating film was formed were provided on the opposite substrate side, but in the present embodiment, no insulating film is formed on the opposing substrate side. Aside from that, the present embodiment is the same as the previous fifth embodiment.

This means that no insulating film is formed on the opposing substrate side, as shown in FIG. 28, and on the array substrate side the insulating film (passivation layer) is formed only on the TFTs, which are the switching elements, as shown in FIG. 37 (that is, the insulating film is not formed on the common electrode at all).

By doing this, the insulating film is not formed at all on the common electrode and the neutralization electrode on the opposing substrate side, so that black dot nonuniformities can be kept from occurring even more so than in the previous fifth embodiment.

Figure 38:
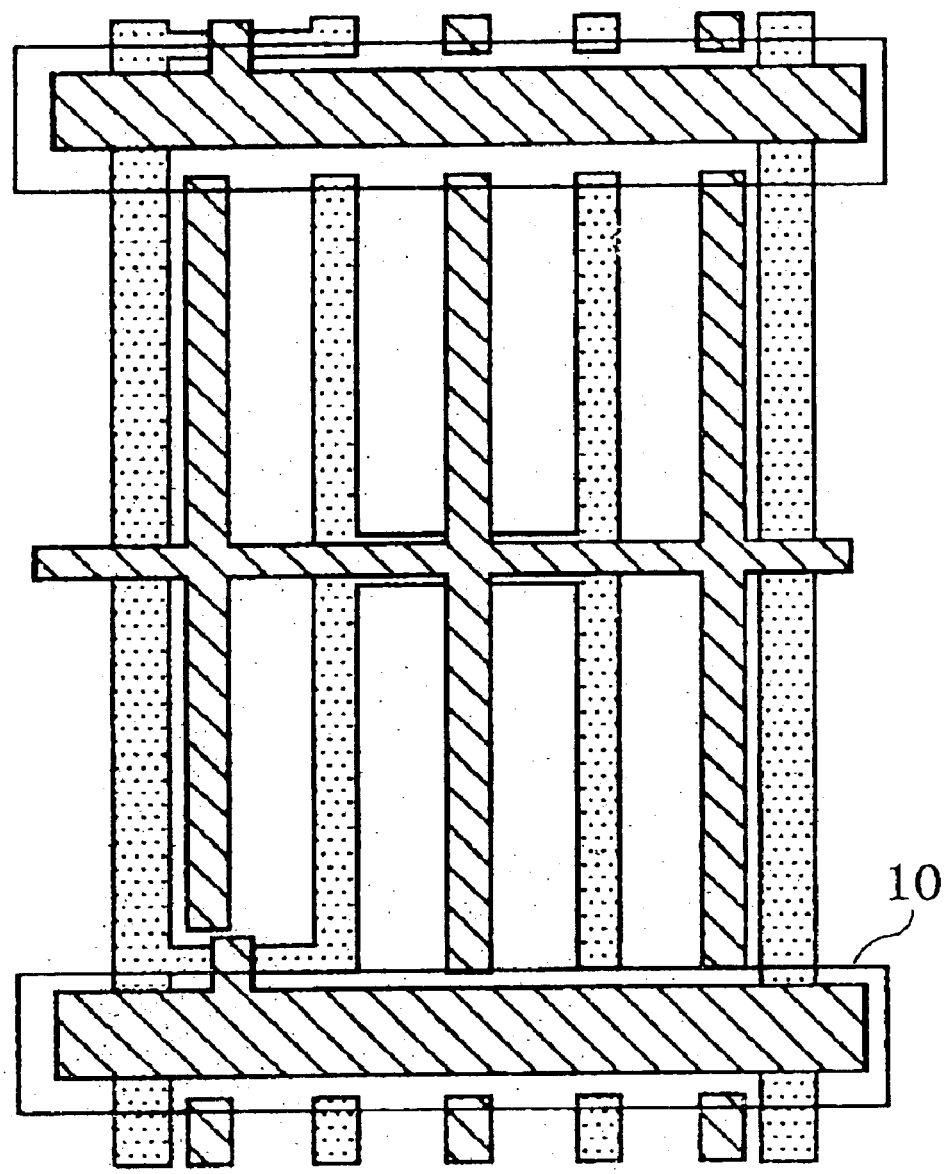
FIG. 38 shows a modified example of the liquid crystal panel according to Embodiment 2-3-6 of the present invention.

In this embodiment, as well as in the previous fifth embodiment, it is also possible to configure the opposing substrate side as shown in FIGS. 33 and 34. Also, on the array substrate side, as shown in FIG. 38, after forming a protective film or the insulating film 10 also serving as a protective film on the scanning line electrode, it is also possible to form an insulating film on the signal line electrode or on the scanning line electrode and the signal line electrode.

Embodiment 2-3-7

FIG. 39 shows the configuration of the liquid crystal panel of this embodiment.

In the previous third embodiment, the scanning line and the common electrode were formed on the glass substrate 1, the first insulating film was formed on these, and the semiconductor layer, the signal line, and the pixel electrode were formed on this, but in the present embodiment, the signal line 6, the drain, the pixel electrode 4, and the semiconductor layer were formed on the glass substrate 1, the first insulating film was formed over these, and the scanning line 7, the common electrode 5, and the pixel electrode 4 were selectively formed on the insulating film.

This means that in the present embodiment, the pixel electrode and the common electrode are formed in the same layer just like in the first embodiment.

A site where the insulating film has partially not been formed on the neutralization electrode, as shown in FIG. 25, is formed on the opposing substrate side.

Thus, by removing the insulating film on the pixel electrode and the common electrode and a portion of the insulating film on the neutralization electrode on the opposing substrate, it is possible to obtain a liquid crystal panel with favorable display quality without black dot nonuniformities, because the ions that are unevenly distributed in the gate potential portion are diffused into the pixel electrode portion and deionized.

Embodiment 2-3-8

In the previous seventh embodiment, a site where the insulating film is not formed was provided on the opposing substrate side, but in this embodiment, the insulating film is not formed on the opposing substrate side. Apart from this, the present embodiment is the same as the previous embodiment.

That is to say, the insulating film is not formed on the opposing substrate side, as shown in FIG. 28, and on the array substrate side the insulating film (passivation film) is formed only on the TFTs, which are the switching elements, as shown in FIG. 39 (that is, the insulating film is not formed on the common electrode at all).

With this configuration, the insulating film is not formed at all on the common electrode and the neutralization electrode on the opposing substrate side, so that the occurrence of black dot nonuniformities can be inhibited even more than in the previous embodiment.

Figure 40:
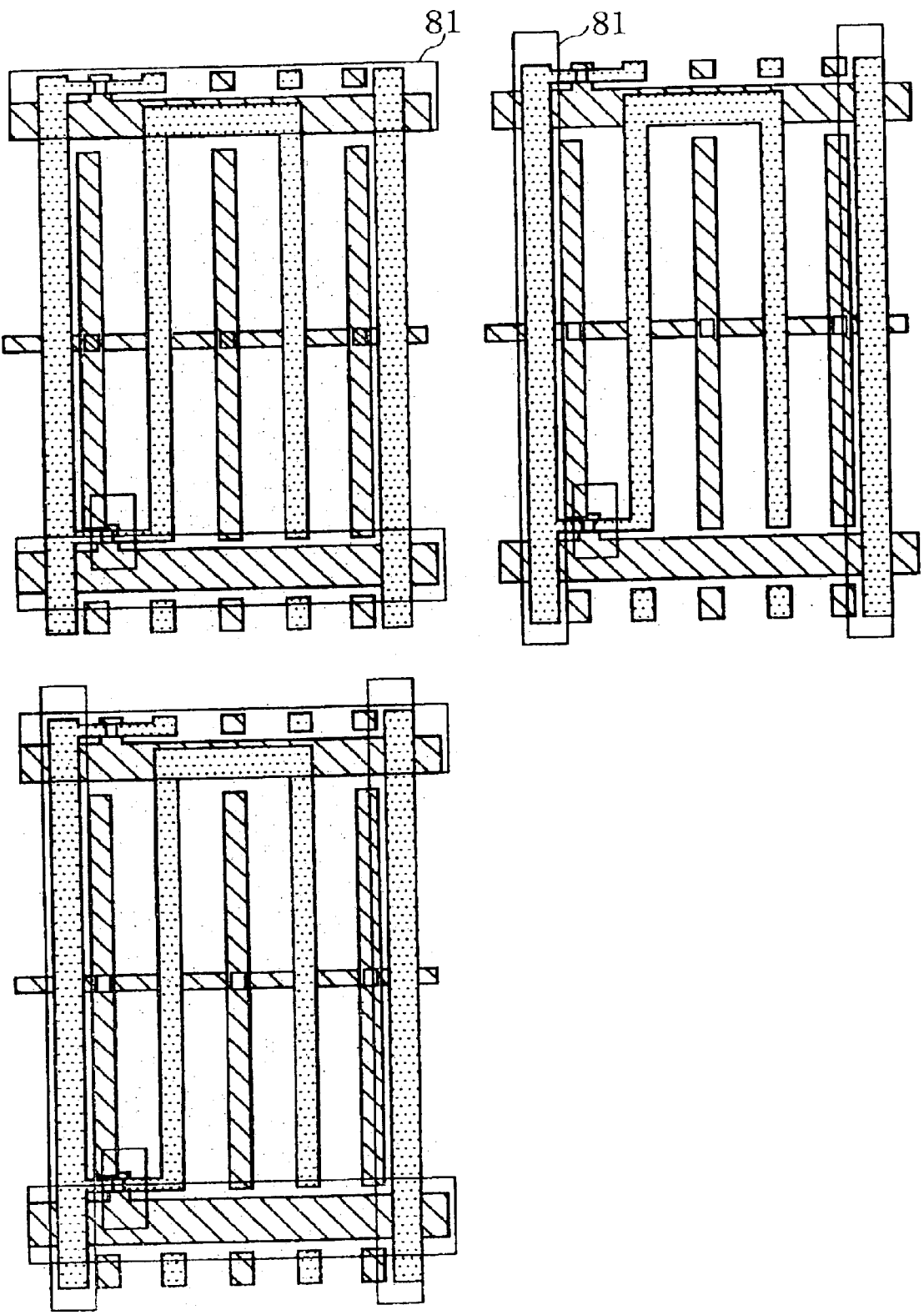
FIG. 40 shows the structure of a modified example of the liquid crystal panel according to Embodiment 2-3-8 of the present invention.

Also, in this embodiment, it is possible to configure the opposing substrate side as shown in FIGS. 33 and 34. The insulating layer can also be formed on the scanning line electrode, the signal line electrode, or the scanning line electrode and the signal line electrode on the array substrate side, as shown in FIG. 40.

Fourth Inventive Group

In this inventive group, the uppermost portion (liquid crystal layer side) of the metal layer (electrode signal line), except for the portion of the TFT, is made an open portion.

Embodiment 2-4-1

Figure 41:
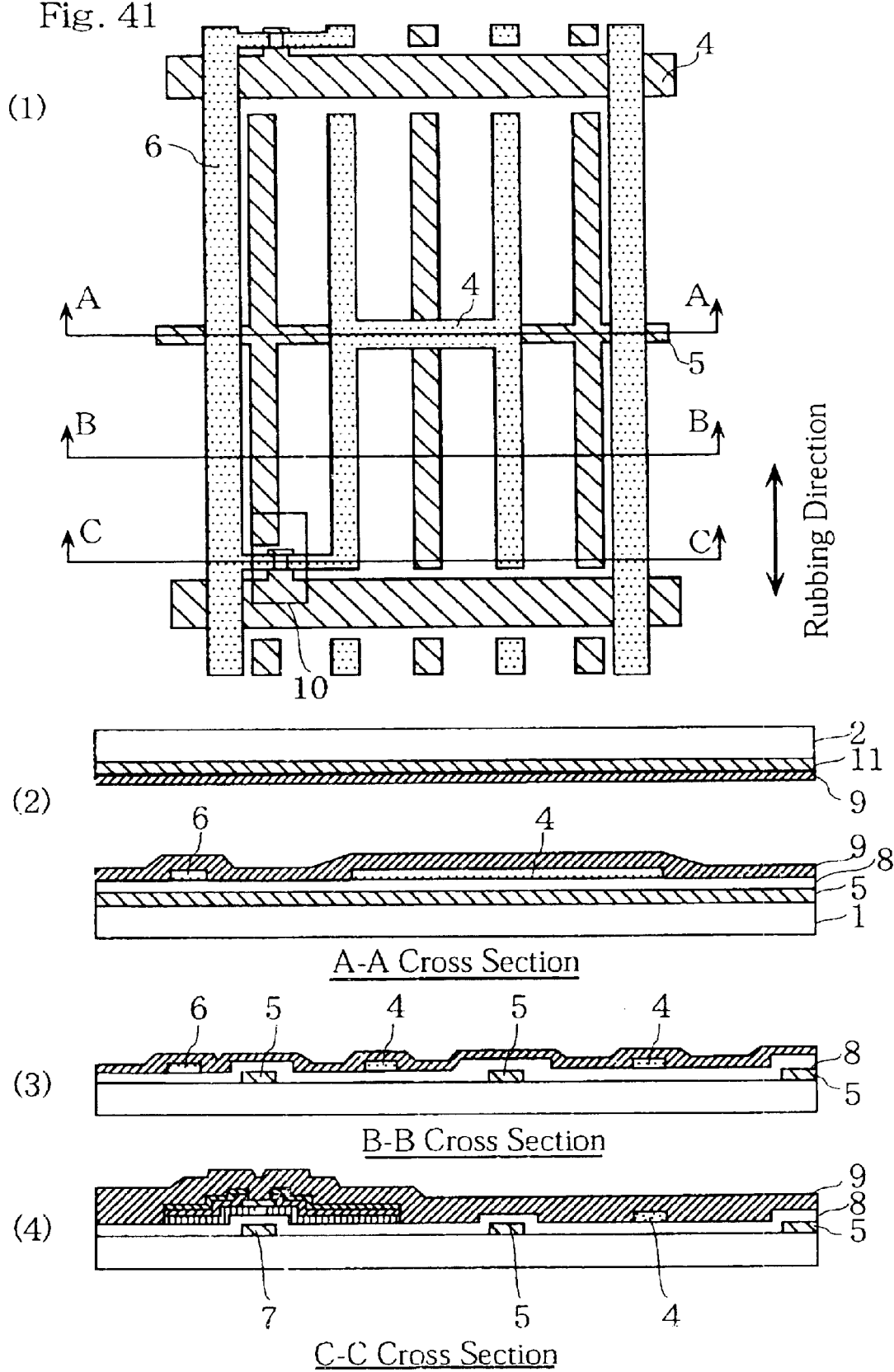
FIG. 41 shows the structure of the liquid crystal panel according to Embodiment 2-4-1 of the present invention.

FIG. 41 shows the configuration of the liquid crystal panel of this embodiment.

FIG. 41(1) is a plan view, and (2) is a cross-sectional view taken along the line A—A of (1). FIG. 41(3) is a cross-sectional view of the array side substrate taken along the line B—B, and (4) is a cross-sectional view of the array side substrate taken similarly along the line C—C. It should be noted that the opposing substrate in the B—B and C—C cross-sections is the same as that of the A—A cross-section, and thus has been omitted from those drawings.

The following is a description of the liquid crystal panel with reference to this drawing.

Image signal lines (source) 6 and scanning signal lines (gate) 7 are formed in a matrix as the metal wiring on a glass substrate 1, and a semiconductor layer (TFT) 16 is formed as an active element (switching element) at their intersection.

Regarding their formation, first, a gate electrode 7 and a common electrode 5 are selectively formed on the glass substrate 1 using a metal such as Al.

Next, by plasma CVD, 3000 Å thick $SiN_x$ serving as a first gate insulating film 8 is formed, a 500 Å thick semiconductor layer (amorphous silicon layer) serving as the channel portion of the transistor is formed, and 1500 Å thick $SiN_x$ serving as an etching stopper is formed, in that order.

As shown in FIG. 41(4), the method for forming the channel portion of the transistor at this time is to obtain an ohmic junction by forming a $Sin_x$ insulating film above the gate electrode that is smaller than the gate electrode to serve as an etching stopper, and to form by plasma CVD a 500 Å thick $n^+$ amorphous silicon layer that includes phosphorous over that film ($n^+$: high-concentration doping, with a high ratio of added n-type impurities).

Next, contact holes were formed peripherally to the formed electrodes, for example, to establish contact with the wired portions.

Then, using a metal such as Al/Ti, the signal line (source line) 6, the drain line, and the pixel electrode 4 were formed at a thickness of 4000 Å.

After this, $SiN_x$ is formed by plasma CVD to a thickness of 3500 Å as a second insulating film (passivation film) or the protective film 10 for protecting the wiring.

By applying the resist by a spinner and performing mask exposure after cleaning the substrate, the second insulating film (passivation layer) 10 is formed only on top of the TFT, which is the switching element (that is, as shown in the cross-sectional views in FIG. 41, the insulating film is not formed on the pixel electrode 4).

After this, developing and drying are performed, dry etching is conducted by RIE, and then the resist is removed.

Figure 42:
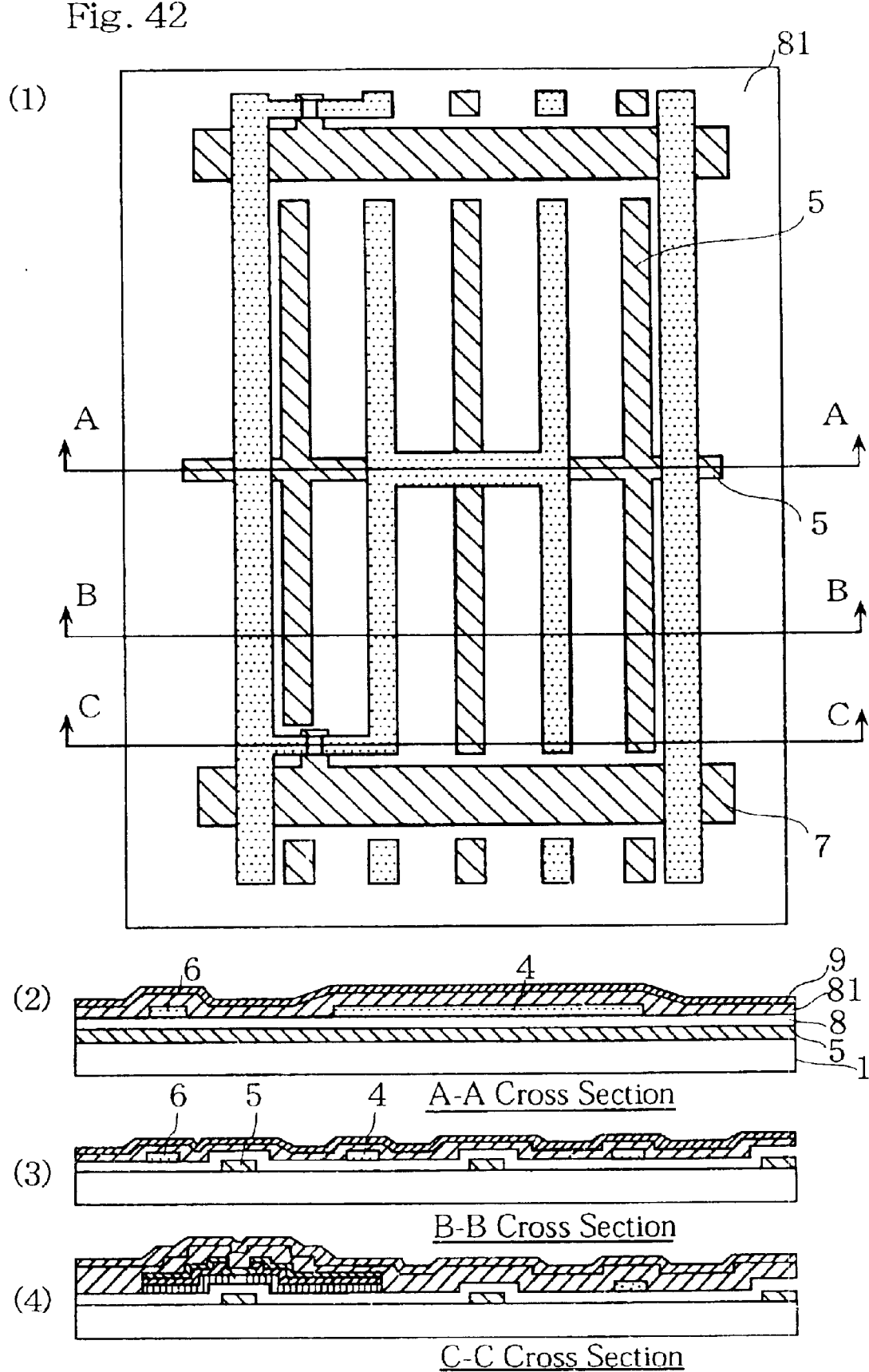
FIG. 42 is a structural diagram of the liquid crystal panel serving as a comparative example in this embodiment.

As a comparative example, a panel in which the second insulating film is formed over the entire pixel, as shown in FIG. 42, was also manufactured.

A laser was irradiated onto the gate portion of these substrates to expose the gate potential.

Next, the orientation films 9 (AL 5417, made by JSR) are printed on the opposing glass substrate 2 with the color filter 11 and on the substrate 1 on which the array has been formed, and are then rubbed.

Rubbing was performed in the direction along the signal line (source line) 6 of the array substrate, at a rubbing direction parallel for the color filter substrate 2 and the array substrate 1.

Next, a sealing resin (STRUCTBOND, made by Mitsui Toatsu) was printed onto the edge of the glass substrate 2.

4.0 μm glass fibers (made by Nippon Electric Glass) were mixed into the sealing resin as spacers.

After this, 3.5 μm diameter resin spheres (EPOSTER-GP-HC, made by Nippon Shokubai Co., Ltd.) were spread throughout the display region as spacers to hold the spacing between the substrates.

The substrate 1 and the opposing substrate 2 were then adhered to one another and heated at 150° C. for two hours to cure the sealing resin.

A liquid crystal 3 with a positive dielectric anisotropy was then injected into the above-fabricated empty panel by vacuum injection (a method in which the empty panel is placed in a reduced-pressure tank and the inside of the panel is evacuated, after which the injection port is brought into contact with the liquid crystal and the inside of the tank is returned to normal pressure so that the liquid crystal is injected into the panel).

The liquid crystals used and their specific resistances are shown in Table 1.

TABLE 1

|  | Specific resistance ($\Omega$ cm) | Display Burn-in |
|---|---|---|
| liquid crystal A | $10^{11}$ or more and less than $10^{12}$ | A |
| liquid crystal B | $10^{12}$ or more and less than $10^{13}$ | A |
| liquid crystal C | $10^{13}$ or more and less than $10^{14}$ | B |
| liquid crystal D | $10^{14}$ or more and less than $10^{15}$ | C |

After this, optically curable resin (Loctite 352A, made by Loctite Japan) was applied to the entire injection port as a sealing resin for sealing the injection port of the liquid crystal panel, and light was irradiated at 10 mW/cm² for five minutes to cure the sealing resin.

Polarizing plates (NPF-HEG1425DU, made be Nitto Denko) were then adhered to the top and bottom of the substrates 1 and 2 (outer side of the glass substrates).

These panels were placed in a 70° C. high temperature tank and driven for 12 hours, and when they were then displayed at half tone and evaluated, the conventional liquid crystal panel with $SiN_x$ formed over the entire pixel had display nonuniformities where the laser had been irradiated, but in the panel where the insulating film on the pixel electrode had been removed, there were no display nonuniformities and an excellent display could be observed.

By removing the insulating film on the pixel electrode, it was possible to obtain a liquid crystal panel with favorable display quality without display nonuniformities, because the ions that are unevenly distributed in the gate potential portion are diffused into the pixel electrode portion and deionized.

Also, as can be seen from Table 1, a favorable display without display burn-in can obtained by making the specific resistance of the liquid crystal smaller than $10^{13}$ $\Omega$ cm.

It should be noted that conventionally, the second insulating film was formed over the entire pixel portion but was not formed at peripheral portions leading to the electrodes, so that a process step was required for this. Thus, in this embodiment, sites without the second insulating film have been formed within the pixel, and because it is sufficient only to change conventional masks, there is no change in the number of process steps.

Embodiment 2-4-2

FIG. 43 shows the configuration of the liquid crystal panel according to this embodiment.

FIG. 43(1) is a plan view, and (2) to (4) are cross-sectional views. It should be noted that the B—B cross-section and the C—C cross-section of the opposing substrate side are the same as for the A—A cross-section.

The present embodiment is the same as the previous embodiment except that the second insulating film 81 is formed on the TFT and the signal line (source line) 6.

Rubbing was performed in the direction along the signal line (source line) 6 of the array substrate, and the rubbing directions for the array substrate and the color filter substrate were parallel.

With the configuration of this drawing, the TFT and the (source) signal line 6 can be protected.

Also, because the second insulating film is formed along the signal line and also the rubbing is performed along the source signal line, the insulating film does not obstruct the rubbing, and thus a favorable orientation can be obtained.

Embodiment 2-4-3

Figure 44:
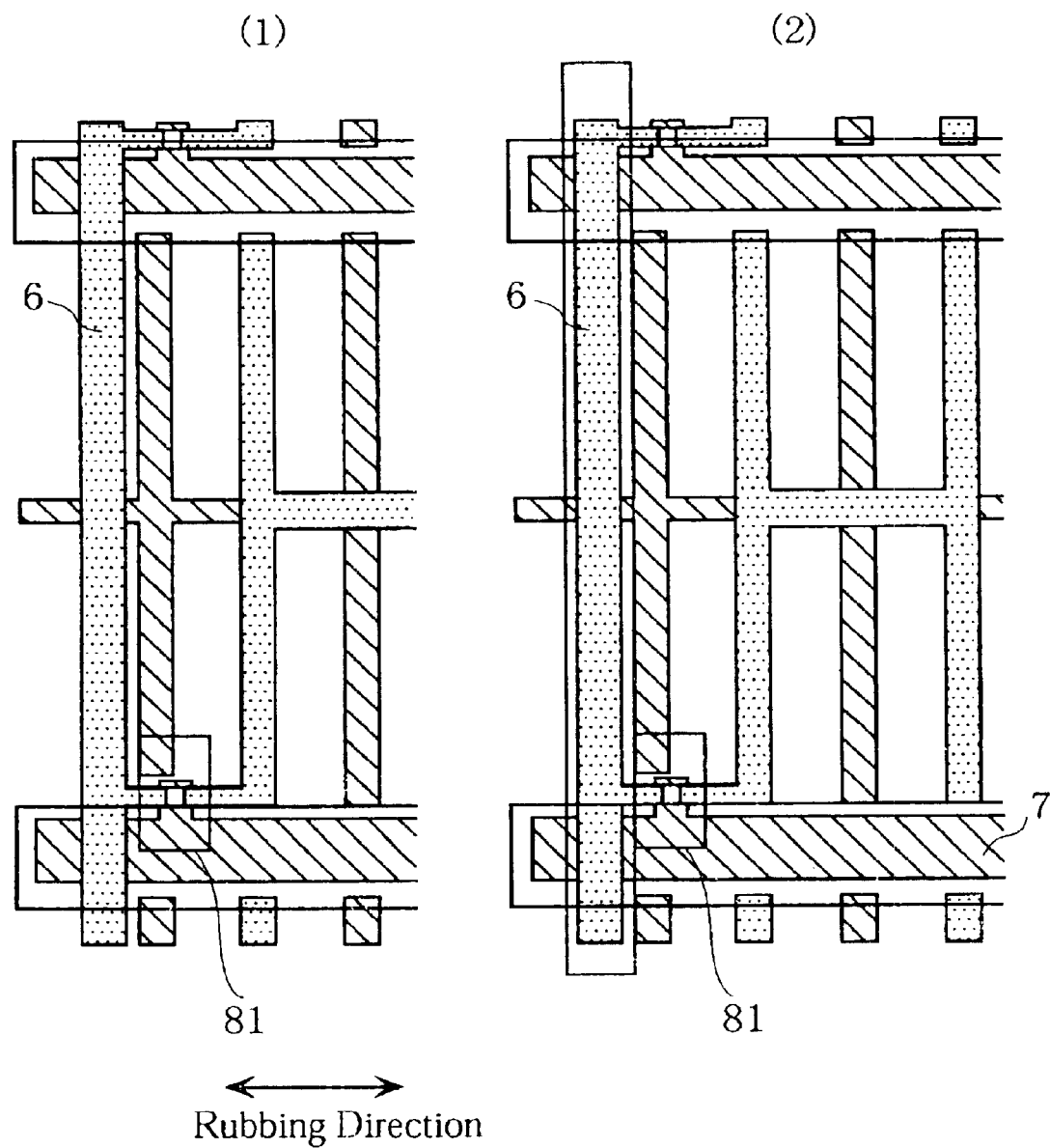
FIG. 44 shows the structure of the liquid crystal panel according to Embodiments 2-4-3 and 2-4-4 of the present invention.

FIG. 44(1) shows the configuration of the liquid crystal panel according to the present embodiment.

In the drawing, numeral 81 denotes the insulating film on the TFT. This embodiment is the same as the previous first embodiment with the exception of the fact that the second insulating film 81 is formed on the TFT 17 and on the scanning line (gate line) 7, the direction of the rubbing, and the liquid crystal.

With this configuration, the TFT and the scanning line 7 can be protected.

Also, because the second insulating film 81 is formed along the scanning line 7 and the rubbing is performed along the source signal line, the insulating film does not obstruct the rubbing, and thus a favorable orientation can be obtained. In the first embodiment, a liquid crystal with a positive dielectric anisotropy was used, but in this embodiment, a liquid crystal with a negative dielectric anisotropy is used, so that the direction of the rubbing can be the same as the direction of the scanning line.

Embodiment 2-4-4

FIG. 44(2) shows the configuration of the liquid crystal panel according to the present embodiment.

This embodiment is the same as the first embodiment except that the second insulating film 81 is formed on the TFT 17, on the signal line (source line) 6, and on the scanning line (gate line) 7.

With this configuration, the TFT, the signal line, and the scanning line can be protected.

Embodiment 2-4-5

Figure 45:
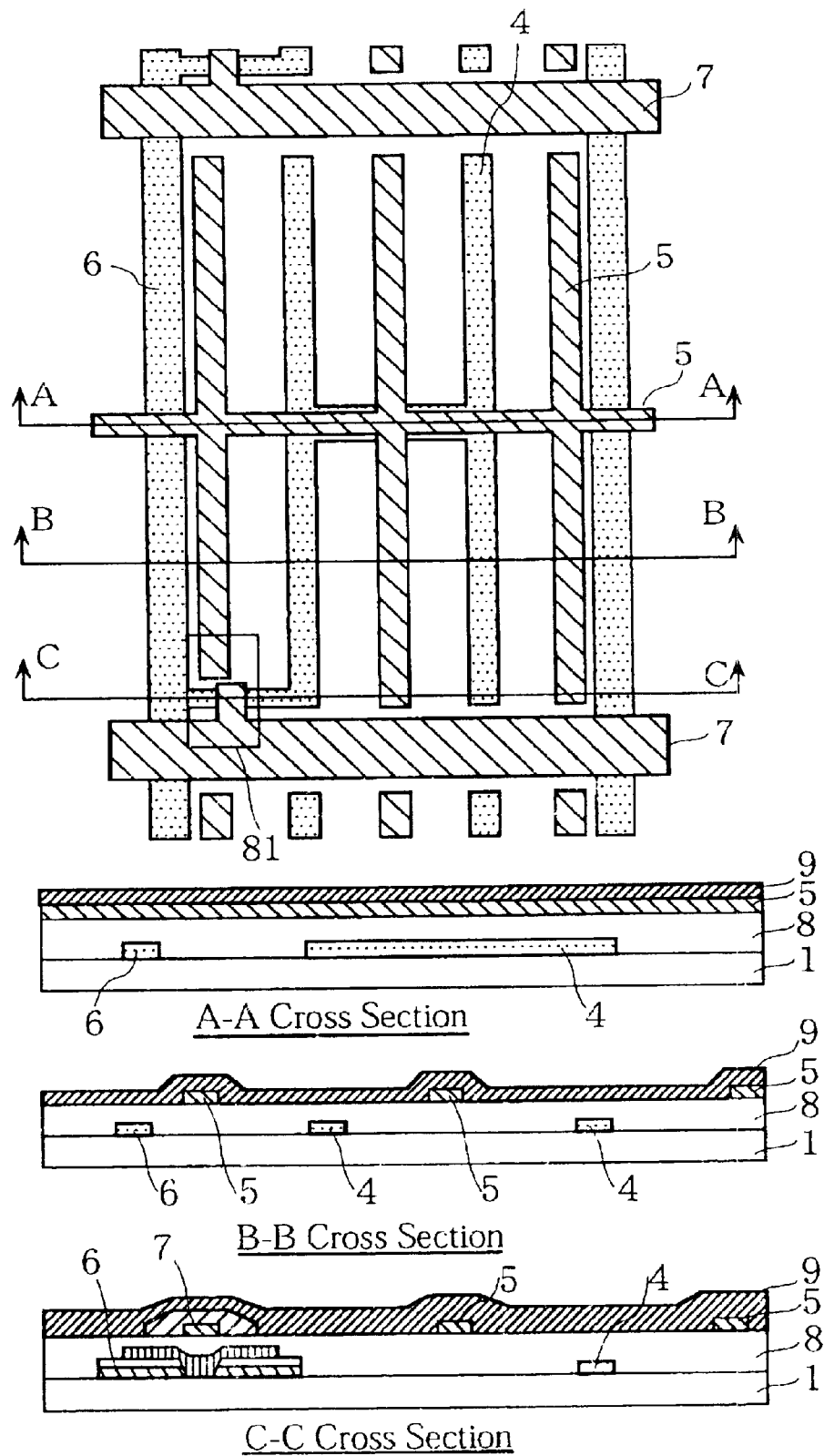
FIG. 45 shows the structure of the liquid crystal panel according to Embodiment 2-4-5 of the present invention.

FIG. 45 shows the configuration of the liquid crystal panel according to the present embodiment.

In this diagram, the opposing substrate sides are all the same as that of the A—A cross-section.

In the first embodiment, the scanning line and the opposing electrode were formed on the glass substrate 1, a first insulating film was formed on these, the semiconductor layer, the signal line, and the pixel electrode were formed on this insulating film, and a second insulating film was partially formed on these, but in this embodiment, the signal line 6, the drain, the pixel electrode 4, and the semiconductor layer 16 are formed on the glass substrate, the first insulating film 8 is formed on these, the scanning line 7 and the opposing electrode 5 are selectively formed on this, and the second insulating film 81 is partially formed on these.

This means that in the first embodiment there was no insulating film over the pixel electrode but that the insulating film was formed over the opposing electrode, whereas in this embodiment, the insulating film 81 is formed on the pixel electrode 4 but is not formed on the opposing electrode 5.

Consequently, a liquid crystal panel with favorable display quality without display nonuniformities can be obtained, because the ions that were unevenly distributed in the gate potential portion are diffused into the pixel electrode portion and deionized.

Embodiment 2-4-6

Figure 46:
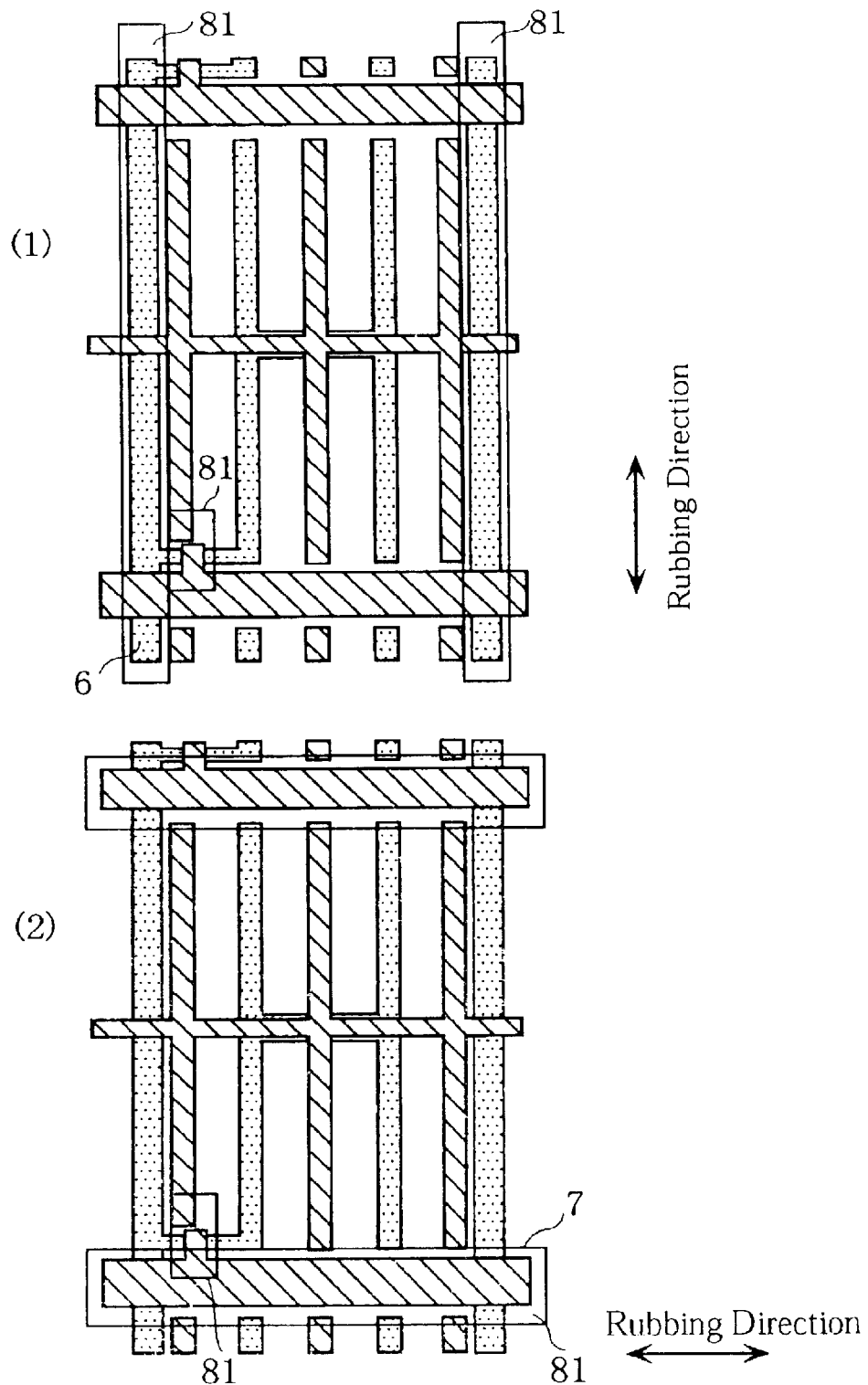
FIG. 46 shows the structure of the liquid crystal panel according to Embodiments 2-4-6 and 2-4-7 of the present invention.

FIG. 46(1) shows the configuration of the liquid crystal panel according to this embodiment.

This embodiment is the same as the fifth embodiment except that the second insulating film is formed on the TFT and the signal line (source line) 6.

Rubbing was performed along the direction of the signal line (source line) of the array substrate, with parallel rubbing directions for the color filter substrate and the array substrate.

With this configuration, the TFT and the signal line can be protected.

Also, the second insulating film is formed along the signal line and the rubbing is also performed along the signal line, so that the insulating film does not obstruct rubbing, and thus a favorable orientation can be obtained.

Embodiment 2-4-7

FIG. 46(2) shows the configuration of the liquid crystal panel according to this embodiment.

This embodiment is the same as the fifth embodiment except that the second insulating film is formed on the TFT and on the scanning line (source line) 7, and for the direction of the rubbing and the liquid crystal.

Accordingly, the TFT and the scanning line can be protected.

Also, the second insulating film is formed along the scanning line and the rubbing is performed along the scanning line as well, so that the insulating film does become obstructive during rubbing, and thus a favorable orientation can be obtained.

Embodiment 2-4-8

Figure 47:
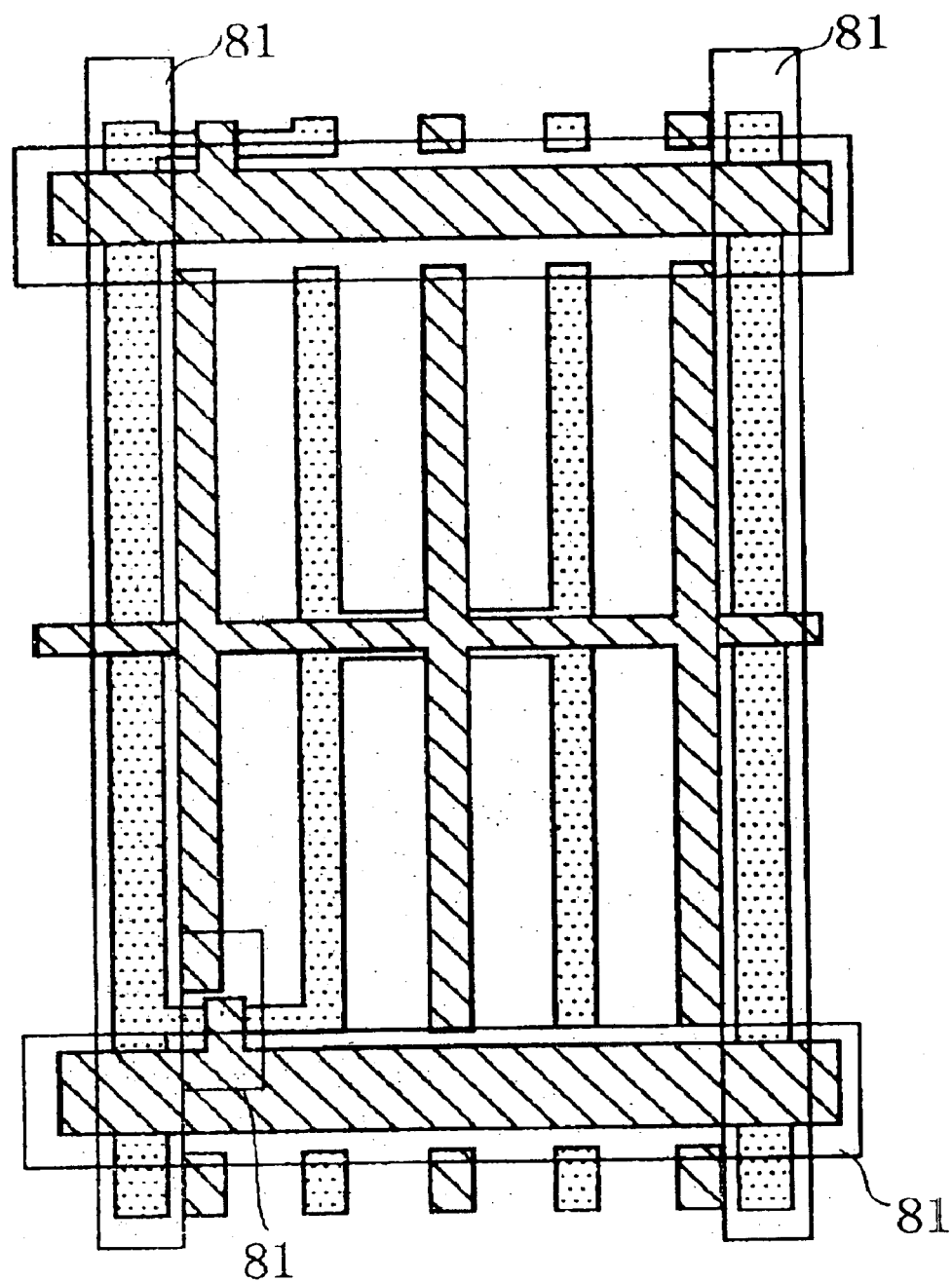
FIG. 47 shows the structure of the liquid crystal panel according to Embodiment 2-4-8 of the present invention.

FIG. 47 shows the configuration of the liquid crystal panel of this embodiment.

This embodiment is the same as the fifth embodiment except that the second insulating film is formed on the TFT, on the signal line (source line), and on the scanning line (gate line).

Accordingly, the TFT, the signal line, and the scanning line can be protected.

It should be noted that if the portion where the second insulating film has not been formed is too small, then the ions that are unevenly distributed in the gate potential portion cannot be fully recovered, and therefore portions where the second insulating film is not formed must not be formed over the entire pixel electrode or the entire opposing electrode.

Also, problems such as short circuits occur if the insulating film is not formed on the pixel electrode or the opposing electrode, and thus this is not possible.

Fifth Inventive Group

This inventive group relates to providing the black matrix, for example, with an uneven structure.

Embodiment 2-5-1

FIG. 48 shows the configuration of the opposing substrate side (color filter side) of the liquid crystal element according to this embodiment.

This liquid crystal element is described below with reference to FIG. 48.

It should be noted that the array substrate side is produced by the same conventional method as that shown in FIG. 4.

That is, image signal lines (source) and scanning signal lines (gate) are formed as the metal wiring in a matrix on a glass substrate 1, and a semiconductor layer (TFT) is formed as an active element (switching element) at those intersections.

A gate electrode and a common electrode 5 are selectively formed on the glass substrate 1 using a metal such as Al.

Then, using plasma CVD, 3000 Å thick $SiN_x$ serving as a first gate insulating film is formed, a 500 Å thick semiconductor layer (amorphous silicon layer) serving as the channel portion of the transistor is formed, and 1500 Å thick $SiN_x$ serving as an etching stopper is formed. The method for forming the channel portion of the transistor at this time is to obtain an ohmic junction by forming a $SiN_x$ insulating film above the gate electrode which is smaller than the gate electrode to serve as an etching stopper, and to form by plasma CVD a 500 Å thick n⁺ amorphous silicon layer that includes phosphorous over that film (n⁺: high-concentration doping, with a high ratio of added n-type impurities).

Next, contact holes were formed peripherally to the formed electrodes, for example, to establish contact with the wired portions.

Then, using a metal such as Al/Ti, the signal line (source line) 6, the drain line, and the pixel electrode 4 were formed at a thickness of 4000 Å.

$SiN_x$ is then formed to a thickness of 3500 Å by plasma CVD as a second insulating film (passivation film) for protecting the wiring.

Next, the structure shown in FIG. 48(2) is made, in which a portion of the conductive black matrix portion on the opposing glass substrate side with the color filter 11 is brought into contact with the orientation film. Furthermore, the black matrix 12 of the opposing substrate 2 is provided with protrusions/depressions, as shown in FIG. 48(2), increasing its surface area and making it possible to also deionize ions generated on the opposing substrate side.

The conductive black matrix is formed by mixing a conductive metal into resin, and its uneven structure is produced by twice partially patterning/layering this black matrix.

Two configurations of protrusions/depressions were produced. In one, the difference between the depressions and the protrusions was formed to 0.1 μm, and the other one the difference between the depressions and the protrusions was formed to 0.3 μm. FIG. 48(2) shows a schematic view of the configuration of the uneven portion.

Accordingly, the actual surface area of the black matrix is approximately two and six times more, respectively, than when no protrusions/recesses are formed.

Next, the orientation films (AL 5417, made by JSR) are printed/cured and rubbed on the opposing glass substrate 2 with the color filter 11 and on the inner surface (liquid crystal) side of the substrate 1 on which the array has been formed.

Next, a sealing resin (STRUCTBOND, made by Mitsui Toatsu) was printed onto the edge of the glass substrate 2, and 4.0 μm glass fibers (made by Nippon Electric Glaiss) were mixed into the sealing resin as spacers.

After this, 3.5 μm diameter resin spheres (EPOSTER-GP-HC, made by Nippon Shokubai Co., Ltd.) were spread throughout the display region as spacers to hold the spacing between the substrates.

The substrate 1 and the opposing substrate 2 were then adhered to one another and heated at 150° C. for two hours to cure the sealing resin.

A liquid crystal with a positive dielectric anisotropy was then injected into the empty panel fabricated above by vacuum injection (a method in which the empty panel is placed in a reduced-pressure tank and the inside of the panel is evacuated, after which the injection port is brought into contact with the liquid crystal and the inside of the tank is returned to normal pressure so that the liquid crystal is injected into the panel). The liquid crystals used and their specific resistances are shown in Table 1.

TABLE 1

|  | Specific resistance (Ω cm) | Display Burn-in |
| --- | --- | --- |
| liquid crystal A | $10^{11}$ or more and less than $10^{12}$ | A |
| liquid crystal B | $10^{12}$ or more and less than $10^{13}$ | A |
| liquid crystal C | $10^{13}$ or more and less than $10^{14}$ | B |
| liquid crystal D | $10^{14}$ or more and less than $10^{15}$ | C |

After this, optically curable resin (Loctite 352A, made by Loctite Japan) was applied to the entire injection port as a sealing resin for sealing the injection portion of the liquid crystal panel, and light was irradiated at 10 mW/cm² for five minutes to cure the sealing resin.

Polarizing plates (NPF-HEG1425DU, made be Nitto Denko) were then adhered to the top and bottom of the substrates (outer side of the glass substrates).

As a comparative example, a panel was produced in which the black matrix on the opposing substrate side was not provided with protrusions/depressions.

These panels were irradiated with a laser at their gate portion to expose the gate potential and were placed in a 70° C. high temperature tank and driven for 12 hours, after which they were displayed at half tone and evaluated.

The potential of the black matrix of the opposing substrate side was set to the same potential as the common electrode of the array substrate side.

As a result, since in the present embodiment the black matrix has been provided with protrusions/depressions, its area for recovering ions is accordingly larger, and thus it was possible to keep the black dot nonuniformities small.

In the panel in which the difference between the protrusions and recesses was set to 0.1 μm, the diameter of the black dot nonuniformities was 0.1 mm or less, and in the panel in which the difference between the protrusions and recesses was set to 0.3 µ m, black dot nonuniformities did not occur at all. By contrast, 3 mm black dot nonuniformities were generated when the panel of the comparative example was used.

Also, as can be seen from Table 1, a favorable display without display burn-in could be obtained by making the specific resistance of the liquid crystal smaller than $10^{13}$ Ω cm.

Embodiment 2-5-2

Figure 49:
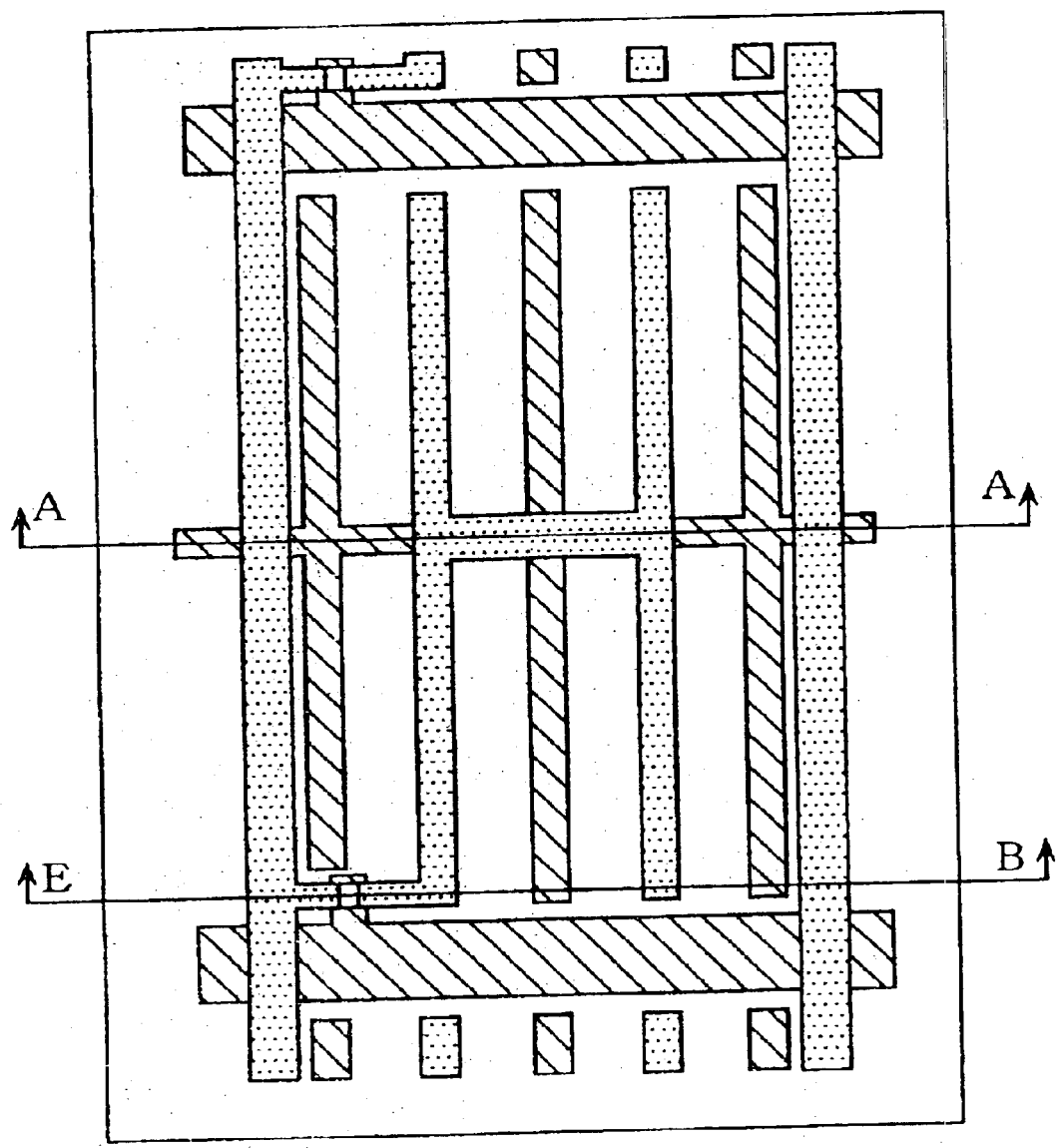
FIG. 49 shows the structure of the uneven portion of the black matrix according to this embodiment.

FIG. 49 shows the structure of the array substrate side of the liquid crystal element of this embodiment.

FIGS. 50(1) and (2) are cross-sectional views of the same.

In the previous first embodiment, the black matrix 12 was produced on the opposing substrate side, but in the present embodiment, the uneven black matrix 12 was produced on the array substrate side, as shown in FIG. 50(3). Aside from this, the present embodiment is the same as the first embodiment.

Accordingly, the black matrix is provided with protrusions and recesses, so that the area for recovering ions is increased and therefore a favorable display without black dot nonuniformities was obtained.

Figure 51:
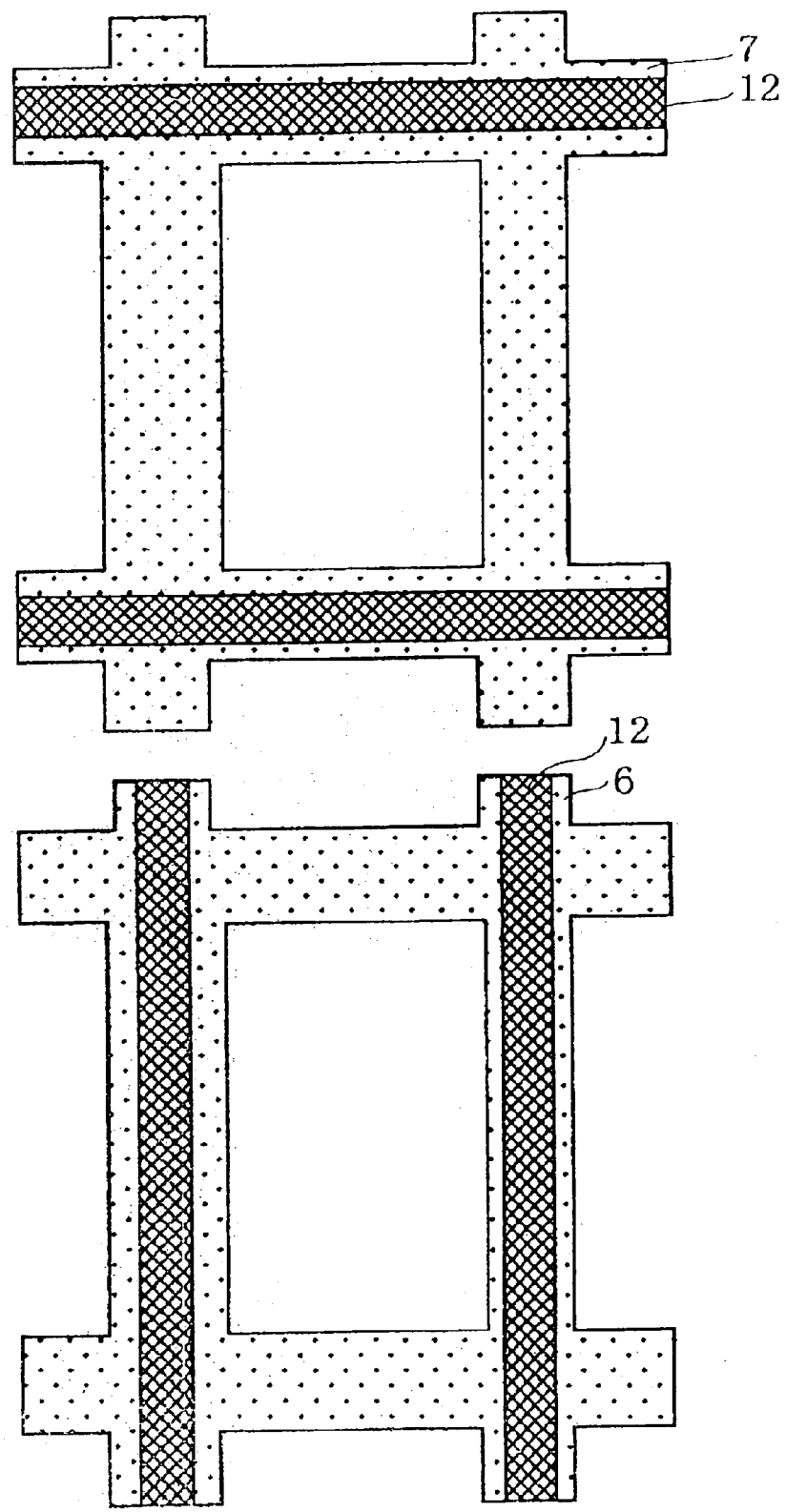
FIG. 51 shows a modified example of this embodiment.

In this embodiment, the black matrix was formed surrounding the pixel, but as shown in FIG. 51, it can also be formed only at portions corresponding to the scanning line (gate line) 7 or only at portions corresponding to the signal line (source line) 6.

Figure 52:
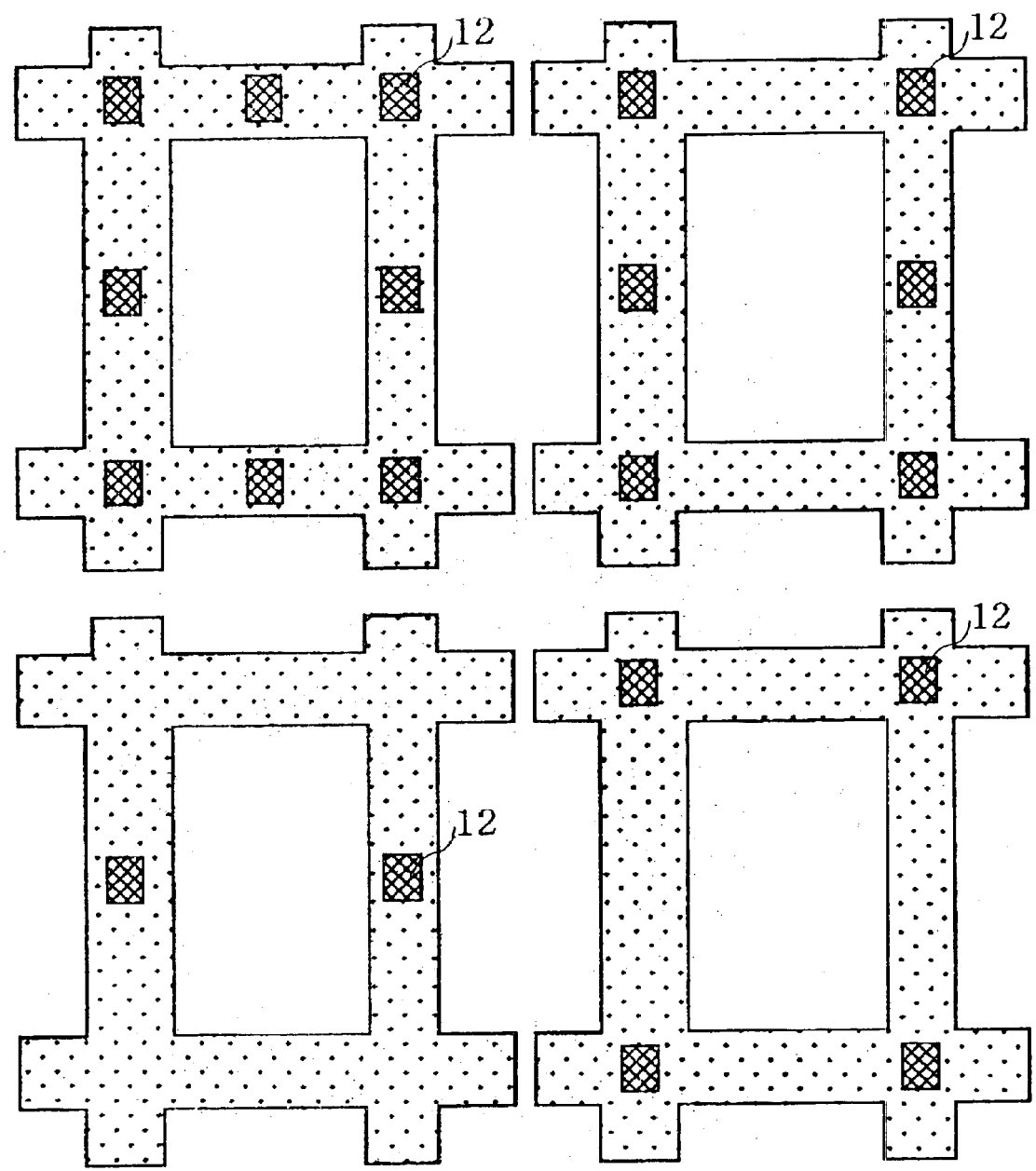
FIG. 52 shows a modified example of this embodiment.

As shown in FIG. 52, the black matrix can also be formed in islands. It should be noted that the black matrix can not only be arranged just between the pixels for the various hues of the color filter, but of course can also act as a light-blocking film (layer) that also has the role of protecting the TFT or preventing malfunctions due to light, for example.

Moreover, if the protrusions/recesses are narrower, for example, than the width of the pure black matrix of the color filter side substrate, then it is of course possible to form the protrusions/recesses not only on the upper surface originally in contact with the liquid crystal, but also on side surfaces.

Embodiment 2-5-3

FIG. 53 shows the structure of the liquid crystal element according the Embodiment 2-5-3 of the present invention.

In the first embodiment, protrusions/recesses were formed in the conductive black matrix, but in the present embodiment, an over-coating was formed on the black matrix portion of the opposing substrate and an unevenly shaped neutralization electrode 30 was formed on this. Also, the potential of this unevenly shaped electrode was set to the same potential as the common electrode. Aside from that, the present embodiment is the same as the first embodiment.

Accordingly, by providing the electrode with protrusions/recesses, the area for recovering ions was increased, and thus a favorable display without black dot nonuniformities was obtained.

Embodiment 2-5-4

In the previous third embodiment, an unevenly shaped neutralization electrode was formed on the opposing substrate side, but in this embodiment it is formed on the array substrate side, which has not been expressly shown because aside from the top and the bottom of the cross-sections being reversed, it is substantially the same as FIG. 53. Apart from that, the present embodiment is the same as the third embodiment.

In this embodiment, because the neutralization electrode has been provided with protrusions/recesses, its area for recovering ions is larger (wider) and therefore a favorable display without black dot nonuniformities can be obtained.

This means that ions that are unevenly distributed in the gate potential portion are diffused into the neutralization electrode portion and deionized, so that a liquid crystal element of favorable display quality without black dot nonuniformities could be obtained.

In the present embodiment, the neutralization electrode was formed separate from the pixel electrode and signal lines.

Embodiment 2-5-5

FIG. 54(1) shows a conventional IPS cross-sectional configuration, and FIG. 54(2) is a cross-sectional view showing the configuration of a HS (hybrid switching) mode, in which electrodes are formed on the opposing substrate side, which is an improvement over conventional IPS.

Black dot nonuniformities occur in this mode just like in IPS mode.

Figure 55:
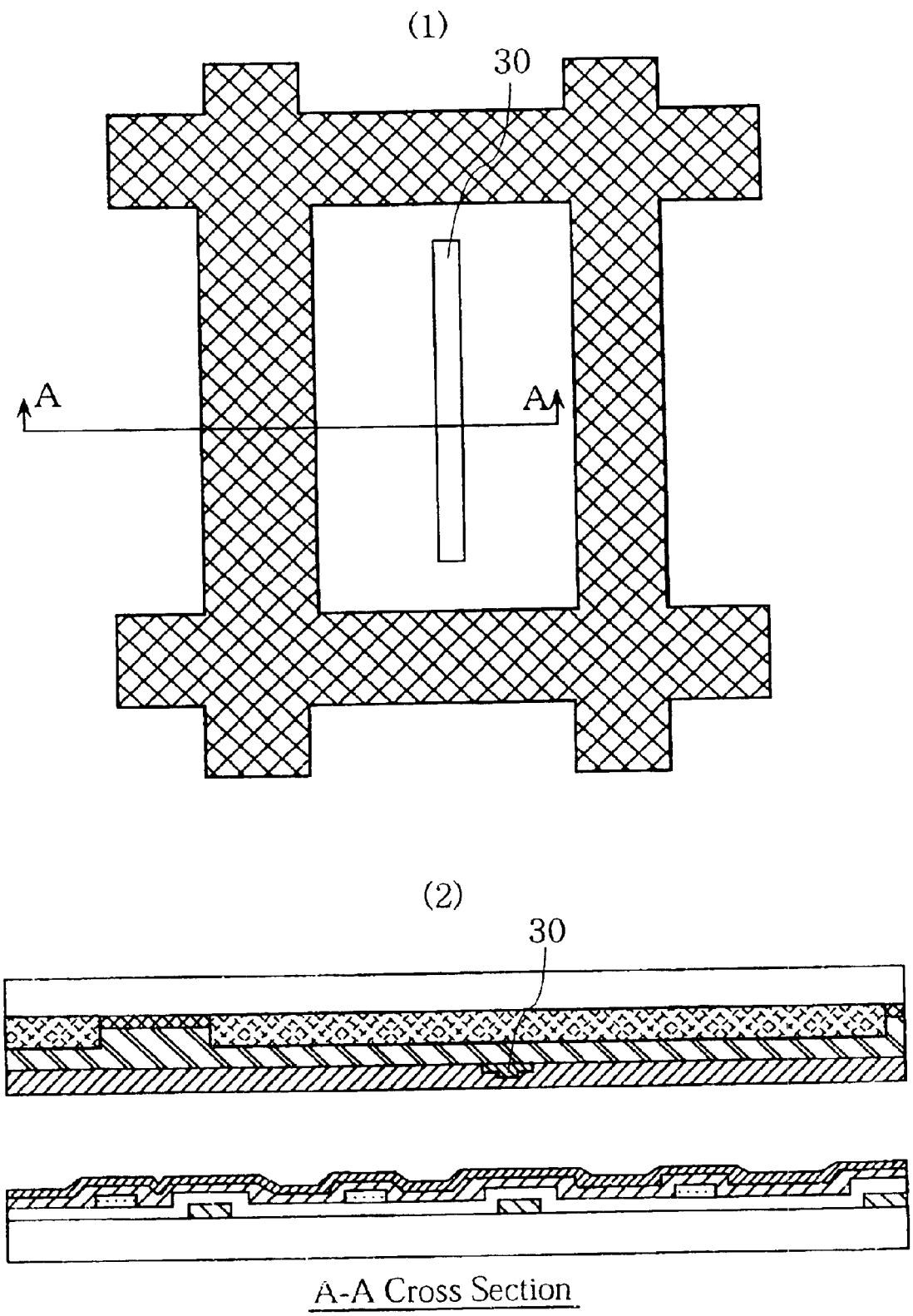
FIG. 55 shows the structure of the liquid crystal element according to Embodiment 2-5-5 of the present invention.

FIG. 55 shows the configuration of the liquid crystal element of this embodiment.

A working example of the liquid crystal element shown in this drawing is described below.

In the previous third embodiment, an unevenly shaped neutralization electrode 30 was formed at the black matrix portion on the opposing substrate side, but in this embodiment, as shown in FIG. 55(2), an unevenly shaped neutralization electrode is formed at a portion other than the black matrix. Apart from this, the present embodiment is the same as the third embodiment.

In the present embodiment, because the electrode is provided with protrusions/recesses, the area for recovering ions is large and a favorable display without black dot nonuniformities could be achieved.

It should be noted that in this embodiment, an electrode was not formed at the black matrix portion, however, an electrode may be formed this portion, as shown in FIG. 56. Additionally, as shown in FIG. 57, it is possible to provide only to the electrode formed at the black matrix portion with an uneven shape, or as shown in FIG. 58, to provide the electrode formed at the black matrix portion, as well as the electrode formed elsewhere, with an uneven shape.

Embodiment 2-5-6

In the fifth embodiment, an unevenly shaped neutralization electrode was formed on the opposing substrate side, but in this embodiment, an unevenly shaped neutralization electrode is formed on the array substrate side, and apart from this, this embodiment is the same as the fifth embodiment.

With the present embodiment, because the electrode is provided with protrusions/recesses, the area for recovering ions is increased and thus a favorable display without black dot nonuniformities could be obtained.

Embodiment 2-5-7

Figure 59:
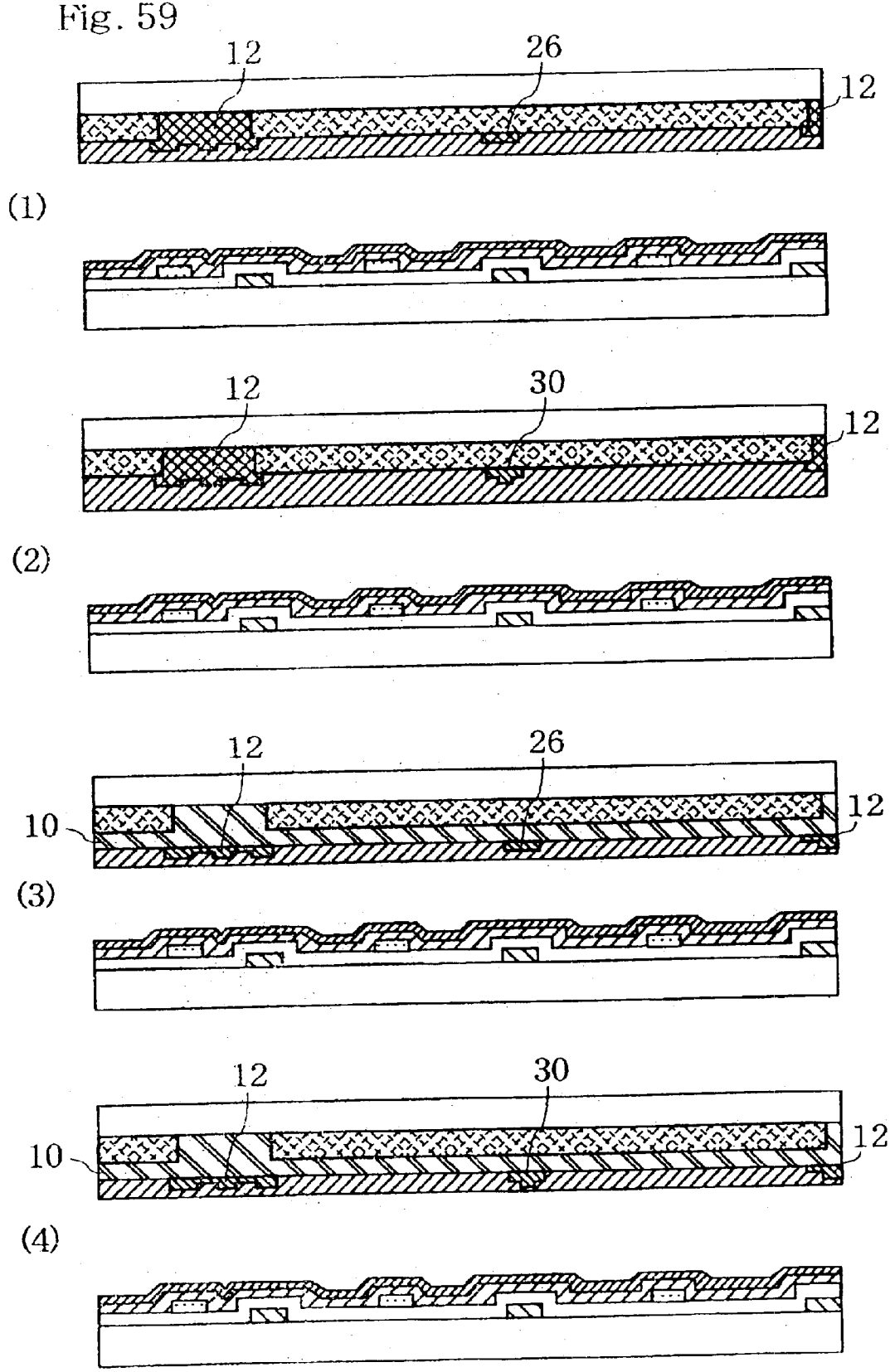
FIG. 59 shows the structure of the liquid crystal element according to Embodiment 2-5-7 of the present invention.

FIG. 59(1) shows the cross-sectional configuration of the liquid crystal element of the present embodiment.

In the fifth embodiment, an unevenly shaped neutralization electrode was formed on the opposing substrate side, but in this embodiment, the black matrix on the opposing substrate side is formed in an uneven shape. Except for that, this embodiment is the same as the fifth embodiment.

With the present embodiment, the black matrix is provided with protrusions/recesses, so that its area for recovering ions is increased and therefore a favorable display without black dot nonuniformities could be obtained.

Apart from the above, it is also possible to provide both the neutralization electrode 30 and the black matrix 12 formed on the opposing substrate side with protrusions/recesses, as shown in FIG. 59(2). Moreover, it is also possible to form the electrodes or the black matrix on the over-coating, as shown in (3) and (4).

Embodiment 2-5-8

In the previous seventh embodiment, the black matrix was formed on the opposing substrate side, but in this embodiment, it is formed on the array substrate side. Except for that, this embodiment is the same as the seventh embodiment. In this embodiment, the black matrix is provided with protrusions/recesses, so that the area for recovering ions is increased, and a favorable display without black dot nonuniformities could be obtained.

In the embodiments of this inventive group, the protrusions/recesses were formed by a method of partially patterning and layering, which was repeated twice. However, needless to say, they also can be formed by other methods, such as creating micro sized dots by sandblasting, for example, or by vapor deposition, for example. Also, using half tone exposure makes it possible to form a film at different heights through a single exposure.

Furthermore, the shape of the protrusions/recesses can of course be dot-shaped or any other pattern such as stripe-shaped, circular, or polygonal.

Sixth Inventive Group

The present inventive group relates to using a conductive light-blocking film.

The following is an explanation of the liquid crystal element of this inventive group, based on embodiments of the same.

Embodiment 2-6-1

Figure 60:
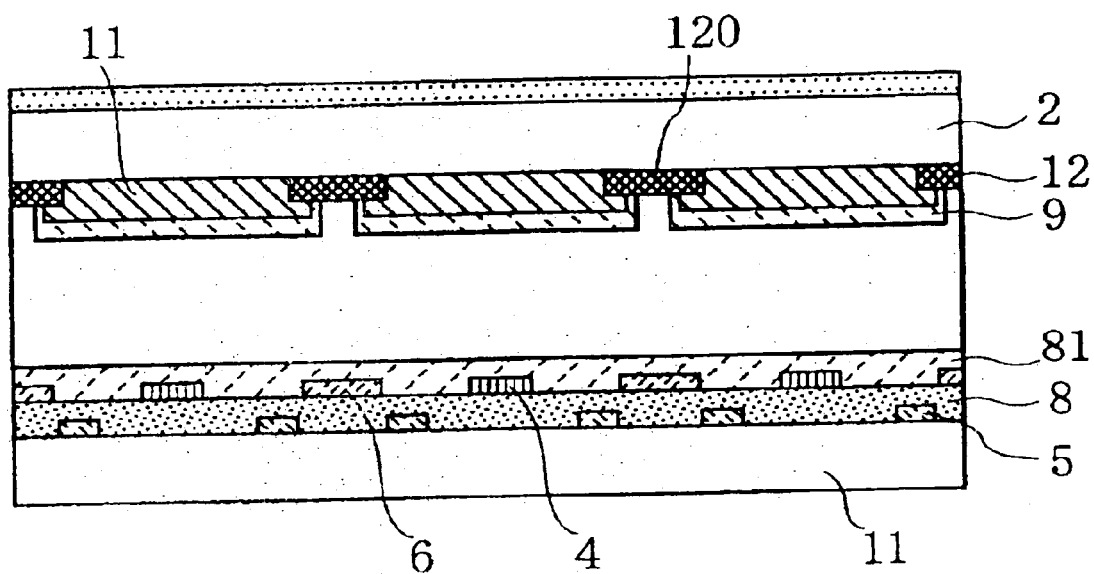
FIG. 60 shows the liquid crystal element according to Embodiment 2-6-1 of the present invention.

As shown in FIG. 60, the liquid crystal element of this embodiment has a structure in which a color filter side substrate 2 and a thin film transistor (TFT) substrate 1 sandwich a liquid crystal 3 therebetween, with a light-blocking layer 12 in direct contact with the liquid crystal 3 at regions 120. The color filter substrate 2 is a glass substrate with a transparent conductive film 13 formed on its top outer surface and on which the light-blocking layer 12, also referred to as the black matrix, a color filter 11, and an orientation film 9 have been formed. The TFT substrate 1 is for example a glass substrate provided with a common electrode 5, an insulating layer 8, a signal line 6, a pixel electrode 4, and a top second insulating layer 81, and is intended for in-plane switching (IPS) (the TFT portion has been omitted from the drawing).

By thus putting the liquid crystal in direct contact with the conductive light-blocking layer, for example, even if ionic impurities occur in the liquid crystal and become concentrated, this conductive light-blocking layer transfers electrons to the ionic material present in the liquid crystal, and the ionic impurities are deionized. Thus, black spot defects no longer occur.

The regions in which the conductive light-blocking layer and the liquid crystal are in direct contact may be in any portion, and there may be any number of such regions, however, the larger the total area of contact the greater the effect.

Figure 61:
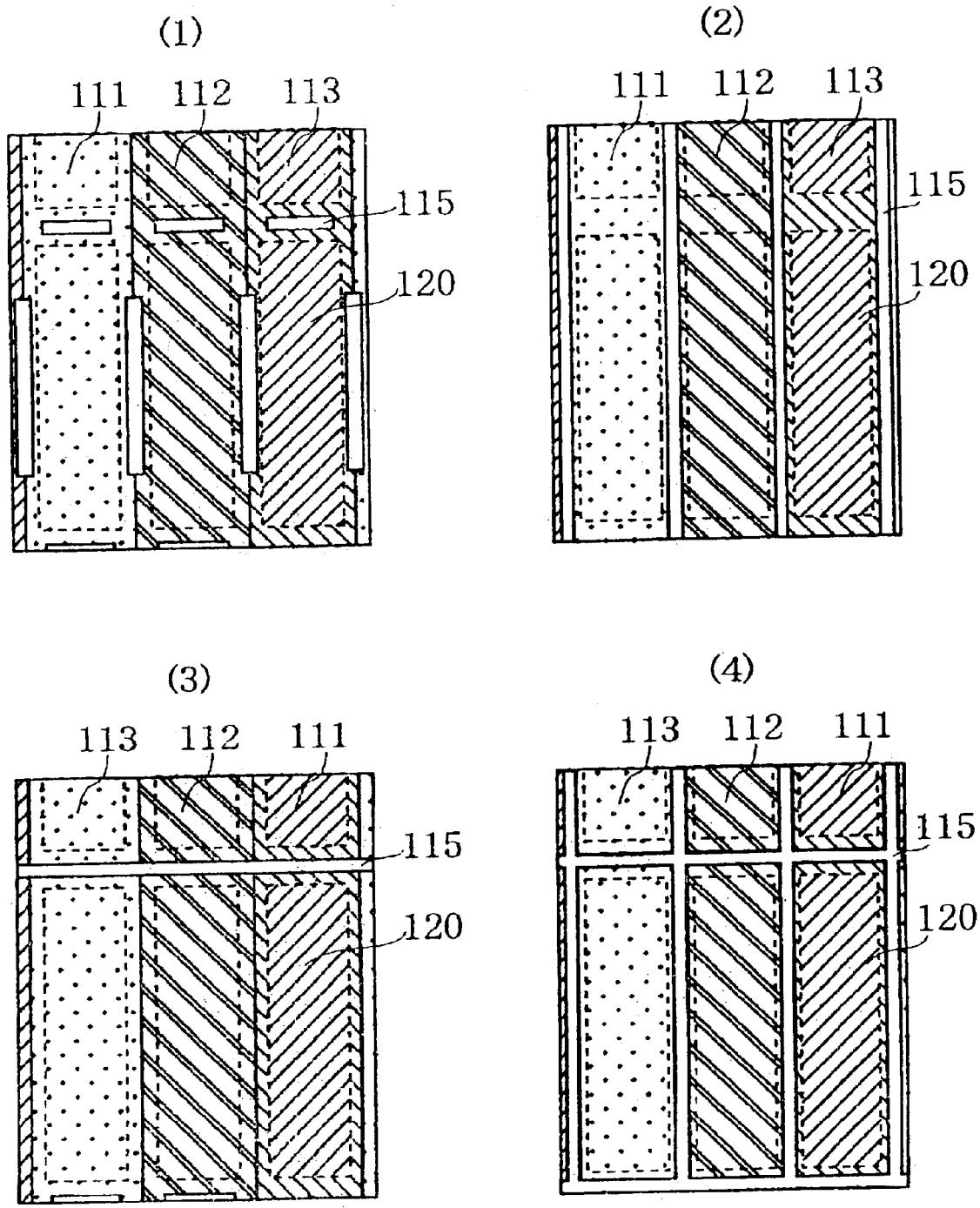
FIG. 61 is a schematic view of the color filter side substrate of the liquid crystal element of this embodiment.

Also, FIG. 61(1) shows a diagram of only the substrate on the color filter side, and if regions 115 where the light-blocking layer and the liquid crystal are in contact are positioned at the border portions between a red color filter 111, a green color filter 112, and a blue color filter 113, or at portions between the open portions 120 of the light-blocking layer, that is, surrounding the perimeter of the display pixel, then even if there are impurity ions, for example, the diffusion of ionic impurities within a single pixel is suppressed and the size of black spot defects becomes less than that of a single pixel, which is even better. Also, as shown in FIGS. 61(2) and (3), if the regions where the light-blocking layer and the liquid crystal are in contact are arranged continuously in stripe-shape in the direction of the signal line or the direction of the scanning line, then there is no movement at all of impurity ions in a horizontal or vertical direction, which is good. Furthermore, as shown in FIG. 61(4), by totally surrounding the periphery of the pixel by a region 205 where the light-blocking layer and the liquid crystal layer are in contact, the greatest effect can be achieved.

Embodiment 2-6-2

In the liquid crystal element of this embodiment, there is an orientation film layer between the light-blocking layer and the liquid crystal layer. That is, the liquid crystal is in direct contact with the orientation film, and the orientation film and the light-blocking film are in direct contact.

Orientation films are ordinarily very thin at 2000 Å or less, and therefore there are many pin holes in an orientation film. Consequently, when there are ionic impurities, which cause black spot defects in the liquid crystal, for example, electrons are transferred between the conductive light-blocking film and the ionic impurities, just like when there is no orientation film.

Also, the ionic impurities are readily absorbed because orientation films, especially those used for IPS mode, generally have large polarity. For this reason, the transfer of electrons with the conductive light-blocking film is performed once ionic impurities are absorbed into the orientation film, so that impurity ions can be more efficiently removed.

It should be noted that the shape, positioning, and area, for example, of the region where the light-blocking layer and the liquid crystal are in contact via the orientation film are the same as in the previous embodiment, and thus have not been described here a second time.

Embodiment 2-6-3

The present embodiment relates to the removal of the over-coating layer.

The previous two embodiments lacked any mention of an over-coating layer, but there can of course be an over-coating layer at the open portions, for example. However, the presence of an over-coating layer has no effect at regions where the light-blocking layer and the liquid crystal layer are in contact or at regions where the light-blocking layer and the liquid crystal layer are in contact via the orientation film.

Thus in the liquid crystal element of this embodiment, a light-sensitive resin is used for the over-coating layer, and over-coating layer portions are removed in advance by photolithography at portions with the structure of light-blocking layer/over-coating layer/liquid crystal or with the structure of light-blocking layer/over-coating layer/orientation film/liquid crystal. Thus, a color filter substrate with an over-coating layer is used, and a liquid crystal element without black spots can be produced.

Embodiment 2-6-4

Next, the liquid crystal element of this embodiment is driven by establishing substantially the same potential for the conductive light-blocking layer as for the common electrode. This gives a potential to the light-blocking layer and therefore contrast drops due to leakage of light from the pixel portion, for example, can be prevented and ion species are able to move easier than when a potential has not been applied, so that there is an increase in the speed at which ions are removed.

Figure 62:
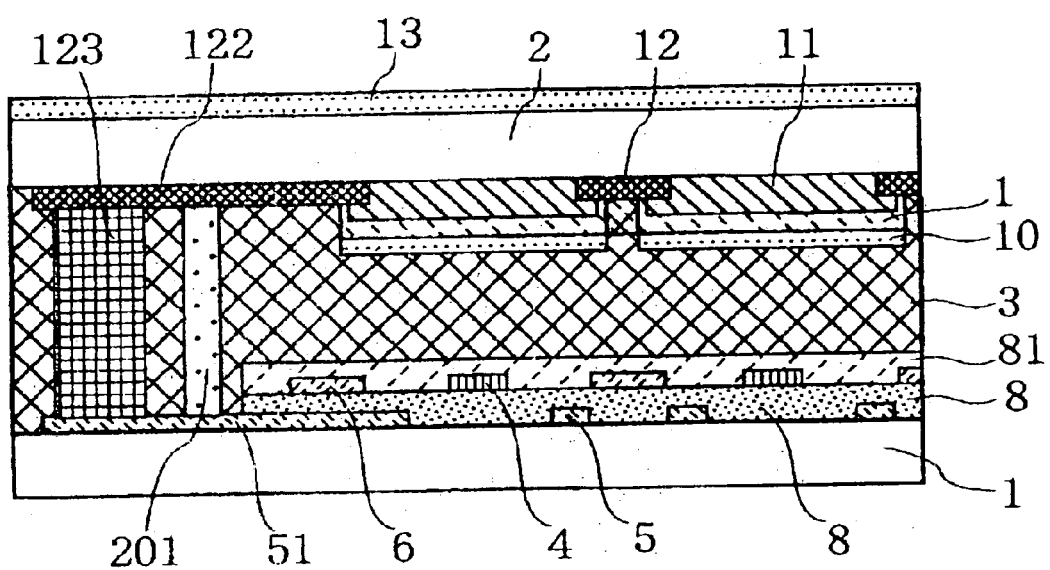
FIG. 62 is a cross-sectional view of the liquid crystal element according to Embodiment 2-6-4 of the present invention.

As shown in FIG. 62, in the liquid crystal element of this embodiment, the light-blocking layer 12 or a line 122 extending therefrom and having substantially the same potential as the light-blocking layer, and a common electrode or a line 51 extending therefrom and having substantially the same potential, are electrically connected by at least one or more conductive substances 123 between the color filter side substrate and the TFT side substrate. Accordingly, the potential of the light-blocking layer can be driven simultaneously with the common potential of the array substrate and it is not necessary to increase new lead-out lines. As long as they are conductive, any sort of substance, such as a metal or conductive resin, can be used for the conductive substances, but a resin made conductive by mixing carbon into it, for example, is most easily used, and is thus favorable.

By adding the configuration of the embodiments of this inventive group, a liquid crystal element could be created in which it is very difficult for black spot defects to occur.

Seventh Inventive Group

This inventive group utilizes the open portions and the black matrix on the opposing substrate, for example.

Embodiment 2-7-1

FIG. 63(1) shows a plan view of the array side substrate of the liquid crystal element according to this embodiment.

FIG. 63(2) shows cross-sectional views of the same.

The following is a description of the liquid crystal element shown in FIG. 63.

First, the array side substrate is manufactured in the same way as in Embodiment 2-4-1 up to forming $SiN_x$ at a thickness of 3500 Å using plasma CVD as the second insulating film (passivation film) 81 for protecting the wiring.

After cleaning the substrate, a resist was applied by spinner and mask exposure was performed, so as to selectively form the second insulating film (passivation film) and leave regions in the pixel portion in which a portion of the insulating film has not been formed. More specifically, the feature that is different here is that the second insulating film (passivation film) is not formed over the storage capacity portion 4, as shown by the A—A cross-section in FIG. 63.

Then, just like in Embodiment 2-4-1, developing and drying were performed, and then dry etching was conducted by RIE, after which the resist was removed.

Next, a configuration was adopted in which a portion of the conductive black matrix portion on the side of the opposing glass substrate with the color filter is in contact with the orientation film, so that even ions created on the opposing substrate side can be deionized.

The conductive black matrix was formed by mixing a conductive metal into resin.

FIG. 64 shows the configuration of the opposing glass substrate.

Next, the method for manufacturing a liquid crystal panel with the two substrates, the details thereof, and the liquid crystals used are the same as in Embodiment 2-4-1.

As comparative examples, the panels shown in Table 2 were produced.

TABLE 2

|  | Array Substrate Side Insulating Film | Opposing Substrate Side Electrode | Opposing Substrate Side Insulating Film | Size of Black Dot Non-uniformities |
|---|---|---|---|---|
| Present Invention | insulating film removed | yes | insulating film removed | 0.1 mm |
| Comparative Example 1 | insulating film not removed | no | — | 5 mm |
| Comparative Example 2 | insulating film not removed | yes | insulating film not removed | 5 mm |
| Comparative Example 3 | insulating film not removed | yes | insulating film removed | 2 mm |
| Comparative Example 4 | insulating film removed | no | — | 2 mm |
| Comparative Example 5 | insulating film removed | yes | insulating film not removed | 2 mm |

In Comparative Example 1, the electrode for deionizing ions that are unevenly distributed in the gate potential has not been exposed, so that the black dot nonuniformities are large.

In Comparative Example 2, the insulating film on the array substrate has not been removed, but a black matrix for deionization has been formed on the opposing substrate side, so that the black dot nonuniformities are smaller than in Comparative Example 1 but are still not sufficiently small.

In the Comparative Example 3, the insulating film on the array substrate has been removed, so that the unevenly distributed ions in the gate potential can be deionized to a certain extent, however, since the black matrix for deionization has not been exposed on the opposing substrate side, the black dot nonuniformities are smaller than in Comparative Example 1 but are still not sufficiently small.

In the present embodiment, the insulating film of the array substrate is removed and an electrode for deionization is formed on the opposing substrate side as well. Thus, the black dot nonuniformities can be kept sufficiently small at 0.1 mm or less.

The difference between the present invention and the comparative examples is illustrated in FIG. 65.

A laser was irradiated onto the gate portion of these panels to expose the gate potential and the panels were placed into a 70° C. high temperature tank and driven for 12 hours, after which they were displayed at half tone and evaluated.

The electric potential of the neutralization electrode on the opposing substrate side was set to the same the electric potential as that of the common electrode of the array substrate side.

As shown in Table 2, the result was that in Comparative Example 1, the electrode for deionizing ions that are unevenly distributed in the gate potential has not been exposed, and therefore the black dot nonuniformities are large.

In Comparative Example 2, the insulating film on the array substrate has not been removed but a black matrix for deionization has been formed on the opposing substrate side, so that the black dot nonuniformities are smaller than in Comparative Example 1 but are still not sufficiently small.

In Comparative Example 3, the insulating film on the array substrate has been removed, so that the unevenly distributed ions in the gate potential can be deionized to a certain extent, however, since the black matrix for deionization has not been exposed on the opposing substrate side, or because the electrode on the opposing substrate side has not been exposed, the black dot nonuniformities are smaller than in Comparative Example 1 but are still not sufficiently small.

On the other hand, in this embodiment, the insulating film on the array substrate has been removed and a conductive black matrix for deionization has been formed on the opposing substrate side as well, that is, the conductive substance for recovering ions is formed on both substrates and the conductive substance is in direct contact with either the orientation film or the liquid crystal, and thus the black dot nonuniformities could be kept sufficiently small at 0.1 mm or less.

Also, as can be seen from Table 1, a favorable display without display burn-in can be obtained by making the specific resistance of the liquid crystal smaller than $10^{13}$ Ω cm.

Embodiment 2-7-2

FIG. 66(1) shows the opposing substrate (glass substrate) configuration of the liquid crystal element of this embodiment.

In the previous first embodiment, the black matrix on the opposing substrate side was configured surrounding the pixel perimeter, but in this embodiment, the black matrix on the opposing substrate side is configured along the signal line (source line) 6.

Apart from that, the present embodiment is the same as the previous first embodiment.

Accordingly, the insulating film on the array substrate was removed and a conductive black matrix for deionization was formed on the opposing substrate side as well, that is, the conductive substance for recovering ions is formed on both substrates and the conductive substance is in direct contact with the orientation film or the liquid crystal, so that it was possible to keep the black dot nonuniformities small.

Figure 67:
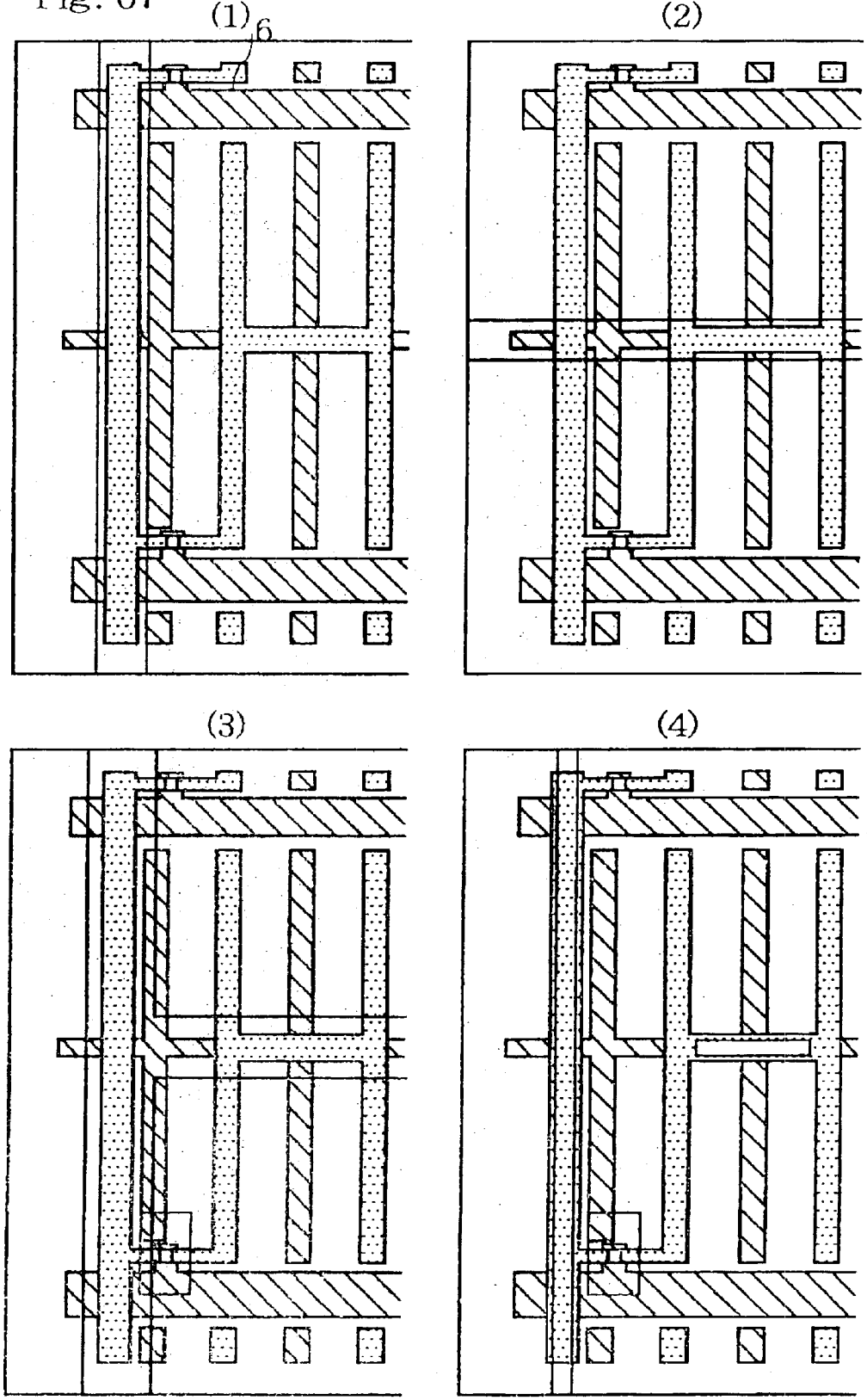
FIG. 67 is a diagram of a modified example of Embodiments 2-7-1 and 2-7-2.

Next, as shown in FIG. 63, in the present embodiment and in the previous first embodiment, the insulating film on the pixel electrode above the storage capacity was removed, but it is possible to remove the portion thereof over the signal wire electrode or the pixel electrode, or over a portion spanning these electrodes, as shown in FIG. 67.

Also, as shown in FIG. 68, it is also possible to form the common electrode above the pixel electrode and to remove a portion of the insulating film on the common electrode. In this drawing, numeral 16 is the semiconductor layer, numeral 161 is the drain, and numeral 162 is a second semiconductor layer.

Additionally, as shown in FIG. 69, it is also possible to form the common electrode and the pixel electrode in the same layer and remove a portion of the insulating film on top of that layer.

Figure 70:
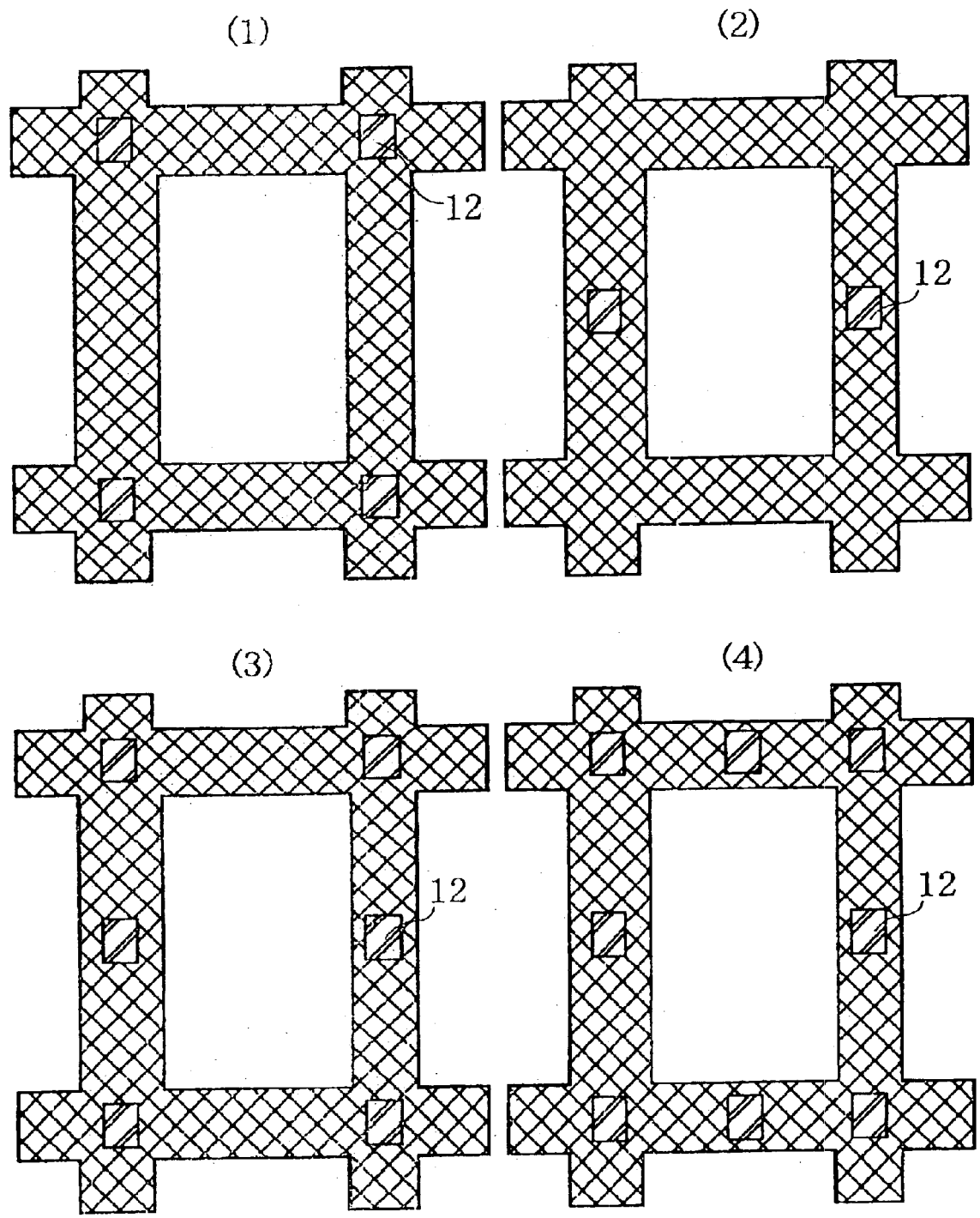
FIG. 70 is a diagram of another modified example of the same.

In the present embodiment and in the previous embodiment, a configuration like that shown in FIGS. 64(1) and 66(1) was taken for the black matrix formed on the opposing substrate side, however, as shown in FIG. 66(2), it is also possible to form the black matrix only on the portion corresponding to the signal line (gate line), or as shown in FIG. 70, it can also be formed in islands.

Embodiment 2-7-3

Figure 71:
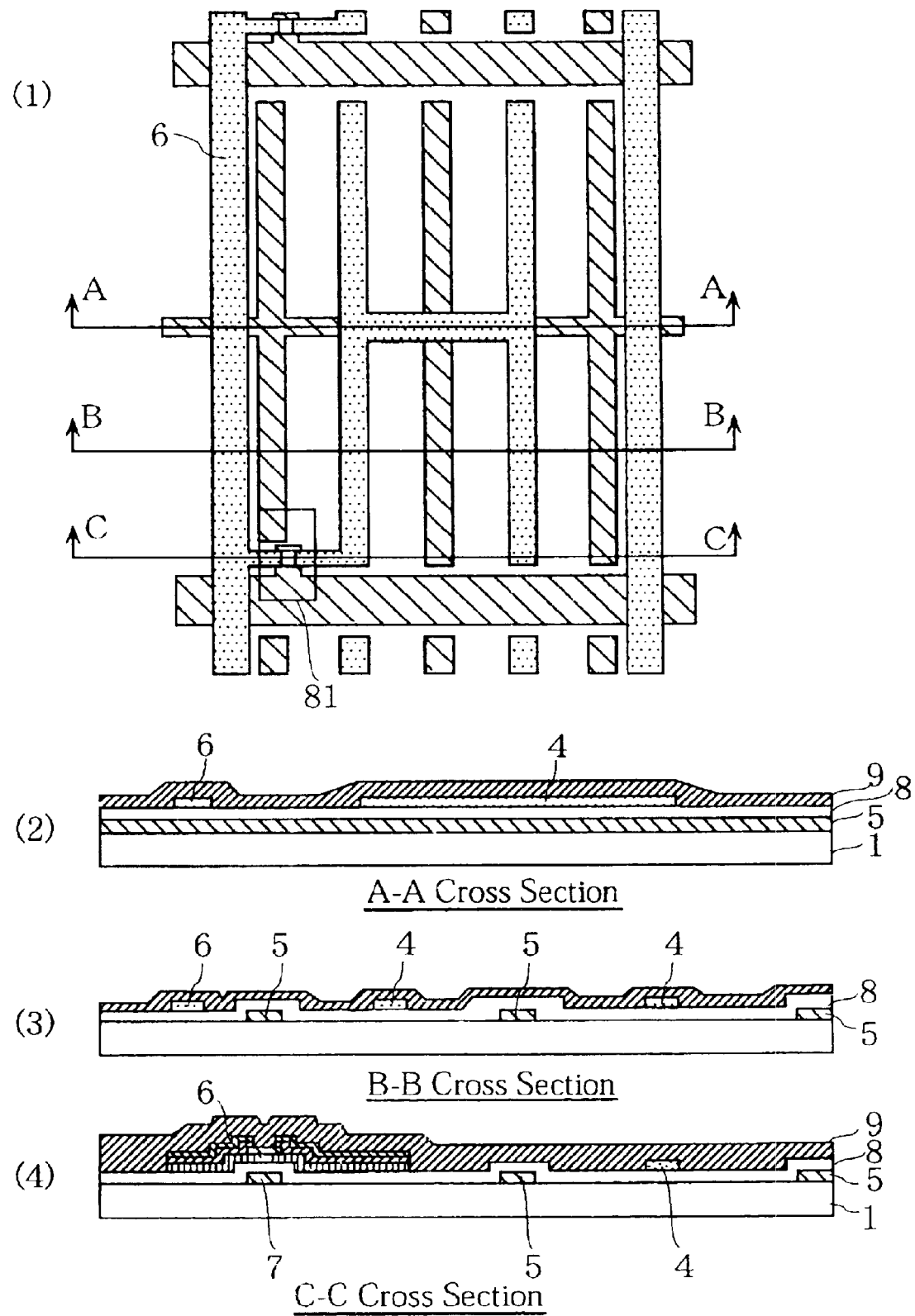
FIG. 71 shows the structure of the array substrate side of the liquid crystal element of Embodiment 2-7-3 of the present invention.

FIG. 71 shows the configuration of the liquid crystal element of this embodiment.

In the first embodiment, the site where the second insulating film was removed was only a portion above the storage capacity, but in this embodiment, the second insulating film (passivation film) 81 is formed only over the TFT, which is the switching element (that is, the insulating film is not formed at all on the pixel electrode). Aside from this, the present embodiment is the same as the previous first embodiment.

Also, a conductive black matrix is formed on the opposing substrate side as shown in FIG. 62, and this conductive black matrix is in direct contact with the orientation film on the opposing substrate side.

With the configuration shown in FIG. 71, the insulating film is not formed on the pixel electrode at all, and therefore black dot nonuniformities can be even better inhibited from occurring than in the previous first embodiment.

Figure 72:
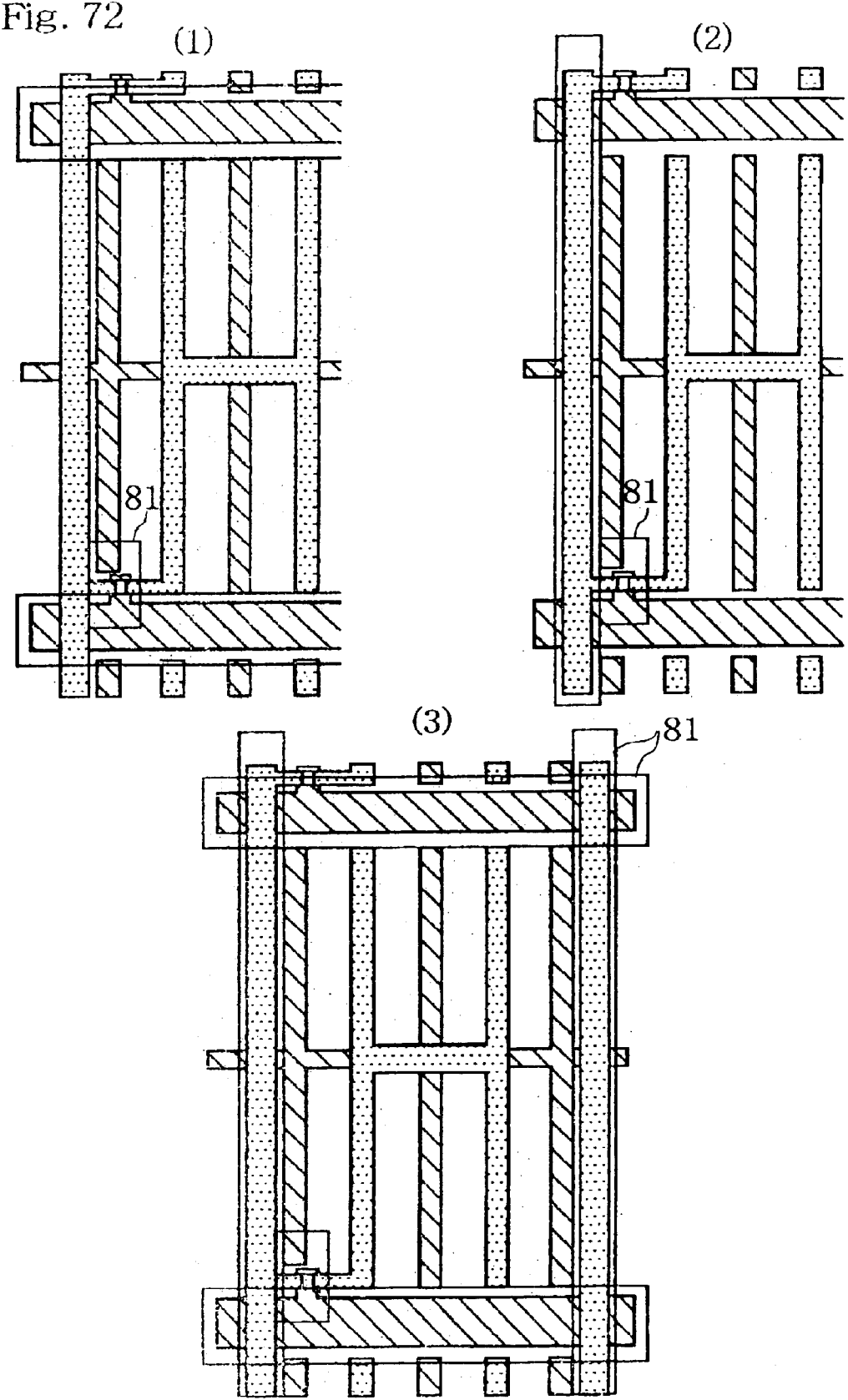
FIG. 72 is a diagram of a modified example of the array side substrate of this embodiment.

It should be noted that in the third embodiment, the opposing substrate side can be formed as shown in FIGS. 66 and 70. Furthermore, as shown in FIG. 72, it is also possible to form the insulating film on the scanning line electrode, the signal line electrode, or the scanning line electrode and the signal line electrode on the array substrate side.

Embodiment 2-7-4

Figure 73:
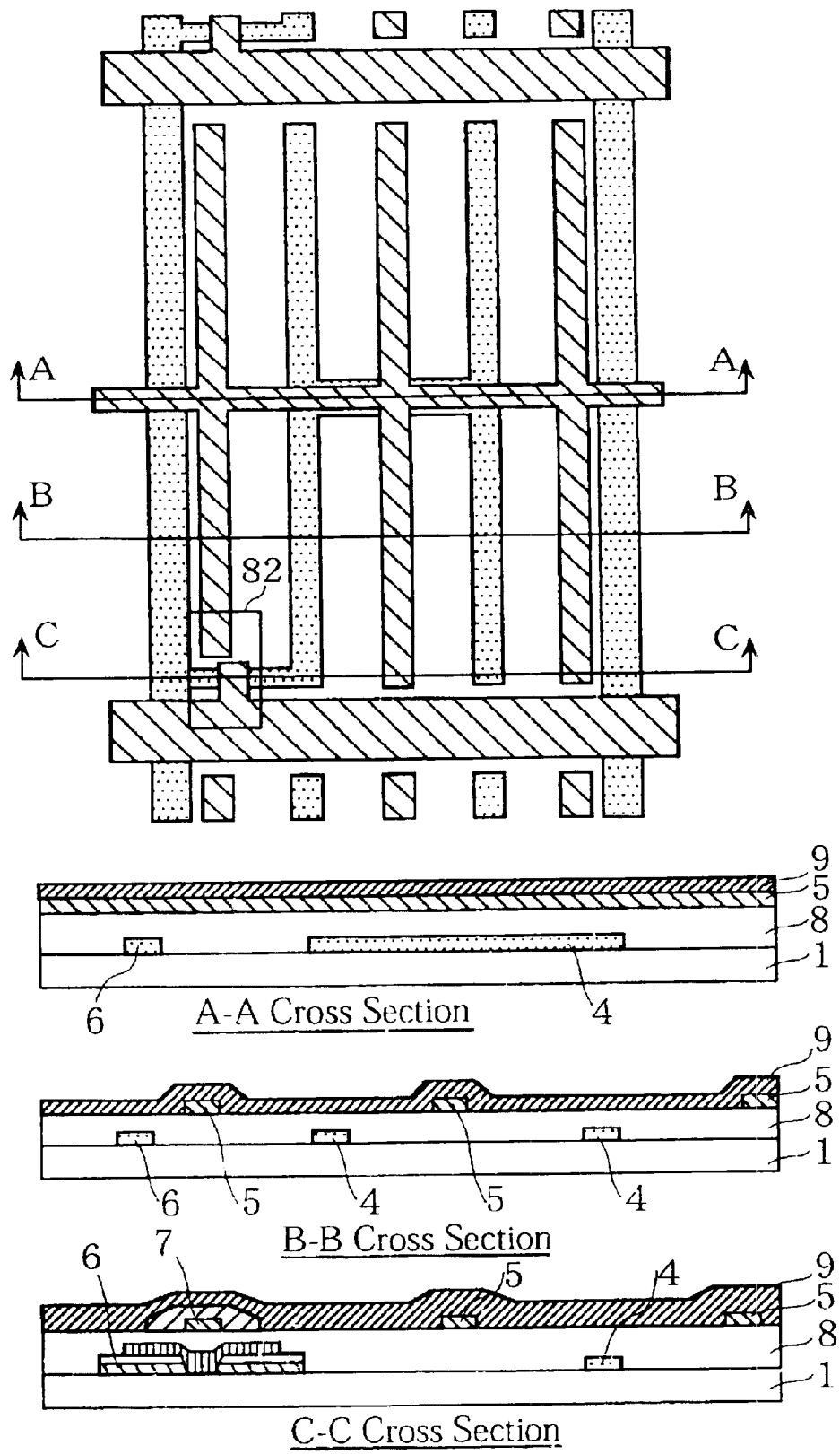
FIG. 73 shows the structure of the array side substrate of the liquid crystal element according to Embodiment 2-7-4 of the present invention.

FIG. 73 shows the configuration of the liquid crystal element of the present embodiment.

In the previous third embodiment, the scanning line 7 and the common electrode 5 were formed on the glass substrate 1, the first insulating film was formed over these, and the semiconductor layer, the signal line, and the pixel electrode were formed on top of this, but in this embodiment, the signal line 6, the drain, the pixel electrode 4, and the semiconductor layer 16 are formed on the glass substrate 1, the first insulating film is formed over these, and the scanning line 7 the common electrode 5 are selectively formed over this.

This means that in the third embodiment, there was no insulating film on a portion of the pixel electrode but the insulating film was formed on the common electrode, whereas in this embodiment, the insulating film is formed on the pixel electrode but no insulating film is formed on the common electrode.

Also, as shown in FIG. 73, the insulating film (passivation film) is formed only above the TFT, which is the switching element, on the array substrate side.

It should be noted that the opposing substrate is formed by the same method as in the previous first embodiment.

A conductive black matrix is formed on the opposing substrate side, and the conductive black matrix is in direct contact with the orientation film on that side, as shown in FIG. 64.

Thus, the insulating film on the common electrode is removed and the conductive black matrix is formed on the opposing substrate, so that the unevenly distributed ions in the gate potential are diffused into the pixel electrode portion and deionized. Consequently, a liquid crystal element of favorable display quality and without black dot nonuniformities can be obtained.

Also in this embodiment, the opposing substrate side can be a shape such as that illustrated in FIG. 66 and FIG. 70, and moreover, on the array substrate side an insulating film can be formed on the scanning line electrode, the signal line electrode, or both the scanning line electrode and the signal line electrode, as shown in FIG. 74.

Embodiment 2-7-5

FIG. 75 shows the configuration of Embodiment 2-7-5 of the invention.

In the third embodiment, the scanning line 7 and the common electrode 5 were formed on the glass substrate 1, the first insulating film was formed over these, and the semiconductor layer 16, the signal line 6, and the pixel electrode 4 were formed on top of this, but in this embodiment, the signal line 6, the drain, the pixel electrode 4, and the semiconductor layer 16 are formed on the glass substrate 1, the first insulating film is formed over these, and the scanning line 7, the common electrode 5, and the pixel electrode 4 are selectively formed over this.

This means that in this embodiment, the pixel electrode 4 and the common electrode 5 are formed in the same layer.

On the array substrate side, the insulating film (passivation film) is formed only above the TFT, which is the switching element, as shown in FIG. 75.

The opposing substrate is formed by the same method as in the first embodiment. That is to say, a conductive black matrix is formed on the opposing substrate side, and the conductive black matrix is in direct contact with the orientation film, as shown in FIG. 64.

Thus, the insulating film on the pixel electrode and the common electrode is removed and the conductive black matrix is formed on the opposing substrate, so that the unevenly distributed ions in the gate potential are diffused into the pixel electrode portion and deionized. Consequently, a liquid crystal element of favorable display quality and without black dot nonuniformities can be obtained.

Figure 76:
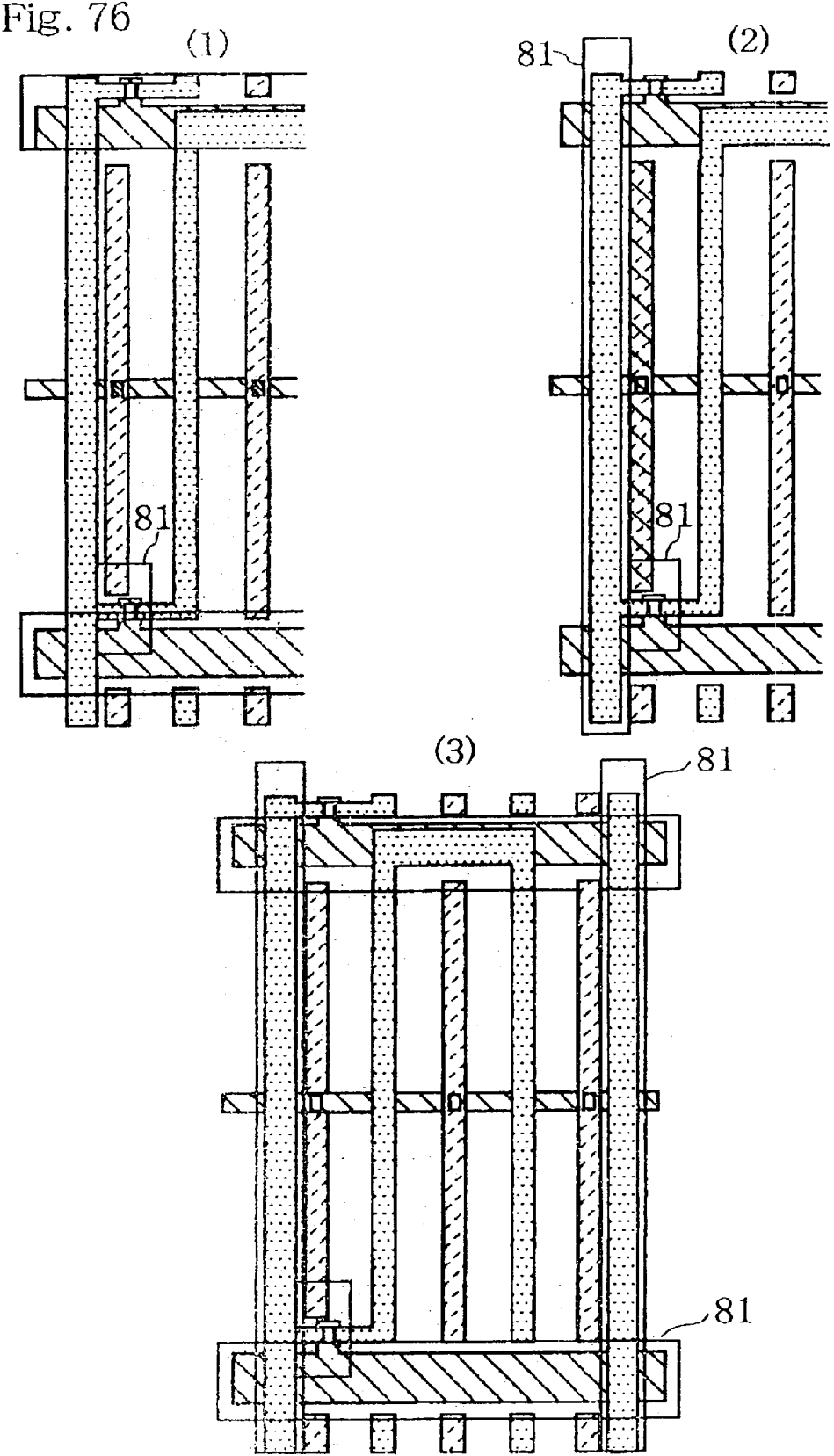
FIG. 76 is a diagram of a modified example of the array side substrate of this embodiment.

In this embodiment as well, the opposing substrate side can be of a shape such as that illustrated in FIG. 66. Moreover, on the array substrate side, an insulating film can be formed on the scanning line electrode, the signal line electrode, or both the scanning line electrode and the signal line electrode, as shown in FIG. 76.

Embodiment 2-7-6

Figure 77:
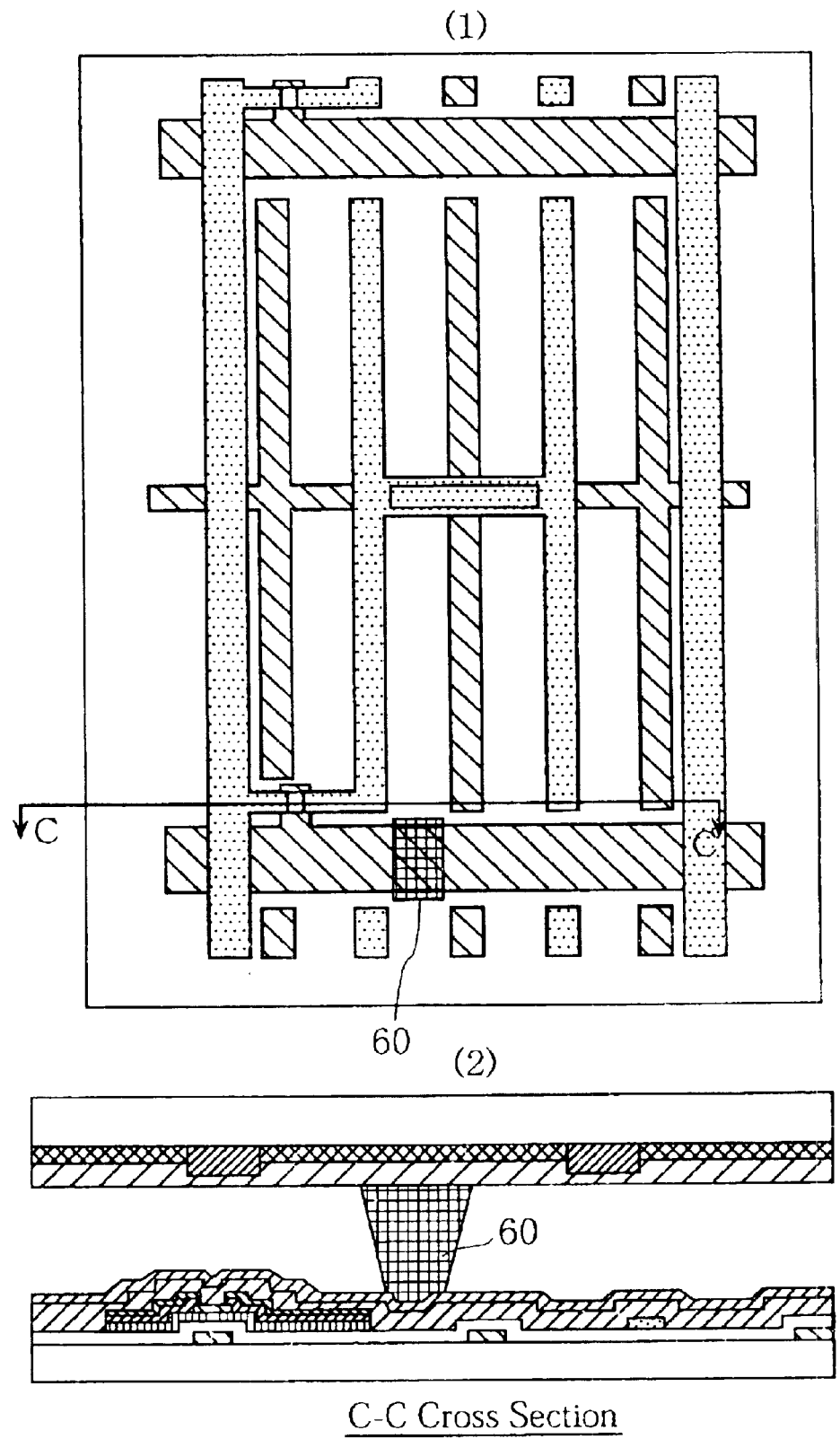
FIG. 77 shows primarily the array substrate side of the liquid crystal element of Embodiment 2-7-6 of the present invention.

FIG. 77 shows the configuration of the liquid crystal element according to this Embodiment 2-7-6.

In the previous first embodiment, for example, the spacing between the substrates was held steady by dispersing resin spheres as spacers, but in this embodiment, a protrusion (column) 60 is formed on the color filter side. Apart from this, the present embodiment is the same as the other embodiments.

The protrusion was formed by the following method using a photosensitive acrylic resin (PC335, made be JCR).

The photosensitive acrylic resin (PC335, made be JCR) was applied onto the color filter by spin-coating and then prebaked for one minute at 80° C. Using a certain mask, it was then exposed at 300 mj/cm$^2$. Then, the resin was developed for one minute at 25° C. with the developing solution CD702AD, rinsed with running water, and then postbaked for one hour at 220° C. (temperature is elevated above room temperature) to form a 5.0 μm thick protrusion 60.

The protrusion was formed at a site where an electrode on the array side is covered by the first insulating film and the second insulating film.

Forming a column at a specific spot as a spacer for holding the substrates at a fixed spacing, as in the present embodiment, makes it possible to place the spacer at a selected site where the top and bottom substrates do not easily short circuit, so that the substrates are less likely to short circuit, even if a conductive substance is formed on both substrates.

Additionally, the black matrix or the neutralization electrode, for example, are provided with protrusions/recesses, and the protrusions and recesses can be formed away from these portions.

Moreover, there is no movement of beads inside the liquid crystal panel when the panel is accelerated to remove inside air, for example, before the sealing resin is cured.

The spacers for holding the substrates at a fixed spacing can also be formed on the array substrate side. Depending on the circumstances, they may of course also be formed on both substrates. Moreover, if the display device is multistaged, the protrusion can also be formed on each of the substrates.

Eighth Inventive Group

This inventive group relates to the assimilation and absorption of ions with a foaming agent, for example.

Embodiment 2-8-1

Figure 78:
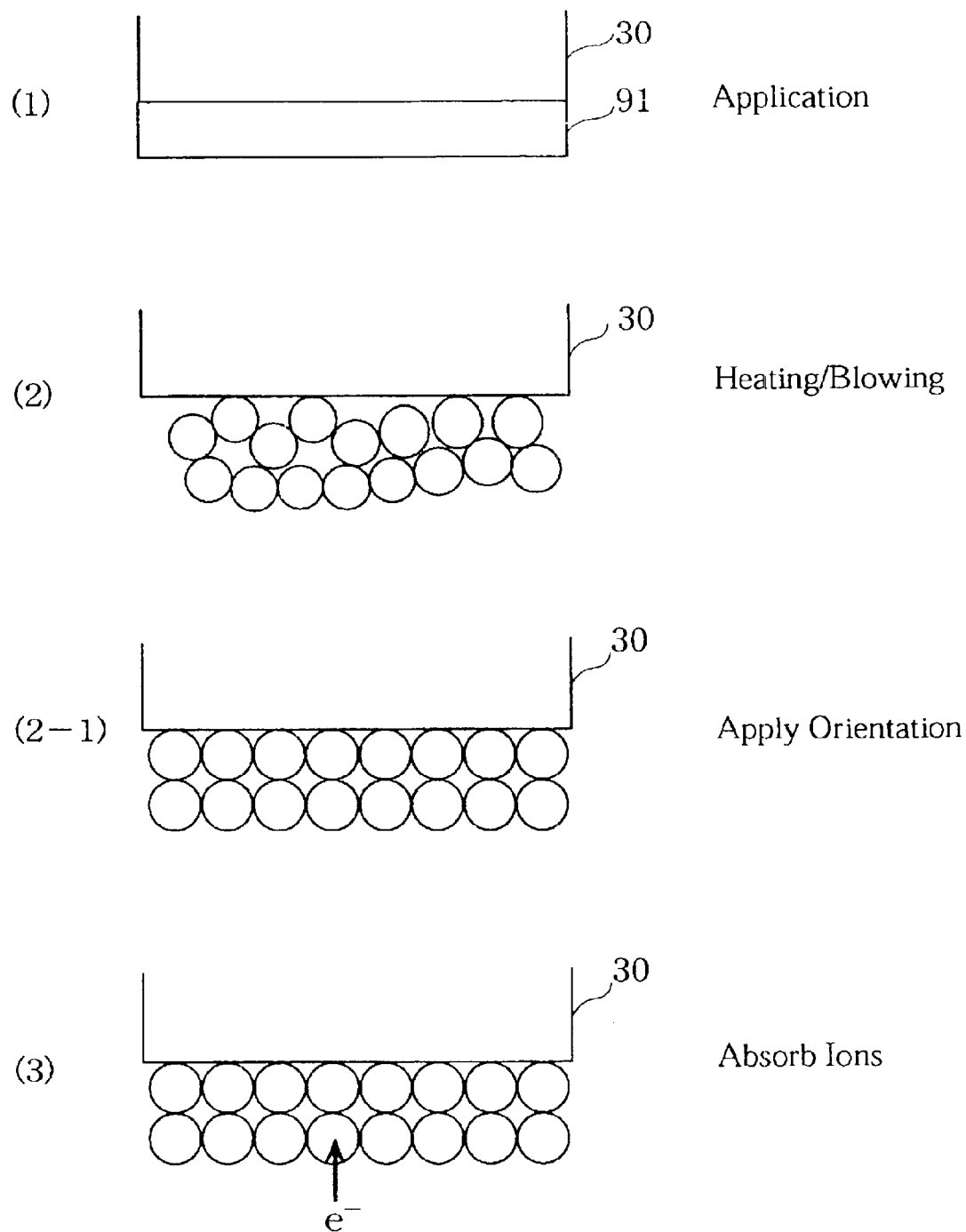
FIG. 78 shows configuration in the major aspects of Embodiment 2-8-1 of the present invention.

In the present embodiment, a resin layer having a micro sponge shape due to a foaming agent is formed on the neutralization electrode. FIG. 78 shows the major aspects of the manufacture and formation of this resin layer. Hereinafter, the technical details of the present embodiment will be described with reference to this drawing.

1) A filter, for example, is used to form a foaming agent layer 91 on the neutralization electrode 30 by application, for example. This foaming agent has been mixed into a rubber or a resin serving as the base, and by thermally decomposing it to generate nitrogen or carbon dioxide gas, for example, it creates a micro foamed structure of a 2 or 3 μm diameter in the base. More specifically, it is for example azodicarbonamide, N, N-dinitrosopentamethylenetetramine, benzenesulfonylhydrazide, or sodium hydrogencarbonate.

The foaming agent is thermally decomposed, which makes the orientation film of the base highly porous.

2-1) As necessary, it is given orientation.

3) When the liquid crystal display device is used, ions and impurities, for example, in the liquid crystal are recovered by the electric charge via the wide surface area due to this foamed structure and the neutralization electrode.

Other Embodiments

Above, the present invention was divided into two major inventive groups, which were each further divided into several inventive groups, and described with reference to a transparent type liquid crystal display device as an example of the liquid crystal element thereof, however, the present invention is by no means limited to the above description. That is, the examples provided hereinafter are also possible.

Figure 79:
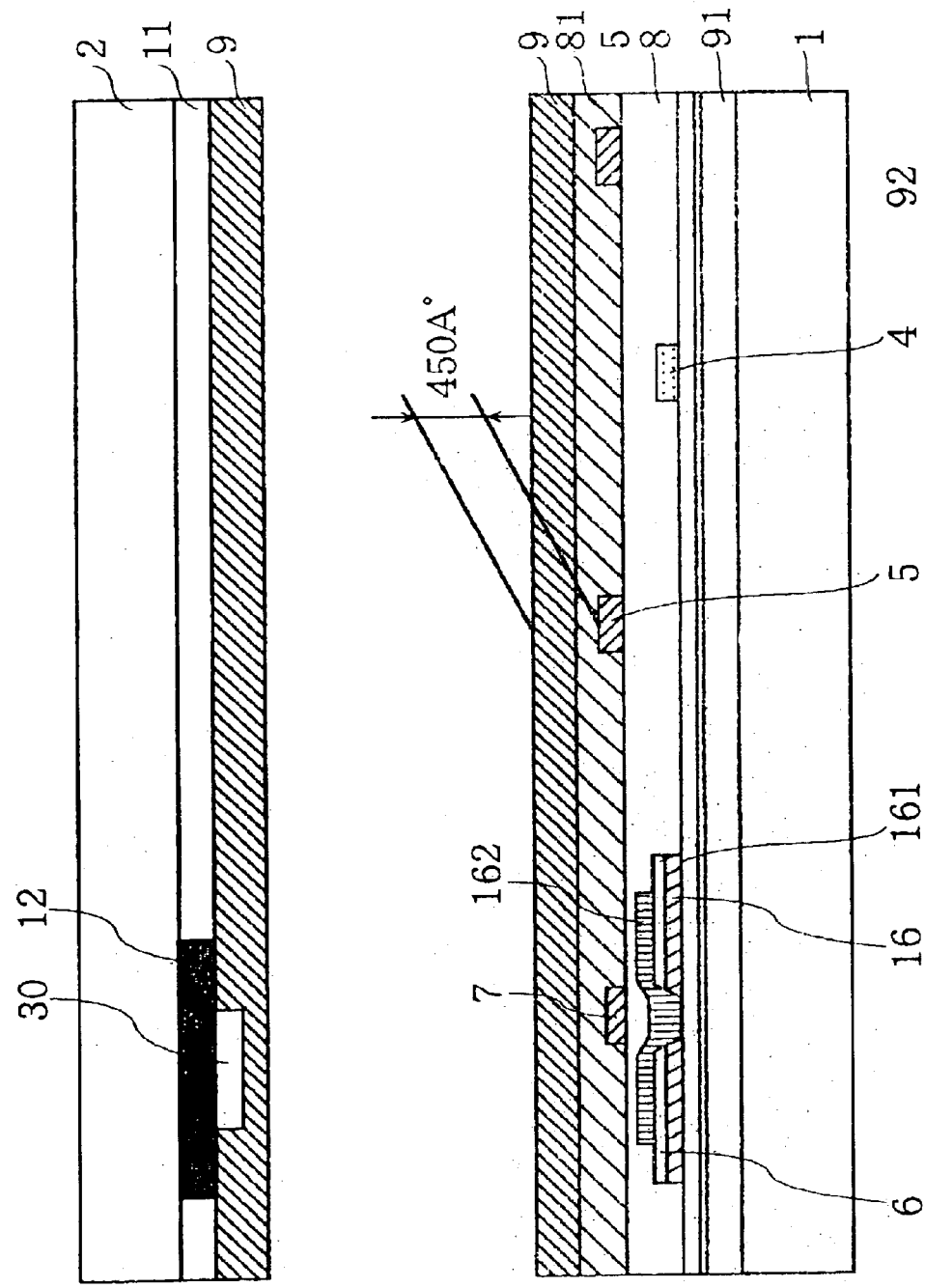
FIG. 79 shows the configuration of the major components of a reflective liquid crystal display device adopting the present invention.
Figure 80:
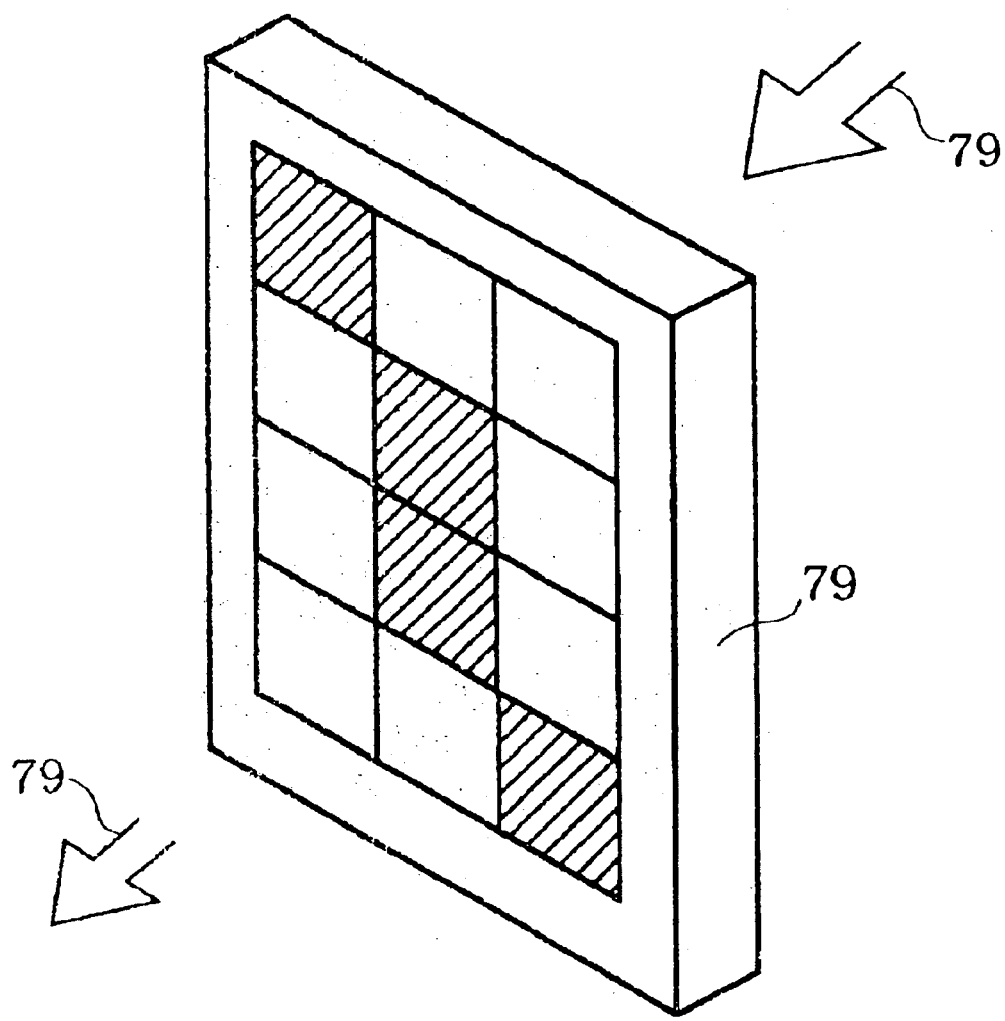
FIG. 80 is a diagram of the configuration of a liquid crystal optical logic element adopting the present invention.
Figure 81:
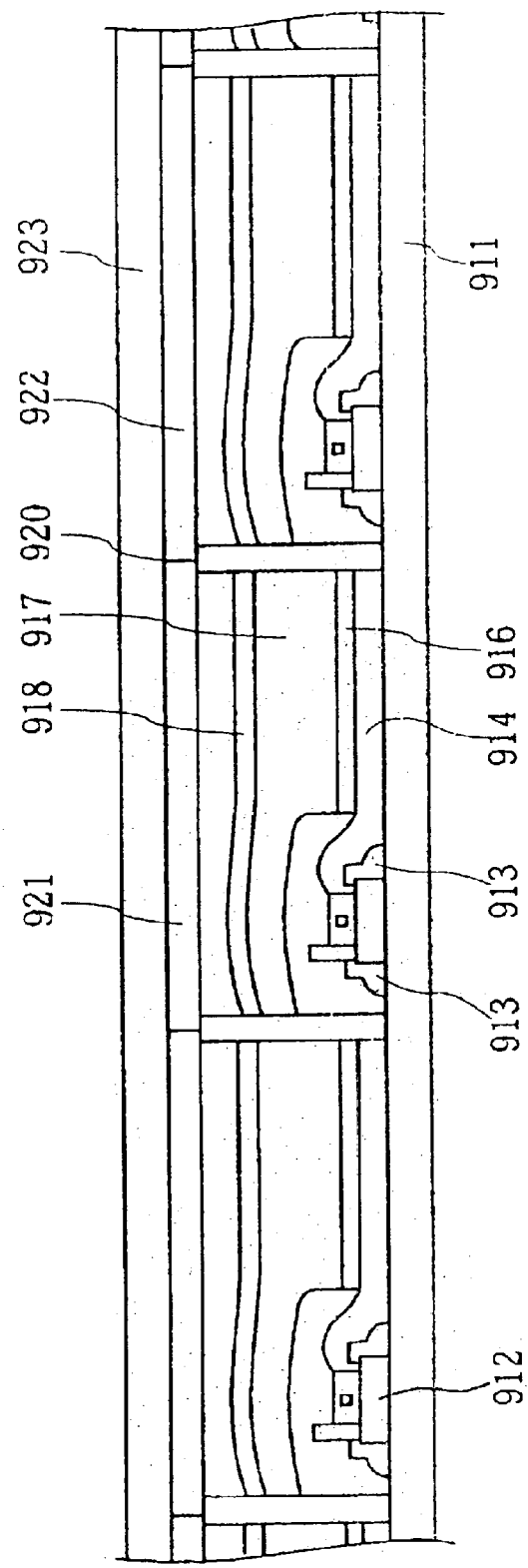
FIG. 81 is structural diagram of an EL display adopting the present invention.

1) Referring to FIG. 79, the liquid crystal element is a reflective type liquid crystal display, wherein numeral 91 is a mirror and numeral 92 is a transparent insulating film. Additionally, the TFT 16, for example, is formed on the transparent insulating film (as in the drawing) or on the opposing substrate side (not shown).
2) The light-blocking layer (film) is not the black matrix between the color filters but a protective film that also serves to prevent TFT malfunctions due to light. In this case, the light-blocking layer can be provided with protrusions/recesses not only in its surface on the liquid crystal side but also in the sidewalls thereof, although this depends on the dimensions of the original black matrix (between pixels) and the size of the unevenness.
3) As shown in FIG. 80, the liquid crystal element is a liquid crystal optical element. Referring to FIG. 80, an optical logic element 792 has been developed in recent years for performing calculations with respect to incident light 790 and then outputting transmitted light 791 based on the obtained results. A high contrast ratio is required if these elements are to be adopted for use in optical computers, and by improving the display properties of an element adopting an in-plane electric field liquid crystal, high reliability was obtained.
4) As shown in FIG. 81, the liquid crystal element is an EL display. Referring to the drawing, numeral 911 is a glass substrate, 912 is a thin film transistor, 913 is an insulating layer, 914 is a wire electrode, 915 is a cathode, 917 is an organic EL layer, 918 is an anode, 920 is a supporting column, 921 is a color filter, 922 is a luminescence conversion layer, and 923 is a transparent plate. Since the technical principle, for example, of EL displays is well-known, a description thereof has been omitted.
5) As shown in FIG. 82, an anaerobic resin 2021 and a mechanical means are both employed at the sealing port after the liquid crystal is injected into the panel. Referring to FIG. 82(1), a column 211 to which the anaerobic resin 2021 has be applied opposite the liquid crystal side, or a plate 2110 to which the anaerobic resin 2021 has been applied to its outer periphery portion, is for example pressed and pushed into a narrow hole portion 212 made of resin and through which the liquid crystal is injected into the panel. Referring to (2) of the same, a male screw with the anaerobic resin applied to its head portion side is pushed into a female threading 214 through which the liquid crystal is injected into the panel. Moreover, this resin is of a type that is cured by being pushed, which makes it possible to adjust the time that the liquid crystal injection portion is sealed.
6) As shown in FIG. 83, various types of voltage can be applied to the neutralization electrode. Referring to FIG. 83(1), the voltage is the same as that of the gate, and therefore is a substantially negative voltage. Referring to FIG. 83(2), the neutralization electrode is not only just connected to the gate signal line or the source signal line but also to a diode, so that it has only a plus or minus charge even if the voltage of both signal lines is alternated with each display cycle to prevent the liquid crystal from becoming charged. Additionally, an orientation film 91 employing a foaming agent is formed on the liquid crystal side surface thereof.

Hereinabove, the present invention was described with reference to several further embodiments thereof, but of course is by no means limited thereto. That is to say, the examples provided hereinafter are also possible.
1) The liquid crystal, instead of being a nematic liquid crystal, may be another type of liquid crystal, such as a ferroelectric liquid crystal or an antiferroelectric liquid crystal.
2) For the method of giving orientation, it is possible to adopt a method in which rubbing is not used (such as a method for optically inducing orientation) or for these methods to be adopted concomitantly so as to obtain an even more uniform orientation and achieve improved contrast.
3) The active element, instead of a three-terminal element TFT, can for example be a two-terminal element MIM (Metal—Insulator—Metal), a ZnO varistor, or a SiNx diode or a-Si diode.
4) For the transistor, in addition to a bottom-gate structure or a top-gate structure employing amorphous silicon (a-Si), those that for example use polysilicon (p-Si) may also be used.
5) The TFT structure can be of a channel-etched type instead of a channel protected type.
6) Drive circuits can be formed at the substrate periphery.
7) One or both of the substrates can be made of a film or a plastic, for example.
8) The substrate on which the color filter is formed can be used for the array side substrate.
9) Instead of aluminum, a different metal such as Cr or Cu, for example, or a transparent electrode such as ITO (indium oxide film incorporating tin oxide) can be adopted for the pixel electrode, the common electrode, and the neutralization electrode on the opposing side.
10) The neutralization electrode on the opposing side can be formed by a transparent electrode, such as ITO, at sites other than at the black matrix to achieve an improved numerical aperture.
11) The opposing side neutralization electrode can be formed separate of the black matrix at the black matrix portion.
12) A conductive color filter can be adopted on the opposing substrate side, and the neutralization electrode on the opposing side substrate can also serve as the color filter on the opposing substrate side.
13) The method for forming the cell thickness can be a method apart from that of dispersing spacers (for example, a method for forming a resin column), so as to form a uniform cell thickness.
14) In a reflective liquid crystal panel, a colored film can be used for the insulating film and the orientation film.
15) The black matrix and the color filter can be formed by a method such as pigmentation, printing, dyeing, electrodeposition, injection, or film transcription.
16) In the cell structure generated by a foaming agent, the cells can have even smaller dimensions or be continuous.
17) As described, the relationship between the positive and negative voltage applied to the pixel electrode and the common electrode can be reversed at a specified time interval to prevent charge-up of the liquid crystal, and in conjunction therewith, the voltage applied to the neutralization electrode can also be adjusted and controlled.

INDUSTRIAL APPLICABILITY

As can be understood from the above description, with the first major inventive group the uncured portions of the UV curable resin are purged, even if the UV light is not irradiated with meticulous care and from multiple directions, so as to eliminate and prevent the occurrence or foreign matter and bubbles in the resin for sealing the liquid crystal injection portion. Accordingly, components of the uncured resin no longer diffuse into the liquid crystal and thus there is a considerable improvement in the initial properties and long-term reliability of the liquid crystal element.

With the second major inventive group, by providing regions in the total layer thickness of the third layer composed of the orientation film and the insulating layer, for example, on the electrodes and interposed between the layer made by a conductive substance and the liquid crystal layer that are thinner than 500 Å, it is possible to substantially eliminate the conventional problem of black spot defects caused by the concentration of ion species in the liquid crystal, and thereby increase the manufacturing yield.

Furthermore, according to the same inventive group, by providing a neutralization electrode it is possible to prevent black dot nonuniformities from occurring, even when laser repairing is executed or when there are defects such as pinholes in the insulating layer on the gate signal line.

Furthermore, according to the same inventive group, there is a site on at least one of the pixel electrode, the common electrode, and the signal line electrode where the insulating film has not been formed on at least a portion thereof, which causes the electrode to either be in direct contact with the liquid crystal or to do so via only the orientation film. Moreover, a neutralization electrode with sites lacking the insulating film is formed on the substrate where the pixel electrode, for example, has not been formed. Consequently, unevenly distributed ions in the gate potential portion are deionized and thus display nonuniformities do not occur.

Additionally, according to the same inventive group, the pixel electrode and the opposing electrode are not formed in the same layer and the insulating film is not formed on the higher of the two electrodes. Accordingly, ions that are unevenly distributed in the gate potential portion are diffused into the pixel electrode portion and deionized, so that a favorable display quality liquid crystal element without display nonuniformities is obtained.

Furthermore, according to the same inventive group, an uneven structure is given to the surface of the black matrix on the substrate on which the pixel electrode has not been formed so as to increase its surface area. Thus, the ions that are unevenly distributed in the gate potential portion are deionized, so that black dot nonuniformities can be kept from occurring. In particular, forming unevenness in the surface of the black matrix makes it possible to increase the surface area for recovering ions and thereby achieve a sufficient ion-recovering effect.

Additionally, by adopting a configuration in which the light-blocking layer is in direct contact with the liquid crystal layer or does so via the orientation film, the ionic impurities in the liquid crystal are recovered by the light-blocking layer and the occurrence of black spot defects is totally eliminated.

Furthermore, by forming electrodes for the recovery of ions onto both substrates, the ions unevenly spread out in the gate potential portion are deionized. Thus, display nonuniformities are prevented from occurring.

What is claimed is:

1. A method for manufacturing an in-plane electric field mode liquid crystal element having a pair of substrates including, on at least one of the substrates, pixel electrodes for generating an in-plane electric field, common electrodes, and an insulating film for insulating these electrodes from one another, orientation films provided on the inner side of one or both of the substrates and a liquid crystal layer sandwiched between the substrates; the method for manufacturing an in-plane electric field mode liquid crystal element, comprising:

a stripping step of stripping, by rubbing, a predetermined portion of the orientation film on the electrodes or lines once formed on the inner side of one or both of the substrates.

2. The method for manufacturing an in-plane electric field mode liquid crystal element according to claim 1, wherein the stripping step is a push rubbing stripping step wherein the pushing amount during rubbing is at least 0.5 mm.

* * * * *